United States Patent
Lee et al.

(10) Patent No.: US 10,345,635 B2
(45) Date of Patent: *Jul. 9, 2019

(54) LIGHT CONTROL DEVICE, METHOD FOR MANUFACTURING LIGHT CONTROL DEVICE AND DISPLAY DEVICE COMPRISING LIGHT CONTROL DEVICE

(71) Applicant: LG Display Co., Ltd., Seoul (KR)

(72) Inventors: Moon Sun Lee, Sejong (KR); Ji Young Ahn, Gyeonggi-do (KR); Pu Reum Kim, Incheon (KR); Ki Han Kim, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 51 days.

This patent is subject to a terminal disclaimer.

(21) Appl. No.: 15/509,024

(22) PCT Filed: Sep. 15, 2015

(86) PCT No.: PCT/KR2015/009672
§ 371 (c)(1),
(2) Date: Mar. 6, 2017

(87) PCT Pub. No.: WO2016/043497
PCT Pub. Date: Mar. 24, 2016

(65) Prior Publication Data
US 2017/0261782 A1    Sep. 14, 2017

(30) Foreign Application Priority Data

Sep. 16, 2014 (KR) .................. 10-2014-0122565
Sep. 17, 2014 (KR) .................. 10-2014-0123564
(Continued)

(51) Int. Cl.
*G02F 1/1334* (2006.01)
*G02F 1/1347* (2006.01)
(Continued)

(52) U.S. Cl.
CPC .......... *G02F 1/1334* (2013.01); *G02F 1/1337* (2013.01); *G02F 1/1347* (2013.01);
(Continued)

(58) Field of Classification Search
None
See application file for complete search history.

(56) References Cited

U.S. PATENT DOCUMENTS 9,989,798 B2 *    6/2018    Kim ..................... G02F 1/1334
2007/0268427 A1 *  11/2007    Uehara ............... G02B 6/0016
                                                                349/62
(Continued)

FOREIGN PATENT DOCUMENTS

JP    2008-102341 A    5/2008
KR    10-2007-0038352 A    4/2007
(Continued)

OTHER PUBLICATIONS

International Search Report dated Mar. 18, 2016, for corresponding International Application No. PCT/KR2015/009672.

*Primary Examiner* — James A Dudek
(74) *Attorney, Agent, or Firm* — Morgan, Lewis & Bockius LLP

(57) ABSTRACT

There are provided a light control device, a method for manufacturing the light control device, and a display device comprising the light control device. The light control device includes a first substrate and a second substrate facing each other, and a plurality of liquid crystal units between the first substrate and the second substrate, and the plurality of liquid crystal units includes a first liquid crystal unit including a droplet including a first liquid crystal and a polymer and a second liquid crystal unit which is disposed on or under the first liquid crystal unit and configured as a polymer net-
(Continued)

worked liquid crystal (PNLC) including a second liquid crystal, a coloring member, and a network.

19 Claims, 45 Drawing Sheets

(30) Foreign Application Priority Data

| Sep. 24, 2014 | (KR) | ........................ 10-2014-0127436 |
| Nov. 12, 2014 | (KR) | ........................ 10-2014-0157016 |
| Nov. 14, 2014 | (KR) | ........................ 10-2014-0159071 |
| Nov. 14, 2014 | (KR) | ........................ 10-2014-0159081 |

(51) Int. Cl.
*G02F 1/1333* (2006.01)
*G02F 1/1337* (2006.01)
*G02F 1/1343* (2006.01)

(52) U.S. Cl.
CPC ...... *G02F 1/13475* (2013.01); *G02F 1/13476* (2013.01); *G02F 1/133345* (2013.01); *G02F 1/134309* (2013.01); *G02F 2001/13345* (2013.01); *G02F 2001/133738* (2013.01); *G02F 2001/133742* (2013.01); *G02F 2201/121* (2013.01)

(56) References Cited

U.S. PATENT DOCUMENTS

| 2008/0094551 | A1* | 4/2008 | Hayashi | .............. G02F 1/13475 349/106 |
| 2011/0261303 | A1* | 10/2011 | Jang | .................... G02F 1/13318 349/108 |
| 2013/0314647 | A1 | 11/2013 | Yim et al. | |
| 2013/0342772 | A1 | 12/2013 | Lim et al. | |
| 2014/0183472 | A1 | 7/2014 | Kim et al. | |
| 2017/0261781 | A1* | 9/2017 | Lee | ........................ G02F 1/1334 |

FOREIGN PATENT DOCUMENTS

| KR | 10-2013-0132108 A | 12/2013 |
| KR | 10-2013-0142734 A | 12/2013 |
| KR | 10-2014-0085243 A | 7/2014 |

* cited by examiner

LIGHT CONTROL DEVICE, METHOD FOR MANUFACTURING LIGHT CONTROL DEVICE AND DISPLAY DEVICE COMPRISING LIGHT CONTROL DEVICE

TECHNICAL FIELD

The present invention relates to a light control device which can implement a transparent mode and a light shielding mode using a plurality of liquid crystal units, a method for manufacturing the light control device, and a display device comprising the light control device.

BACKGROUND ART

Recently, as the world entered the information age, display devices for processing and displaying a large amount of information have been rapidly developed. Accordingly, various display devices have been developed and have attracted a lot of attention.

Specific examples of the display devices may include a liquid crystal display device (LCD), a plasma display panel device (PDP), a field emission display device (FED), an electroluminescence display device (ELD), and organic light emitting diodes (OLED). These display devices generally have excellent properties of a thin profile, light weight and low power consumption and thus their application fields have been increased continuously. In particular, in most of electronic devices or mobile devices, the display device has been used as one of a user interface.

Also, studies of transparent display devices through which a user may see objects or images located on the opposite side are being actively conducted.

The transparent display devices may have advantages of better use of space, interior and design, and may have various application fields. The transparent display devices may solve spatial and temporal restrictions of electronic devices as compared with conventional display devices by implementing a display device with functions of information recognition, information processing and information display as a transparent electronic device. Such transparent display devices may be used for a smart window, which may be used as a window of a smart home or a smart car.

Particularly, an LCD may be implemented as a transparent display device by applying an edge type backlight thereto, but a transparent display device based on LCD has a problem in that a transmittance ratio is very low and transparency is decreased by a polarizing plate used for implementation of black and also has a problem with outdoor visibility.

Further, a transparent display device based on OLED has higher power consumption than the transparent display device based on LCD and has difficulty in displaying a true black. Also, the transparent display device based on OLED has no problem with a contrast ratio under a dark environment, but has a disadvantage of reduction in a contrast ratio in a normal environment with light.

Therefore, in order to implement a transparent mode and a light shielding mode, there has been suggested a method for utilizing a polymer dispersed liquid crystal (PDLC) and a polymer networked liquid crystal (PNLC) for a light control device of the transparent display device based on OLED. The polymer dispersed liquid crystal (PDLC) or the polymer networked liquid crystal (PNLC) may be formed by mixing a monomer with a liquid crystal and then irradiating ultraviolet (UV) rays thereto.

Particularly, the polymer dispersed liquid crystal (PDLC) has a structure in which a liquid crystal is formed within a droplet, and the polymer networked liquid crystal (PNLC) has a structure in which a polymer is distributed in a network structure on a liquid crystal.

If an electric field is applied to the polymer dispersed liquid crystal (PDLC) or polymer networked liquid crystal (PNLC), an alignment of the liquid crystal is changed, and, thus, light incident from the outside can be scattered or transmitted. That is, a device using the polymer dispersed liquid crystal (PDLC) or polymer networked liquid crystal (PNLC) can scatter or transmit light without a polarizing plate, and, thus, can be used as a light control device of a transparent display device.

DISCLOSURE

Technical Problem

An object of the present invention is to provide a light control device which is reduced in power consumption by transmitting a light incident from the outside in a normal state where a voltage is not applied and thus implementing a transparent mode in the normal state.

Further, another object of the present invention is to provide a light control device in which a color is displayed or a background of the device is invisible by shielding a light incident from the outside.

Furthermore, yet another object of the present invention is to provide a light control device which is combined with a transparent display device and provides a user with a transparent mode or a light shielding mode in which a light incident from the outside is shielded, and, thus, provides a high image visibility.

The objects of the present invention are not limited to the aforementioned objects, and other objects, which are not mentioned above, will be apparent to a person having ordinary skill in the art from the following description.

Technical Solution

In order to achieve the above object, an exemplary embodiment of the present invention provides a light control device including a first substrate and a second substrate facing each other, and a plurality of liquid crystal units between the first substrate and the second substrate. The plurality of liquid crystal units includes a first liquid crystal unit including a droplet including a first liquid crystal and a polymer and a second liquid crystal unit which is disposed on or under the first liquid crystal unit and configured as a polymer networked liquid crystal (PNLC) including a second liquid crystal, a coloring member, and a network.

According to another feature of the present invention, the light control device further includes a first electrode between the first substrate and the plurality of liquid crystal units, and a second electrode between the second substrate and the plurality of liquid crystal units. The second liquid crystal may be a negative liquid crystal, and the first electrode and the second electrode may be configured to apply a vertical electric field to the plurality of liquid crystal units.

According to yet another feature of the present invention, the first liquid crystal may be a negative liquid crystal and may be aligned in a vertical direction with respect to the first substrate and the second substrate in a state where an electric field is not applied to the first liquid crystal unit.

According to still another feature of the present invention, a refractive index of a short axis of the first liquid crystal in the first liquid crystal unit, a refractive index of the polymer in the first liquid crystal unit, a refractive index of a short axis of the second liquid crystal in the second liquid crystal unit, and a refractive index of the network in the second liquid crystal unit may be identical to each other.

According to still another feature of the present invention, a refractive index of a long axis of the first liquid crystal in the first liquid crystal unit and a refractive index of the polymer in the first liquid crystal unit may be different from each other.

According to still another feature of the present invention, the first liquid crystal may be a positive liquid crystal and may be aligned in a horizontal direction with respect to the first substrate and the second substrate in a state where an electric field is not applied to the first liquid crystal unit.

According to still another feature of the present invention, a refractive index of a long axis of the first liquid crystal in the first liquid crystal unit, a refractive index of the polymer in the first liquid crystal unit, a refractive index of a short axis of the second liquid crystal in the second liquid crystal unit, and a refractive index of the network in the second liquid crystal unit may be identical to each other.

According to still another feature of the present invention, a refractive index of a short axis of the first liquid crystal in the first liquid crystal unit and a refractive index of the polymer in the first liquid crystal unit may be different from each other.

According to still another feature of the present invention, the first liquid crystal may be a positive liquid crystal or negative liquid crystal and may have an isotropic state in a state where an electric field is not applied to the first liquid crystal unit.

According to still another feature of the present invention, an average refractive index of the first liquid crystal in the first liquid crystal unit, a refractive index of the polymer in the first liquid crystal unit, a refractive index of a short axis of the second liquid crystal in the second liquid crystal unit, and a refractive index of the network in the second liquid crystal unit may be identical to each other.

According to still another feature of the present invention, a refractive index of a short axis or long axis of the first liquid crystal in the first liquid crystal unit and a refractive index of the polymer in the first liquid crystal unit may be different from each other.

According to still another feature of the present invention, the light control device may further include a first electrode disposed between the first substrate and the plurality of liquid crystal units and including a plurality of pattern electrodes. The second liquid crystal may be a positive liquid crystal, and the first electrode may include the plurality of pattern electrodes configured to apply a horizontal electric field to the plurality of liquid crystal units.

According to still another feature of the present invention, the first liquid crystal may be a negative liquid crystal and may be aligned in a horizontal direction with respect to the first substrate and the second substrate in a state where an electric field is not applied to the first liquid crystal unit.

According to still another feature of the present invention, a refractive index of a long axis of the first liquid crystal in the first liquid crystal unit, a refractive index of the polymer in the first liquid crystal unit, a refractive index of a short axis of the second liquid crystal in the second liquid crystal unit, and a refractive index of the network in the second liquid crystal unit may be identical to each other.

According to still another feature of the present invention, a refractive index of a short axis of the first liquid crystal in the first liquid crystal unit and a refractive index of the polymer in the first liquid crystal unit may be different from each other.

According to still another feature of the present invention, the first liquid crystal may be a positive liquid crystal and may be aligned in a vertical direction with respect to the first substrate and the second substrate in a state where an electric field is not applied to the first liquid crystal unit.

According to still another feature of the present invention, a refractive index of a short axis of the first liquid crystal in the first liquid crystal unit, a refractive index of the polymer in the first liquid crystal unit, a refractive index of a short axis of the second liquid crystal in the second liquid crystal unit, and a refractive index of the network in the second liquid crystal unit may be identical to each other.

According to still another feature of the present invention, a refractive index of a long axis of the first liquid crystal in the first liquid crystal unit and a refractive index of the polymer in the first liquid crystal unit may be different from each other.

According to still another feature of the present invention, the liquid crystal in the first liquid crystal unit may be a positive liquid crystal or negative liquid crystal and may have an isotropic state in a state where an electric field is not applied to the first liquid crystal unit.

According to still another feature of the present invention, an average refractive index of the first liquid crystal in the first liquid crystal unit, a refractive index of the polymer in the first liquid crystal unit, a refractive index of a short axis of the second liquid crystal in the second liquid crystal unit, and a refractive index of the network in the second liquid crystal unit may be identical to each other.

According to still another feature of the present invention, a refractive index of a short axis or long axis of the first liquid crystal in the first liquid crystal unit and a refractive index of the polymer in the first liquid crystal unit may be different from each other.

According to still another feature of the present invention, the light control device may further include an insulating layer between the first substrate and the first electrode, and a common electrode between the insulating layer and the first substrate. The first electrode and the common electrode may be configured to apply a horizontal electric field to the plurality of liquid crystal units.

According to still another feature of the present invention, the light control device may further include a wall positioned in the second liquid crystal unit. The wall may be formed of one of a photo resist, polydimethylsiloxane, and a photocurable polymer which are transparent materials capable of transmitting light.

According to still another feature of the present invention, the light control device may further include an alignment film which is disposed on or under the second liquid crystal unit so as to align the liquid crystal in the second liquid crystal unit.

According to still another feature of the present invention, the light control device may further include a refractive index matching layer on or under the plurality of liquid crystal units.

In order to achieve the above object, another exemplary embodiment of the present invention provides a display device including a display panel, and a light control device disposed on one surface of the display panel. The light control device includes a first substrate and a second substrate facing each other, and a plurality of liquid crystal units which is disposed between the first substrate and the second substrate and implemented in a transparent mode in which light is transmitted when an electric field is not applied and also implemented in a light shielding mode in which light is shielded when an electric field is applied. The plurality of liquid crystal units may include a polymer dispersed liquid crystal (PDLC) including a droplet including a liquid crystal and a polymer networked liquid crystal (PNLC) disposed on or under the polymer dispersed liquid crystal (PDLC).

According to another feature of the present invention, the display panel may be an organic light emitting display panel.

According to yet another feature of the present invention, the light control device may be attached to at least one of a front surface and a rear surface of the display panel.

According to still another feature of the present invention, the display panel may be a transparent display panel including a transmissive area and an emissive area. In a display mode in which the display panel displays an image, the plurality of liquid crystal units may be implemented in a light shielding mode, and in a non-display mode in which the display panel does not display an image, the plurality of liquid crystal units may be implemented in a transparent mode or a light shielding mode.

Details of other exemplary embodiments will be included in the detailed description of the invention and the accompanying drawings.

Effect

The present invention can provide a light control device which has a structure in which a plurality of liquid crystal units is laminated and thus can increase a transmittance ratio in a transparent mode and increase a light shielding ratio in a light shielding mode, as compared with a light control device including a single liquid crystal unit.

Since the present invention has the structure in which the plurality of liquid crystal units is laminated, a path of a light scattered in the light shielding mode is increased, and, thus, light absorption of a coloring member can be increased and a light shielding ratio in the light shielding mode can be increased, as compared with the light control device including a single liquid crystal unit. Further, since light absorption of the coloring member can be increased, the amount of the coloring member can be reduced and a transmittance ratio in the transparent mode can be increased.

The present invention can provide the light control device which can be implemented in the transparent mode by transmitting light incident from the outside without applying a voltage.

Further, since a liquid crystal of the light control device of the present invention is aligned so as to transmit light incident from the outside in a normal state, the transparent mode can be implemented in the normal state. Therefore, the present invention can provide the light control device with reduced power consumption.

Furthermore, the present invention can provide the light control device which can be implemented in the light shielding mode in which a background of the light control device is invisible by including a coloring member formed of a dye having a color so as to express black or other colors than black.

Also, the present invention can improve a light shielding ratio of the light control device by using a wall positioned within the liquid crystal unit to suppress coloring members from being tilted to a specific area and thus to suppress a light leakage caused by coloring members distributed in a non-uniform manner within the liquid crystal unit.

Further, the present invention can provide the light control device applicable to a flexible display device since a shock applied from the outside can be absorbed using the wall positioned within the liquid crystal unit.

Furthermore, since the present invention uses a refractive index matching layer, it is possible to improve a transmittance ratio of the light control device in the transparent mode by reducing a difference in refractive index and also possible to increase driving reliability of the light control device by suppressing a short occurring within the light control device.

The effects of the present invention are not limited to the aforementioned effects, and other various effects are included in the following description.

DETAILED DESCRIPTION OF THE PREFERRED EMBODIMENT

Figure 1:
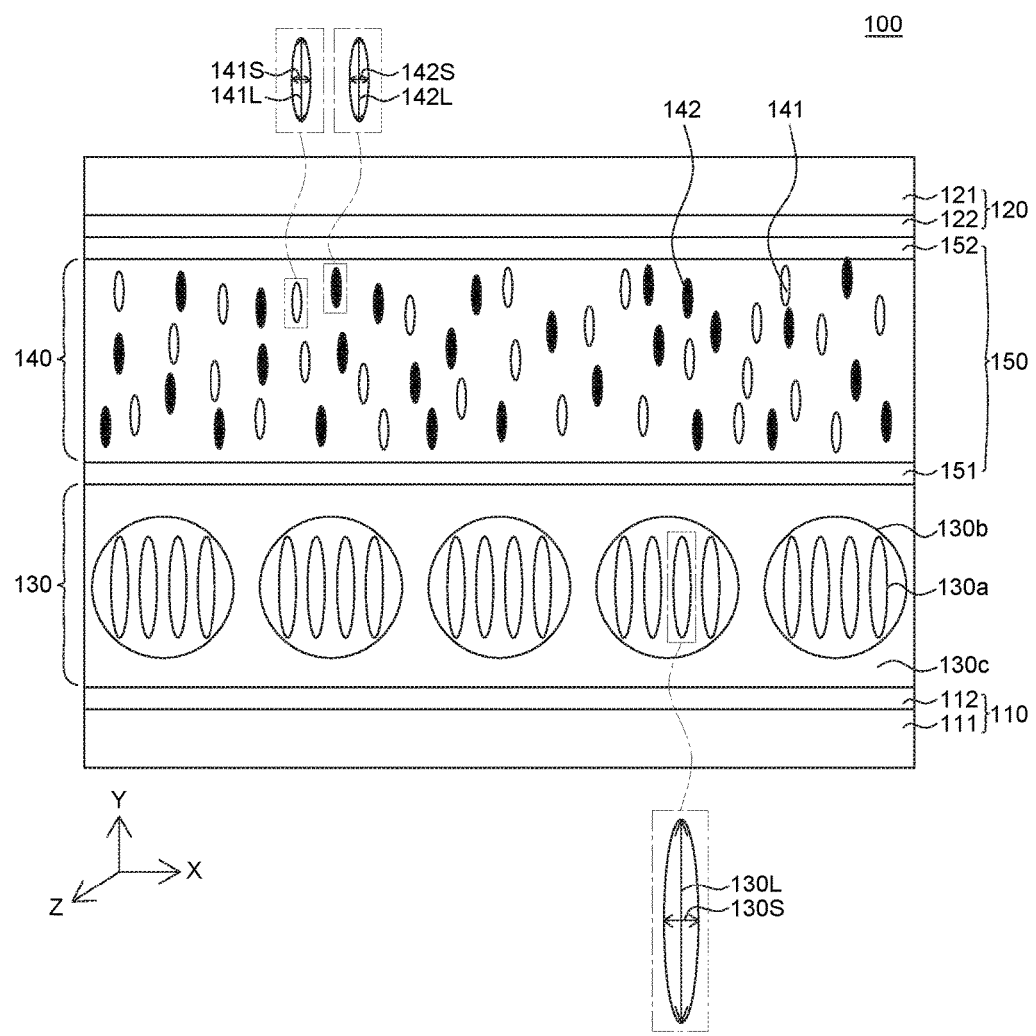
FIG. 1 is a cross-sectional view of a light control device according to an exemplary embodiment of the present invention.

Advantages and features of the present invention, and methods for accomplishing the same will be more clearly understood from exemplary embodiments described below with reference to the accompanying drawings. However, the present invention is not limited to the following exemplary embodiments but may be implemented in various different forms. The exemplary embodiments are provided only to complete disclosure of the present invention and to fully provide a person having ordinary skill in the art to which the present invention pertains with the category of the invention, and the present invention will be defined by the appended claims.

The shapes, sizes, ratios, angles, numbers, and the like illustrated in the accompanying drawings for describing the exemplary embodiments of the present invention are merely examples, and the present invention is not limited thereto. Like reference numerals generally denote like elements throughout the present specification. Further, in the following description, a detailed explanation of well-known related technologies may be omitted to avoid unnecessarily obscuring the subject matter of the present invention.

The terms such as "including," "having," and "consist of" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on", "above", "below", and "next", one or more parts may be positioned between the two parts unless the terms are used with the term "immediately" or "directly".

When the time sequence between two or more incidents is described using the terms such as "after", "subsequent to", "next to", and "before", two or more incidents may be inconsecutive unless the terms are used with the term "immediately" or "directly".

Although the terms "first", "second", and the like are used for describing various components, these components are not confined by these terms. These terms are merely used for distinguishing one component from the other components. Therefore, a first component to be mentioned below may be a second component in a technical concept of the present invention.

"X-axis direction", "Y-axis direction", and "Z-axis direction" should not be construed only as being in a geometric relationship in which these directions are perpendicular to each other, but may have a wider directionality in a range to which the configuration of the present invention can be functionally applied.

The term "at least one" should be understood as including all possible combinations which can be suggested from one or more relevant items. For example, the meaning of "at least one of a first item, a second item, and a third item" may be each one of the first item, the second item, or the third item and also be all possible combinations which can be suggested from two or more of the first item, the second item, and the third item.

The features of various exemplary embodiments of the present invention can be partially or entirely bonded to or combined with each other and can be interlocked and operated in technically various ways as can be fully understood by a person having ordinary skill in the art, and the various exemplary embodiments can be carried out independently of or in association with each other.

Hereinafter, exemplary embodiments of the present invention will be described in detail with reference to the accompanying drawings.

Figure 2:
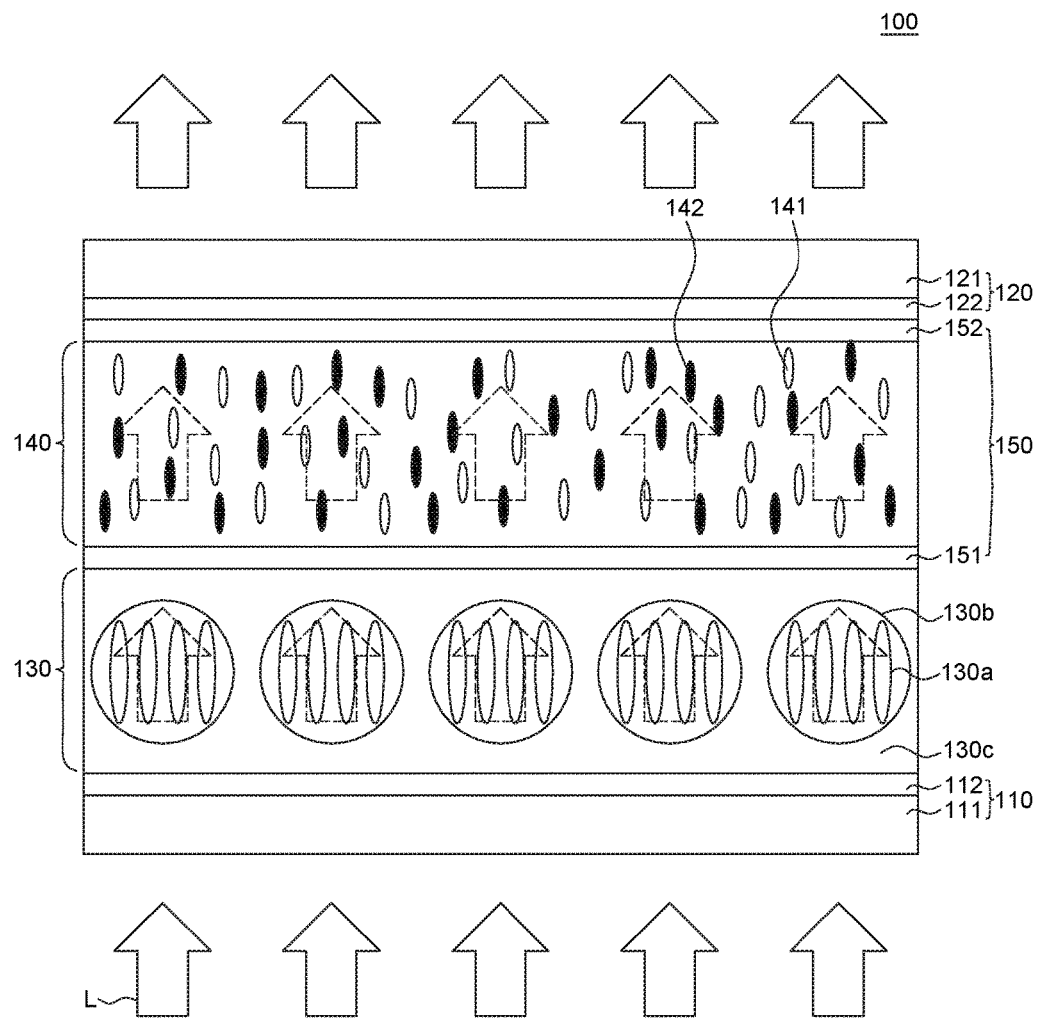
FIG. 2 is a cross-sectional view illustrating a transparent mode of the light control device illustrated in FIG. 1.
Figure 3:
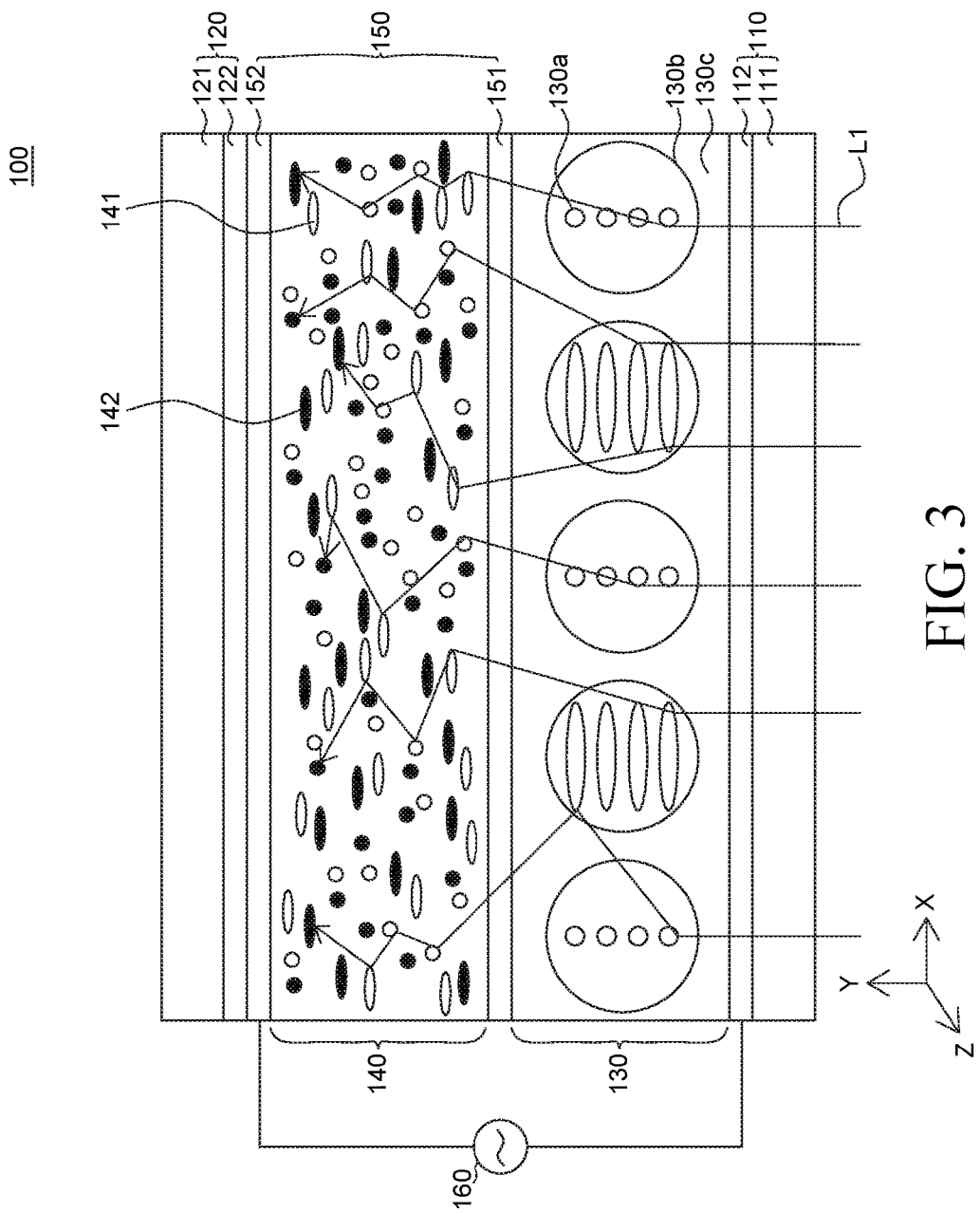
FIG. 3 is a cross-sectional view illustrating a light shielding mode of the light control device illustrated in FIG. 1.

FIG. 1 is a cross-sectional view of a light control device according to an exemplary embodiment of the present invention. FIG. 2 is a cross-sectional view illustrating a transparent mode of the light control device illustrated in FIG. 1. FIG. 3 is a cross-sectional view illustrating a light shielding mode of the light control device illustrated in FIG. 1. Referring to FIG. 1 through FIG. 3, a light control device 100 includes a first electrode unit 110, a second electrode unit 120, a first liquid crystal unit 130, a second liquid crystal unit 140, and an alignment unit 150.

Referring to FIG. 1, the first electrode unit 110 includes a first substrate 111 and a first electrode 112. More specifically, the first electrode unit 110 includes the first substrate 111 formed of a transparent material and the first electrode 112 positioned on the first substrate 111. The first substrate 111 may use, without limitation, a substrate used in a general display device or flexible display device. More specifically, the first substrate 111 may be formed of transparent glass or transparent plastic-based material, and for example, sheets or films including cellulose resin such as TAC (triacetyl cellulose) or DAC (diacetyl cellulose), a COP (cyclic olefin polymer) such as norbornene derivatives, COC (cyclo olefin copolymer), acrylic resin such as PMMA (poly(methylmethacrylate)), polyolefin such as PC (polycarbonate), PE (polyethylene), or PP (polypropylene), polyester such as PVA (polyvinyl alcohol), PES (poly ether sulfone), PEEK (polyetheretherketone), PEI (polyetherimide), PEN (polyethylenenaphthalate), or PET (polyethyleneterephthalate), PI (polyimide), PSF (polysulfone), fluoride resin, or the like may be used as the first substrate 111, but the present invention is not limited thereto.

The first electrode 112 is disposed on one surface of the first substrate 111 and has a shape without a pattern. The first electrode 112 is formed of a transparent conductive material which has conductivity and also transmits external light. For example, the first electrode 112 may be formed of a material selected from the group consisting of silver oxide (for example; AgO or $Ag_2O$ or $Ag_2O_3$), aluminum oxide (for example; $Al_2O_3$), tungsten oxide (for example; $WO_2$ or $WO_3$ or $W_2O_3$), magnesium oxide (for example; MgO), molybdenum oxide (for example; $MoO_3$), zinc oxide (for example; ZnO), tin oxide (for example; $SnO_2$), indium oxide (for example; $In_2O_3$), chromium oxide (for example; $CrO_3$ or $Cr_2O_3$), antimony oxide (for example; $Sb_2O_3$ or $Sb_2O_5$), titanium oxide (for example; $TiO_2$), nickel oxide (for example; NiO), copper oxide (for example; CuO or $Cu_2O$), vanadium oxide (for example; $V_2O_3$ or $V_2O_5$), cobalt oxide (for example; CoO), iron oxide (for example; $Fe_2O_3$ or $Fe_3O_4$), niobium oxide (for example; $Nb_2O_5$), indium tin oxide (for example; ITO), indium zinc oxide (for example; IZO), aluminum doped zinc oxide (for example; ZAO), aluminum doped tin oxide (for example; TAO), antimony tin oxide (for example; ATO), and the like, but is not limited thereto.

The second electrode unit 120 includes a second substrate 121 facing the first substrate 111, and a second electrode 122. More specifically, the second electrode unit 120 includes the second substrate 121 formed of a transparent material and the second electrode 122 positioned on the second substrate 121. The shapes and the materials of the second substrate 121 and the second electrode 122 in the second electrode unit 120 may be the same as the shapes and the materials of the second substrate 111 and the second electrode 112 in the first electrode unit 110, respectively. The first electrode 112 of the first electrode unit 110 and the second electrode 122 of the second electrode unit 120 are respectively disposed on and under the light control device 100, and, thus, the first electrode 112 and the second electrode 122 may be configured to apply a vertical electric field to a plurality of liquid crystal units 130 and 140.

In the above description, the plurality of electrode units 110 and 120 has been described as including the substrates 111 and 121 and the electrodes 112 and 122 formed on the substrates 111 and 121, respectively. However, the electrode units 110 and 120 may include only the electrodes 112 and 122, respectively, without a substrate. That is, the plurality of liquid crystal units 130 and 140 to be described later may be disposed between a plurality of electrodes 112 and 122 having a cylindrical electrode shape and facing each other.

Referring to FIG. 1, the light control device 100 includes the plurality of liquid crystal units 130 and 140 between the first electrode unit 110 and the second electrode unit 120. The plurality of liquid crystal units 130 and 140 includes the first liquid crystal unit 130 on the first electrode unit 110 and the second liquid crystal unit 140 between the first liquid crystal unit 120 and the second electrode unit 120.

The first liquid crystal unit 130 includes a droplet 130b including a liquid crystal 130a and a polymer dispersed liquid crystal (PDLC) including a polymer 130c. The liquid crystal 130a in the first liquid crystal unit 130 normally has a homeotropic state where the liquid crystal 130a is aligned perpendicularly to the first electrode unit 110 and the second electrode unit 120. A state where a voltage is not applied to the first electrode 112 and the second electrode 122 of the light control device 100 and an electric field is not applied to the first liquid crystal unit 130 is referred to as a normal state. Herein, a long axis 130L of the liquid crystal 130a in the first liquid crystal unit 130 is aligned in a vertical direction with respect to the first electrode unit 110 and the second electrode unit 120. Further, the liquid crystal 130a in the first liquid crystal unit 130 may be a negative liquid crystal which may be changed in alignment by a vertical (y-axis) electric field, but is not limited thereto. The first liquid crystal unit 130 except the droplet 130b is in a solid state due to the polymer 130c. Therefore, the first liquid crystal unit 130 can maintain a cell gap without a spacer or a wall.

The liquid crystal 130a in the first liquid crystal unit 130 has the long axis 130L and a short axis 130S. Herein, a refractive index of the short axis 130S of the first liquid crystal unit 130 is identical to a refractive index of the polymer 130c, and a refractive index of the long axis 130L is different from the refractive index of the polymer 130c. Generally, in a negative liquid crystal, a long axis has a higher refractive index than a short axis. Therefore, in the liquid crystal 130a in the first liquid crystal unit 130, the refractive index of the long axis 130L is higher than the refractive index of the short axis 130S. For example, if the liquid crystal 130a is a negative liquid crystal in which the short axis 130S has a refractive index of 1.4 and the long axis 130L has a refractive index of 1.5, the polymer 130c may be formed of a material having a refractive index identical to the refractive index of the short axis 130S of the liquid crystal 130a. Otherwise, if a refractive index of the polymer 130 is selected first, a negative liquid crystal in which the short axis 130S has a refractive index identical to the refractive index of the polymer 130c and the long axis 130L has a refractive index different from the refractive index of the polymer 130c may be used as the liquid crystal 130a.

The first liquid crystal unit 130 is prepared by mixing the liquid crystal 130a and a monomer which is converted into a polymer by light such as UV. That is, a photocurable monomer and the liquid crystal 130a are mixed to prepare a mixed liquid crystal, and then light is irradiated to the mixed liquid crystal, so that the monomer is converted into the polymer 130c in a solid state. In this process, the droplet 130b including the liquid crystal 130a is positioned within the polymer 130c.

The second liquid crystal unit 140 includes a guest-host liquid crystal (GHLC) including a liquid crystal 141 and a coloring member 142. The liquid crystal 141 in the second liquid crystal unit 140 normally has a homeotropic state where the liquid crystal 141 is aligned perpendicularly to the first electrode unit 110 and the second electrode unit 120. A state where a voltage is not applied to the first electrode 112 and the second electrode 122 of the light control device 100 and an electric field is not applied to the second liquid crystal unit 140 is referred to as a normal state. Herein, a long axis 141L of the liquid crystal 141 in the second liquid crystal unit 140 is aligned in a vertical direction with respect to the first electrode unit 110 and the second electrode unit 120. Further, the liquid crystal 141 in the second liquid crystal unit 140 may be a negative liquid crystal which may be changed in alignment by a vertical (y-axis) electric field, but is not limited thereto.

The alignment unit 150 is disposed on and under the second liquid crystal unit 140 in order for the liquid crystal 141 in the second liquid crystal unit 140 to be vertically aligned in a normal state. Specifically, the alignment unit 150 includes a first alignment film 151 disposed between the first liquid crystal unit 130 and the second liquid crystal unit 140 and a second alignment film 152 disposed between the second liquid crystal unit 140 and the second electrode unit 120.

The alignment unit 150 is formed of a vertical alignment material in order to normally align the liquid crystal 141 in the second liquid crystal unit 140 in a homeotropic state where the liquid crystal 141 is aligned perpendicularly to the first electrode unit 110 and the second electrode unit 120. The vertical alignment material of the alignment unit 150 may include, for example, one or a mixture of polyimide-based materials and phosphatidylcholine (PPC)-based materials. Besides, the alignment unit 150 may be formed by mixing hexadecyltrimethylammonium bromide (HTAB) or cetyl trimethyl ammonium bromide (CTAB), which is a vertical alignment material, with a solvent such as isopropyl alcohol (IPA), coating the mixture under the second electrode unit 120 or under the second liquid crystal unit 140, and then vaporizing the solvent.

The first alignment film 151 of the alignment unit 150 is positioned on the first liquid crystal unit 130, i.e., between the first liquid crystal unit 130 and the second liquid crystal unit 140. Thus, the first alignment film 151 can serve as a barrier layer that suppresses movement of the coloring member 142 included in the second liquid crystal unit 140 to another liquid crystal unit, i.e., the first liquid crystal unit 130, during a manufacturing process.

The liquid crystal 141 in the second liquid crystal unit 140 has the long axis 141L and a short axis 141S. Herein, a refractive index of the short axis 141S of the second liquid crystal unit 140 is identical to the refractive index of the short axis 130S of the liquid crystal 130a in the first liquid crystal unit 130 and the refractive index of the polymer 130c in the first liquid crystal unit 130, and a refractive index of the long axis 141L of the liquid crystal 141 in the second liquid crystal unit 140 is different from the refractive index of the short axis 141S. Further, the refractive index of the long axis 141L of the liquid crystal 141 in the second liquid crystal unit 140 may be different from the refractive index of the long axis 130L of the liquid crystal 130a in the first liquid crystal unit 130. In other words, the liquid crystal 141 in the second liquid crystal unit 140 and the liquid crystal 130a in the second liquid crystal unit 140 may be the same negative liquid crystal or may be negative liquid crystals identical only in a refractive index of a short axis.

The coloring member 142 is included in the second liquid crystal unit 140. More specifically, the coloring member 142 may be included in an uppermost liquid crystal unit among the plurality of liquid crystal units 130 and 140 described above. Referring to FIG. 1, the coloring member 142 has a long axis 142S and a short axis 142S and may be changed in alignment under the influence of an alignment direction of the liquid crystal 141 of the second liquid crystal unit 140 in which the coloring member 142 is positioned. That is, the coloring member 142 is normally aligned in a vertical direction with respect to the first electrode unit 110 and the second electrode unit 120 along with the liquid crystal 141 of the second liquid crystal unit 140. Thus, as the long axis 142L of the coloring member 142 is increased and the short axis 142S thereof is decreased, a high transparency can be maintained during a transparent mode and a high light shielding degree can be maintained during a light shielding mode.

More specifically, referring to FIG. 2, in a state where an electric field is not applied, a negative liquid crystal 140a is aligned perpendicularly to the first electrode unit 110 or the second electrode unit 120. Therefore, the coloring member 142 is also aligned perpendicularly to the first electrode unit 110 or the second electrode unit 120.

The coloring member 142 may be formed of a dye having a color, and may have one color of black, red, green, blue, and yellow or a combination color thereof. For example, if the light control device 100 is combined with a rear surface of a transparent display panel constituting a display device, a light incident from the rear surface needs to be shielded in order to improve image visibility while an image is displayed. Therefore, the coloring member 142 may be formed of a dye having a black color. Besides, a color of the coloring member 142 may be selectively changed depending on place and purpose of use of the light control device 100, so that it is possible to provide an aesthetic effect to the user.

Hereinafter, driving methods of a transparent mode and a light shielding mode of the light control device 100 will be described with reference to FIG. 2 and FIG. 3.

As illustrated in FIG. 2, in the normal state of the light control device 100, the liquid crystal 141 in the second liquid crystal unit 140 is perpendicular to the first electrode unit 110 and the second electrode unit 120. Thus, the coloring member 142 is also aligned in the vertical direction with respect to the first electrode unit 110 and the second electrode unit 120. Herein, the normal state includes a state where an electric field is not applied to the first electrode unit 110 and the second electrode unit 120 after a manufacturing process of the light control device 100 is completed or a state where there is no difference in voltage between the first electrode unit 110 and the second electrode unit 120.

As described above, the refractive index of the short axis 130S of the liquid crystal 130a in the first liquid crystal unit 130, the refractive index of the polymer 130c in the first liquid crystal unit 130, and the refractive index of the short axis 141S of the liquid crystal 141 in the second liquid crystal unit 140 are identical to each other. Therefore, in a state where an electric field is not applied to the first liquid crystal unit 130 and the second liquid crystal unit 140, a light L incident into the light control device 100 passes through the light control device 100. Further, the light L incident into the light control device 100 reaches the short axis 142S of the coloring member 142 which is relatively shorter than the long axis 142L of the coloring member 142. Therefore, an amount of the light L absorbed by the coloring member 142 is very small. Also, most of the light L passes through the first liquid crystal unit 130 and the second liquid crystal unit 140, and, thus, the light control device 100 can be implemented in a transparent mode in which a transparent state is maintained.

That is, in a state where an electric field is not applied to the second liquid crystal unit 140, the liquid crystal 130a in the first liquid crystal unit 130 and the liquid crystal 141 in the second liquid crystal unit 140 are aligned so as to transmit the light. Since the light L reaches a very small area of the coloring member 142, the light control device 100 can maintain a transparent state.

Therefore, in the normal state of the light control device 100, liquid crystals are aligned to transmit the light L incident from the outside. Thus, in the normal state, a transparent mode can be implemented. Accordingly, power consumption of the light control device 100 can be reduced.

As illustrated in FIG. 2, the liquid crystal 130a in the first liquid crystal unit 130 and the liquid crystal 141 in the second liquid crystal unit 140 are normally aligned in the homeotropic state. Therefore, in order to implement the light control device 100 in a light shielding mode, the alignment of the liquid crystal 130a in the first liquid crystal unit 130 and the liquid crystal 141 in the second liquid crystal unit 140 needs to be changed. Therefore, it is necessary to make a difference in voltage between the first electrode unit 110 and the second electrode unit 120. To this end, an electric field needs to be applied to the liquid crystal unit 130. Therefore, as illustrated in FIG. 3, a power supply may be connected to the first electrode 112 of the first electrode unit 110 and the second electrode 122 of the second electrode unit 120.

Specifically, in case of a negative liquid crystal, a short axis of the negative liquid crystal moves in parallel to a direction of an electrical field. Therefore, when a voltage is supplied to the first electrode unit 110 and the second electrode unit 120, a vertical electric field may be generated, so that the alignment of the liquid crystal 130a and the liquid crystal 141 may be changed. In this case, a difference in voltage applied to the first electrode unit 111 and the second electrode unit 112 is 5 V or more, but is not limited thereto.

Hereinafter, alignment of the liquid crystal 130a in the first liquid crystal unit 130 and the liquid crystal 141 and the coloring member 142 in the second liquid crystal unit 140 in a light shielding mode of the light control device 100 will be described with reference to FIG. 4A and FIG. 4B.

Figure 4A:
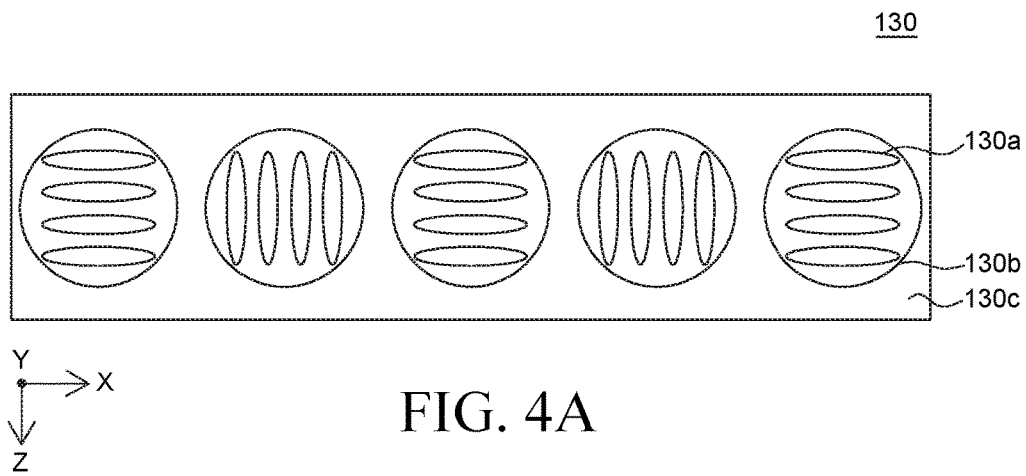
FIG. 4A is a schematic plan view of a first liquid crystal unit in a light shielding mode of the light control device illustrated in FIG. 1.

FIG. 4A is a schematic plan view of a first liquid crystal unit in a light shielding mode of the light control device illustrated in FIG. 1. FIG. 4B is a schematic plan view of a second liquid crystal unit in a light shielding mode of the light control device illustrated in FIG. 1.

First, referring to FIG. 3 and FIG. 4A, a voltage is applied to the first electrode unit 110 and the second electrode unit 120 and an electric field is applied to the first liquid crystal unit 130. Therefore, the liquid crystal 130a in the first liquid crystal unit 130 is aligned so as to scatter the light L incident from the outside.

That is, when an electric field is applied to the first liquid crystal unit 130, the liquid crystal 130a is aligned from a homeotropic state where the long axis 130L is aligned perpendicularly to the first electrode unit 110 and the second electrode unit 120 to a planar state. Thus, there is made a difference in refractive index between the polymer 130c and the liquid crystal 130a, so that the light L incident from the outside is scattered. Herein, the planar state refers to a state where the long axis 130L of the liquid crystal 130a is aligned parallel to the first electrode unit 110 and the second electrode unit 120. Therefore, the light L scattered by the first liquid crystal unit 130 may propagate toward the second liquid crystal unit 140.

In this regard, referring to FIG. 3 and FIG. 4A, when an electric field is applied to the first liquid crystal unit 130, the long axis 130L of the liquid crystal 130a in the first liquid crystal unit 130 lies in an X-axis direction or Z-axis direction. In this case, the liquid crystal 130a is in the planar state, and a light is scattered since the polymer 130c and the long axis 130L of the liquid crystal 130a are different from each other in refractive index.

An incident light path of the light L incident into the second liquid crystal unit 140 via the first liquid crystal unit 130 through light scattering is longer than an incident light path of the light L incident into the first liquid crystal unit 130. That is, the light L is scattered by the first liquid crystal unit 130, so that an incident light path of the light L is increased. Therefore, the light L with the increased incident light path is more likely to reach the coloring member 142 positioned within the second liquid crystal unit 140.

Subsequently, referring to FIG. 3 and FIG. 4B, a voltage is applied to the first electrode unit 110 and the second electrode unit 120 and an electric field is applied to the second liquid crystal unit 140. Therefore, the liquid crystal 141 in the second liquid crystal unit 140 is aligned so as to scatter the light L incident from the outside.

When an electric field is applied to the first liquid crystal unit 130 and the second liquid crystal unit 140, the liquid crystal 141 in the second liquid crystal unit 140 is aligned in a homeotropic state where the long axis 141L is aligned perpendicularly to the first electrode unit 110 and the second electrode unit 120. In this case, the liquid crystal 141 in the second liquid crystal unit 140 lies in an X-axis direction or Z-axis direction with respect to the first electrode unit 110 and the second electrode unit 120. Therefore, the liquid crystal 141 in the second liquid crystal unit 140 is in a planar state where the liquid crystal 141 is aligned parallel to the first electrode unit 110 and the second electrode unit 120. In this case, the light L incident through the first liquid crystal unit 130 is scattered by the liquid crystal 141 in the second liquid crystal unit 140.

In other words, when an electric field is applied to the second liquid crystal unit 140, the liquid crystal 141 in the second liquid crystal unit 140 is in the planar state where the long axis 141L is aligned parallel to the first electrode unit 110 and the second electrode unit 120 in order to scatter the light L. Herein, the light L primarily scattered by the first liquid crystal unit 130 is secondarily scattered by the liquid crystal 141 in the planar state within the second liquid crystal unit 140. Accordingly, the light path of the light L is further increased due to secondary scattering, and, thus, the light L is more likely to reach the coloring member 142.

When an electric field is applied to the second liquid crystal unit 140, the liquid crystal 141 is aligned in the planar state. In this case, the coloring member 142 lies according to a lying direction of the adjacent liquid crystal 141 (i.e., alignment direction of the liquid crystal 141) under the influence of the electric field. An alignment direction of the coloring member 142 is changed since the liquid crystal 141 is in a liquid state and the coloring member 142 is in a solid state. As a result, alignment of the solid coloring member 142 is changed according to a flowing direction of the liquid (i.e., a direction in which a state of the liquid crystal 141 is changed).

Figure 4B:
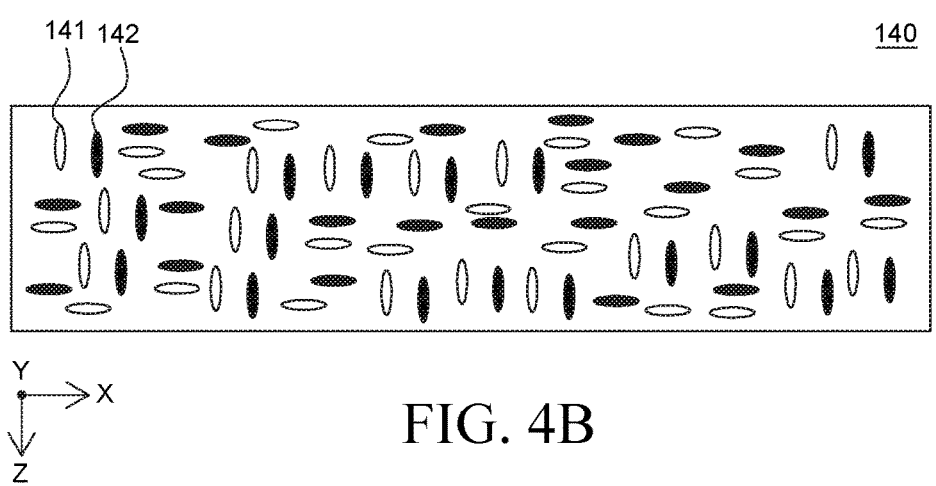
FIG. 4B is a schematic plan view of a second liquid crystal unit in a light shielding mode of the light control device illustrated in FIG. 1.

That is, referring to FIG. 3 and FIG. 4B, in a state where an electric field is applied to the second liquid crystal unit 140, the liquid crystal 141 is aligned in the planar state with respect to the first electrode unit 110 and the second electrode unit 120. Therefore, the coloring member 142 is affected by the adjacent liquid crystal 141 and thus aligned in the planar state with respect to the first electrode unit 110 and the second electrode unit 120.

For example, when the liquid crystal 141 lies in the X-axis direction, the adjacent coloring member 142 lies in the X-axis direction along with the liquid crystal 141, and when the liquid crystal 141 lies in the Z-axis direction, the adjacent coloring member 142 lies in the Z-axis direction along with the liquid crystal 141. Therefore, the long axis 142L of the coloring member 142 is aligned parallel to the first electrode unit 110 and the second electrode unit 120.

The light L scattered by the liquid crystal 130a in the first liquid crystal unit 130 and the liquid crystal 141 in the second liquid crystal unit 140 reaches the long axis 142L of the coloring member 142 which is relatively longer than the short axis 142S. Therefore, the light L reaches a very large area of the coloring member 142. Thus, most of the light L is absorbed by the coloring member 142.

That is, in a state where an electric field is applied, light scattering and light absorption occur at the same time within the second liquid crystal unit 140. Therefore, the light control device 100 may be driven in a light shielding mode in which a light shielding state is maintained while exhibiting a color, for example, black color, of the coloring member 142.

Then, if the electric field is removed from the first liquid crystal unit 130, the liquid crystal 130a in the first liquid crystal unit 130 is changed to the homeotropic state. In this case, the long axis 130L of the liquid crystal 130a in the first liquid crystal unit 130 is aligned perpendicularly to the first electrode unit 110 and the second electrode unit 120. In this case, the polymer 130c and the short axis 130S of the liquid crystal 130a are identical to each other in refractive index, and, thus, the light L may pass through the first liquid crystal unit 130 and propagate toward the second liquid crystal unit 140.

Further, if the electric field is removed from the second liquid crystal unit 140, the liquid crystal 141 in the second liquid crystal unit 140 is changed to the homeotropic state. In this case, the long axis 141L of the liquid crystal 141 in the second liquid crystal unit 140 is aligned perpendicularly to the first electrode unit 110 and the second electrode unit 120 again. In this case, the short axis 141S of the liquid crystal 141 has the same refractive index as the polymer 130c in the first liquid crystal unit 130 and the short axis 130S of the liquid crystal 130a, and, thus, the light L passing through the first liquid crystal unit 130 may pass through the second liquid crystal unit 140.

To sum up, as described above with reference to FIG. 1 through FIG. 3, the liquid crystal unit 130 scatters the light L and thus increases the incident light path of the light L. The second liquid crystal unit 140 includes the coloring member 142 having a color therein, and is disposed on the first liquid crystal unit 130. Therefore, the light control device 100 including the first liquid crystal unit 130 and the second liquid crystal unit 140 scatters the light L while being driven in a light shielding mode. Therefore, the scattered light L is more likely to be absorbed by the coloring member 142. Accordingly, the light control device 100 can readily implement a light shielding mode with a small amount of the coloring member 142. That is, if liquid crystal units are configured as exhibited in the light control device 100 according to an exemplary embodiment of the present invention, it is possible to implement a light shielding mode in which a color can be displayed with a small amount of the coloring member 142 and also possible to thin the light control device 100. Further, when the light control device 100 is driven in a transparent mode, most of the light L does not reach the coloring member 142 but passes through the first liquid crystal unit 130 and the second liquid crystal unit 140. Thus, the light control device 100 can provide a higher transparency than a light control device in which a single liquid crystal unit includes a coloring member.

Although FIG. 1 through FIG. 3 illustrate that the two liquid crystal units 130 and 140 are included in the light control device 100, the present invention is not limited thereto. The light control device 100 may include three or more liquid crystal units therein. That is, the light control device 100 may further include an additional liquid crystal unit including a polymer dispersed liquid crystal or a guest-host liquid crystal. Also, the light control device 100 may further include an additional liquid crystal unit including a polymer networked liquid crystal (PNLC).

Although FIG. 1 through FIG. 3 illustrate that the second liquid crystal unit 140 is disposed on the first liquid crystal unit 130 in the light control device 100, the present invention is not limited thereto. The first liquid crystal unit 130 may be disposed on the second liquid crystal unit 140.

Although FIG. 1 through FIG. 3 illustrate that the alignment unit 150 is disposed on and under the second liquid crystal unit 140, the alignment unit 150 may be disposed either on or under the second liquid crystal unit 140. Herein, preferably, the alignment unit 150 may be disposed under the second liquid crystal unit 140 in order to suppress movement of the material in the second liquid crystal unit 140 to the first liquid crystal unit 130.

FIG. 1 through FIG. 3 illustrate that the alignment unit 150 is positioned within the light control device 100 and outside the second liquid crystal unit 150. Herein, the alignment unit 150 may be formed of one of, for example, HTAB (hexadecyltrimethylammonium bromide), CTAB (cetyl trimethyl ammonium bromide), POSS (polyhedral oligomeric silsesquioxane), dendronized polymer, dendrimer, or mixtures thereof and then mixed with the second liquid crystal unit 140. However, a material of the alignment unit 150 is not limited thereto.

FIG. 1 through FIG. 3 illustrate that the coloring member 142 is included in the second liquid crystal unit 140. Herein, the coloring member 142 may be included in at least one liquid crystal unit among a plurality of liquid crystal units. That is, the coloring member 142 may be included in a single liquid crystal unit or may be included in a plurality of liquid crystal units.

Further, the coloring member 142 may be positioned in the first liquid crystal unit 130 in order to improve light shielding efficiency of the light control device 100 in a light shielding mode. In this case, the amount of the coloring member positioned in the first liquid crystal unit 130 may be smaller than that of the coloring member 142 positioned in the second liquid crystal unit 140. Therefore, the coloring member may not affect transparency when the light control device 100 is driven in a transparent mode.

In some exemplary embodiments, a sealing member may be further disposed at an edge of the light control device 100. More specifically, the sealing member may suppress a leakage of light scattered from the inside of the light control device 100 through a lateral side of the light control device 100 or an edge of the lateral side and also protect the light control device 100 from the outside.

In some exemplary embodiments, a size of the liquid crystal 130a in the first liquid crystal unit 130 may be different from that of the liquid crystal 141 in the second liquid crystal unit 140. In order to scatter the light L incident into the first liquid crystal unit 130 as much as possible, the liquid crystal 130a in the first liquid crystal unit 130 may have a relatively smaller size than the liquid crystal 141 in the second liquid crystal unit 140. That is, by increasing the number of the liquid crystals 130a included in a restricted space and also increasing a surface area of the liquid crystal 130a to scatter light, a light incident into the first liquid crystal unit 130 can be scattered as much as possible.

Figure 5:
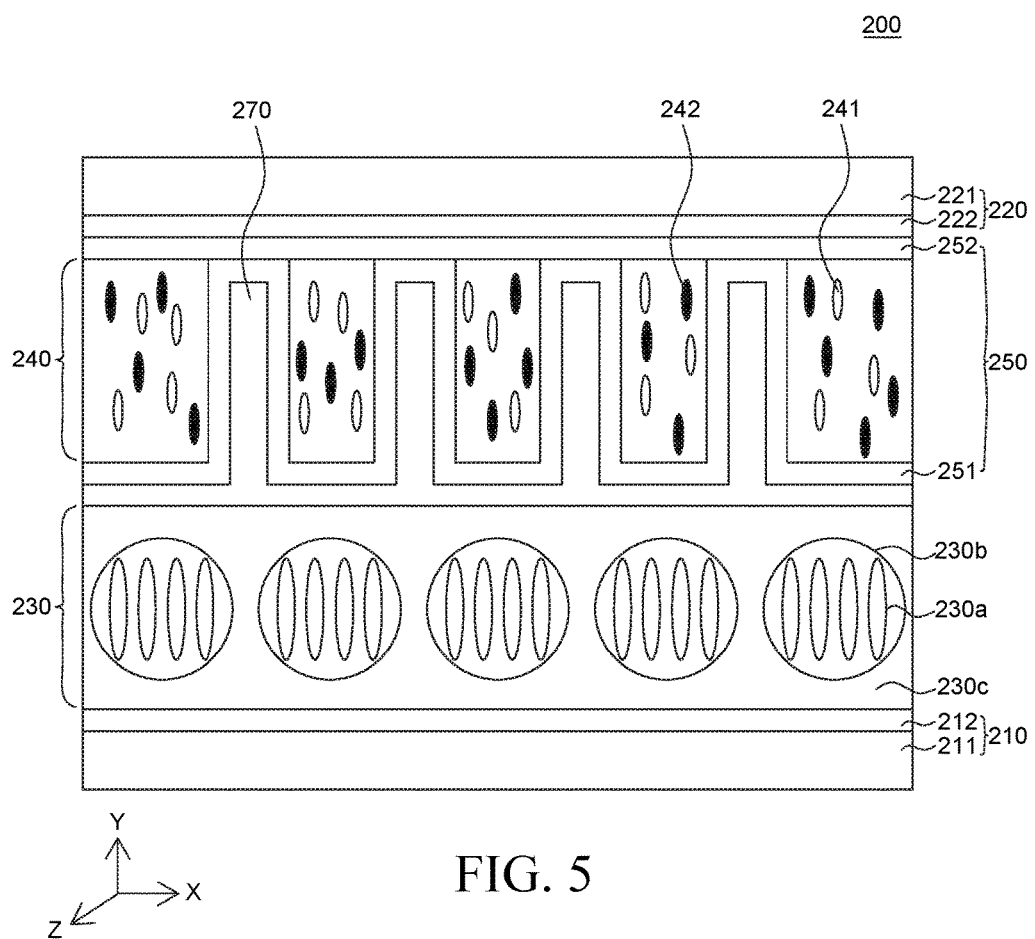
FIG. 5 is a cross-sectional view of a light control device according to another exemplary embodiment of the present invention.

FIG. 5 is a cross-sectional view of a light control device according to another exemplary embodiment of the present invention. Referring to FIG. 5, a light control device 200 includes a first electrode unit 210, a second electrode unit 220, a first liquid crystal unit 230, a second liquid crystal unit 240, an alignment unit 250, and a wall 270. The first electrode unit 210, the second electrode unit 220, the first liquid crystal unit 230, the second liquid crystal unit 240, and the alignment unit 250 illustrated in FIG. 5 are substantially the same as the first electrode unit 110, the second electrode unit 120, the first liquid crystal unit 130, the second liquid crystal unit 140, and the alignment unit 150 described above with reference to FIG. 1 through FIG. 3. Therefore, a detailed explanation of the first electrode unit 210, the second electrode unit 220, the first liquid crystal unit 230, the second liquid crystal unit 240, and the alignment unit 250 illustrated in FIG. 5 will be omitted.

Referring to FIG. 5, the light control device 200 includes the wall 270 which is disposed on the first liquid crystal unit 230 and positioned in the second liquid crystal unit 240.

As illustrated in FIG. 5, the wall 270 is formed into a convexo-concave shape. Between protruded portions of the wall 270, a liquid crystal 241 and a coloring member 242 of the second liquid crystal unit 240 are disposed. Therefore, the inside of the second liquid crystal unit 240 is divided into several spaces by the wall 270. In this case, the liquid crystal 241 and the coloring member 242 positioned in each divided space cannot move to another space. That is, in a structure where the coloring member 242 is positioned within a space formed by the wall 270, movement of the coloring member 242 is very limited. Therefore, the coloring member 242 may be uniformly distributed within the second liquid crystal unit 240. For example, the spaces divided by the wall 270 may have a difference of less than 1% in percentage of the liquid crystal 141 and the coloring member 142. If the spaces divided by the wall 270 has a difference of more than 1% in percentage of the liquid crystal 141 and the coloring member 142, the spaces may be different from each other in a transmittance ratio in a transparent mode and a light shielding ratio in a light shielding mode. Thus, in the light control device 200 according to another exemplary embodiment of the present invention, the wall 270 divides the space, so that a density of the coloring member 270 in a specific space cannot be increased due to a state of the light control device 200 or a force applied from the outside of the light control device 200. Therefore, the light control device 200 can provide a uniform light shielding ratio through all of the spaces while being driven in a light shielding mode.

The wall 270 may be formed of a transparent material that transmits light. For example, the wall 270 may be formed of one of a photo resist, polydimethylsiloxane, and a photo-curable polymer, but is not limited thereto.

The wall 270 may support the inside of the second liquid crystal unit 240. That is, the wall 270 supports between the first liquid crystal unit 230 and the second liquid crystal unit 240 and thus structurally stabilizes the light control device 200. Further, the wall 270 may protect the inside of the second liquid crystal unit 240 against a force applied from the outside. Therefore, the light control device 200 including the above-described wall 270 can be applied to a flexible display device.

A second alignment film 252 of the alignment unit 250 may include an adhesive material and thus may be bonded to a first alignment film 251 on the wall 270. In this case, as an area of the protruded portions of the wall 270 is increased, a bonding area between the first alignment film 251 and the second alignment film 252 is increased. Therefore, an adhesive strength between the first alignment film 251 and the second alignment film 252 may be increased. Accordingly, vulnerability of the second liquid crystal unit 240 to an external pressure can be supplemented, so that the flexible light control device 200 can be implemented. Further, if a first substrate 211 and a second substrate 221 are formed of a plastic material, the bonding area between the first alignment film 251 and the second alignment film 252 may be increased to increase the adhesive strength between the first alignment film 251 and the second alignment film 252. In this case, as the area of the protruded portions of the wall 270 is increased, a space for the liquid crystal 241 and the coloring member 242 in the second liquid crystal unit 240 is decreased, and a light shielding defect may occur in a light shielding mode. Accordingly, the area of the protruded portions of the wall 270 may be set in consideration of a light shielding ratio in a light shielding mode and the adhesive strength.

A driving method for the light control device 200 illustrated in FIG. 5 is substantially the same as the driving method for the light control device 100 described above with reference to FIG. 1 through FIG. 3. Therefore, a detailed explanation thereof will be omitted.

Figure 6:
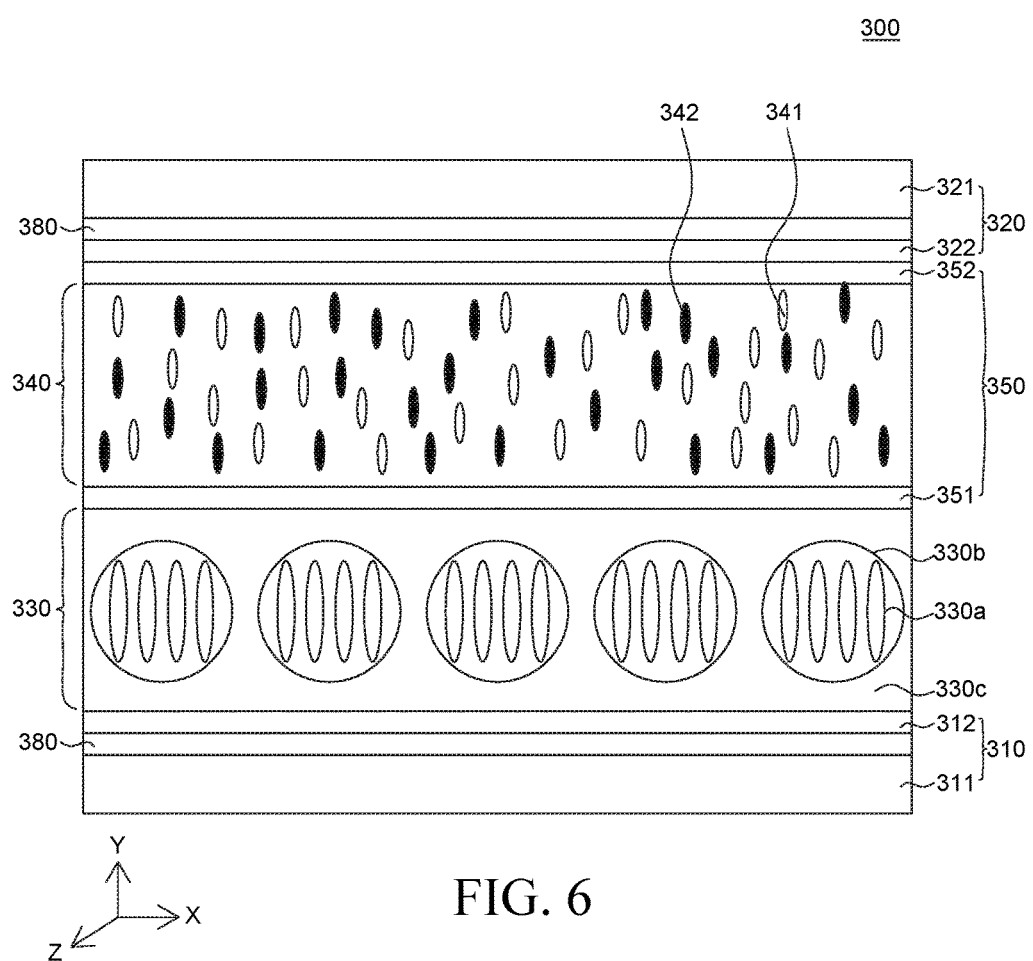
FIG. 6 is a cross-sectional view of a light control device according to yet another exemplary embodiment of the present invention.

FIG. 6 is a cross-sectional view of a light control device according to yet another exemplary embodiment of the present invention. Referring to FIG. 6, a light control device 300 includes a first electrode unit 310, a second electrode unit 320, a first liquid crystal unit 330, a second liquid crystal unit 340, an alignment unit 350, and refractive index matching layers 380. The first electrode unit 310, the second electrode unit 320, the first liquid crystal unit 330, the second liquid crystal unit 340, and the alignment unit 350 illustrated in FIG. 6 are substantially the same as the first electrode unit 110, the second electrode unit 120, the first liquid crystal unit 130, the second liquid crystal unit 140, and the alignment unit 150 described above with reference to FIG. 1 through FIG. 3. Therefore, a detailed explanation of the first electrode unit 310, the second electrode unit 320, the first liquid crystal unit 330, the second liquid crystal unit 340, and the alignment unit 350 illustrated in FIG. 6 will be omitted.

Referring to FIG. 6, the light control device 300 includes the refractive index matching layers 380 on and under a plurality of liquid crystal units 330 and 340. The refractive index matching layers 380 are respectively positioned within the first electrode unit 310 and within the second electrode unit 320. More specifically, the refractive index matching layers 380 are respectively positioned between the first substrate 311 and a first electrode 312 and between the second substrate 321 and a second electrode 322. Although FIG. 6 illustrates that the refractive index matching layers 380 are respectively positioned within the first electrode unit 310 and within the second electrode unit 320, the refractive index matching layer 380 may be positioned either within the first electrode unit 310 or within the second electrode unit 320. Further, the refractive index matching layer 380 may also be positioned between the first electrode unit 310 and the first liquid crystal unit 330 or between the second electrode unit 320 and the second liquid crystal unit 340. That is, the refractive index matching layer 380 may be positioned in any space between two components different in refractive index among the components constituting the light control device 300.

The refractive index matching layer 380 may be formed of, for example, a transparent adhesive film such as an OCA (optically clear adhesive), a thermally or UV curable organic compound adhesive, and the like.

If there is a difference in refractive index between layers adjacent to each other, Fresnel reflection may be generated due to the difference in reflective index. For example, if there is a difference in refractive index between the first substrate 311 and the first electrode 312, a light incident through the first substrate 311 may be reflected at an interface between the first substrate 311 and the first electrode 312 due to the difference in refractive index between the first substrate 311 and the first electrode 312. Therefore, the refractive index matching layer disposed between the first substrate 311 and the first electrode 312 may have a refractive index between a refractive index of the first substrate 311 and a refractive index of the first electrode 312 to reduce the difference in refractive index between the first substrate 311 and the first electrode 312. For example, if the first substrate 311 has a refractive index of about 1.6 and the first electrode 312 has a refractive index of about 1.8, the refractive index matching layer 380 between the first substrate 311 and the first electrode 312 may have a refractive index of 1.6 to 1.8. Likewise, the refractive index matching layer 380 between the second substrate 321 and the second electrode 322 may have a refractive index between a refractive index of the second substrate 321 and a refractive index of the second electrode 322.

Further, if the refractive index matching layer 380 is disposed between the first electrode unit 310 and the first liquid crystal unit 330, the refractive index matching layer 380 may have a refractive index between a refractive index of the first electrode 312 and a refractive index of the first liquid crystal unit 330. Furthermore, if the refractive index matching layer 380 is disposed between the second electrode unit 320 and the second liquid crystal unit 340, the refractive index matching layer 380 may have a refractive index between a refractive index of the second electrode 322 and a refractive index of the second liquid crystal unit 340.

Further, a refractive index of the alignment unit 350 may be set in consideration of refractive indexes of the components adjacent to the alignment unit 350.

In the light control device 300 according to another exemplary embodiment of the present invention, Fresnel reflection caused by a difference in refractive index between adjacent components can be minimized. To this end, the refractive index matching layer 380 having a refractive index between refractive indexes of the adjacent components is used. Therefore, a light incident from the outside of the light control device 300 can pass through the inside of the light control device 300 without having much loss. Therefore, while the light control device 300 is driven in a transparent mode and maintains a transparent state, an improved transparency can be provided to the user. Further, while the light control device 300 is driven in a light shielding mode and maintains a light shielding state, an improved light shielding ratio can be provided to the user.

Further, as described above, the refractive index matching layer 380 is formed of a transparent adhesive film such as an OCA or an insulating material such as a thermally or UV curable organic compound adhesive. Therefore, it is possible to suppress a short which may occur within the light control device 300. More specifically, when a pressure is physically applied to the light control device 300, the first electrode 312 and the second electrode 322 are brought into contact with each other, so that a short may occur within the light control device 300. Further, during a manufacturing process of the light control device 300, a micro impurity may be mixed with the first liquid crystal unit 330 and the second liquid crystal unit 340 or may be disposed on surfaces of the first substrate 311 and the second substrate 321. The impurity may serve as a conductor that enables electric connection between the first electrode unit 311 and the second electrode unit 320 within the first liquid crystal unit 330 and the second liquid crystal unit 340. However, since the refractive index matching layer 380 according to another exemplary embodiment of the present invention is formed of an insulating material as described above, the refractive index matching layer 380 may suppress occurrence of a short within the light control device 300 or may suppress deterioration in performance of the first electrode 312 and the second electrode 322 and thus can increase driving reliability of the light control device 300.

A driving method for the light control device 300 illustrated in FIG. 6 is substantially the same as the driving method for the light control device 100 described above with reference to FIG. 1 through FIG. 3. Therefore, a detailed explanation thereof will be omitted.

Figure 7A:
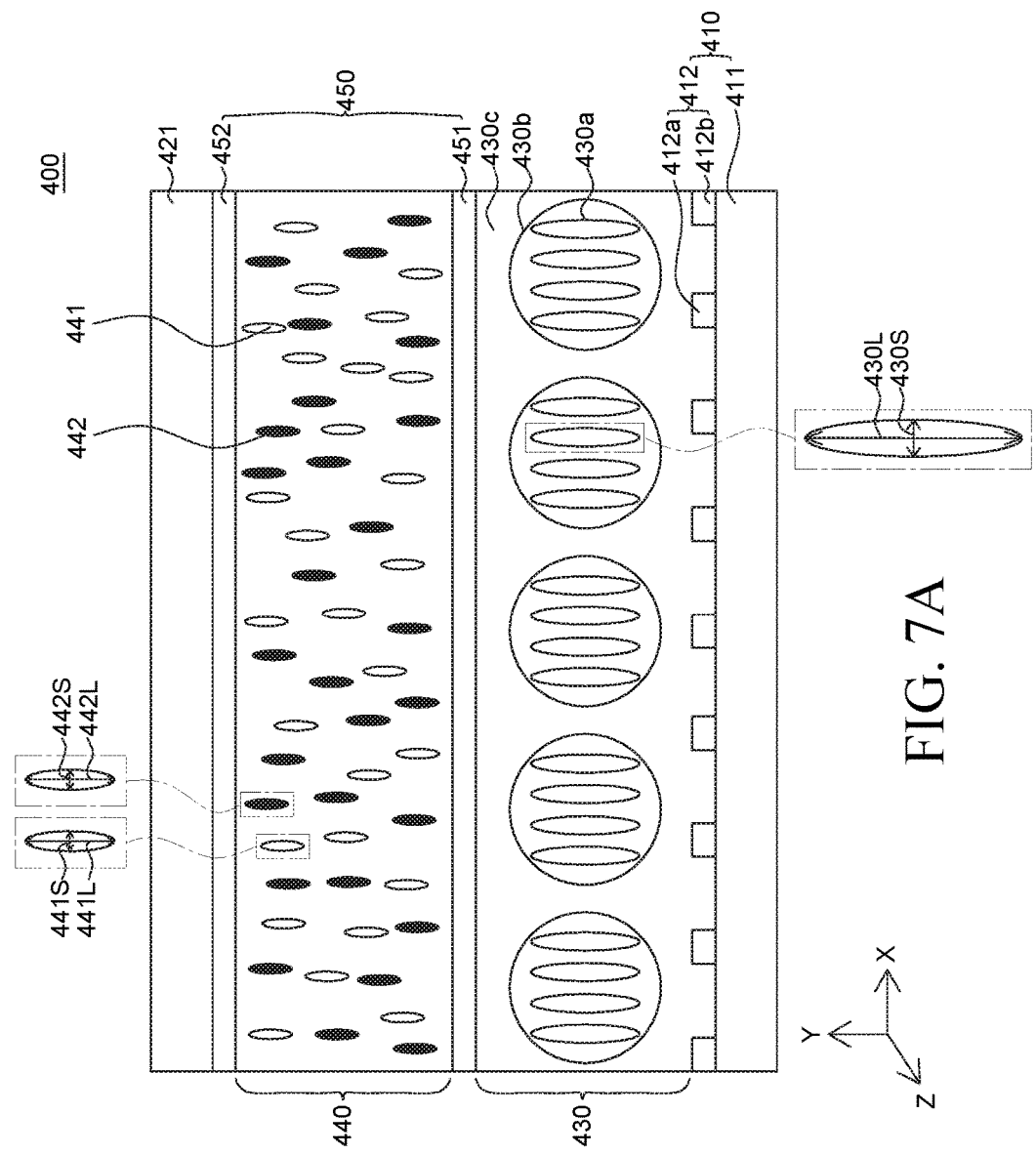
FIG. 7A and FIG. 7B are cross-sectional views of a light control device according to still another exemplary embodiment of the present invention.
Figure 7B:
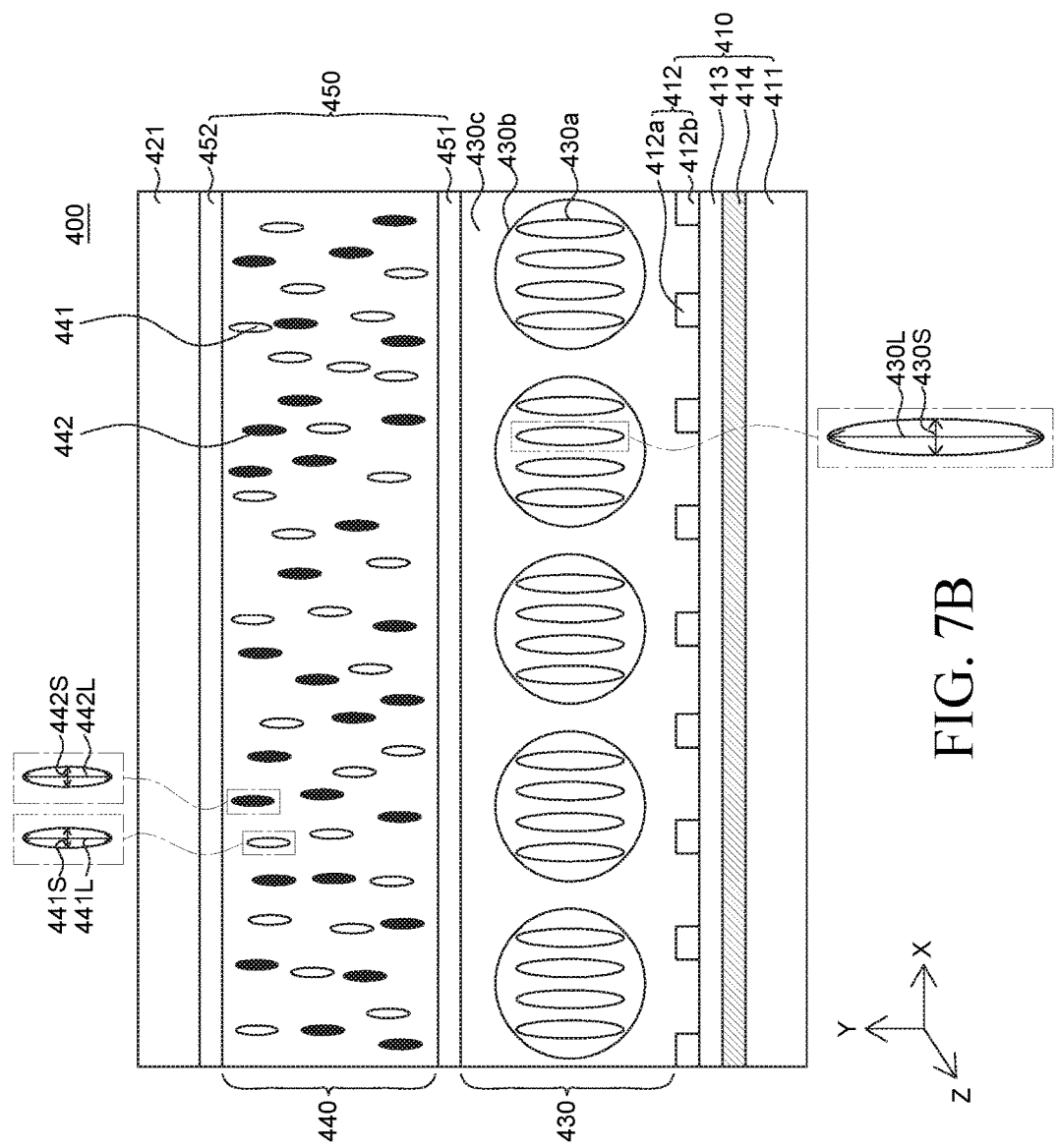

FIG. 7A and FIG. 7B are cross-sectional views of a light control device according to still another exemplary embodiment of the present invention. First, referring to FIG. 7A, a light control device 400 includes a first electrode unit 410, a second substrate 421, a first liquid crystal unit 430, a second liquid crystal unit 440, and an alignment unit 450. The alignment unit 450 illustrated in FIG. 7A is substantially the same as the alignment unit 150 described above with reference to FIG. 1 through FIG. 3. Therefore, a detailed explanation of the alignment unit 450 illustrated in FIG. 7A will be omitted.

Referring to FIG. 7A, the first electrode unit 410 includes a first substrate 411 and a first electrode 412. The first substrate 411 is substantially the same as the first substrate 111 described above with reference to FIG. 1 through FIG. 3. Therefore, detailed explanation thereof will be omitted. The first electrode 412 is formed of a transparent conductive material which has conductivity and also transmits external light.

The first electrode 412 includes a plurality of pattern electrodes 412a and 412b. Specifically, the first electrode 412 includes the plurality of pattern electrodes 412a and 412b configured to apply a horizontal electric field to a plurality of liquid crystal units 430 and 440. For example, when a positive (+) voltage is applied to the pattern electrode 412a and a negative (−) voltage is applied to the pattern electrode 412b adjacent to the pattern electrode 412a, a horizontal electric field may be applied to the plurality of liquid crystal units 430 and 440.

The first liquid crystal unit 430 includes a droplet 430b including a liquid crystal 430a and a polymer dispersed liquid crystal (PDLC) including a polymer 430c. The liquid crystal 430a in the first liquid crystal unit 430 normally has a homeotropic state where the liquid crystal 430a is aligned perpendicularly to the first electrode unit 410 and a second electrode unit 420. Further, the liquid crystal 430a in the first liquid crystal unit 430 may be a positive liquid crystal which may be changed in alignment by a horizontal (x-axis) electric field, but is not limited thereto. The first liquid crystal unit 430 except the droplet 430b is in a solid state due to the polymer 430c. The liquid crystal 430a in the first liquid crystal unit 430 has a long axis 430L and a short axis 430S. Herein, a refractive index of the short axis 430S of the liquid crystal 430a in the first liquid crystal unit 430 is identical to a refractive index of the polymer 430c and a refractive index of the long axis 430L is different from the refractive index of the polymer 430c.

The second liquid crystal unit 440 is disposed on the first liquid crystal unit 430 and a first alignment film 451 of the alignment unit 450. The second liquid crystal unit 440 includes a guest-host liquid crystal (GHLC) including a liquid crystal 441 and a coloring member 442. The liquid crystal 441 in the second liquid crystal unit 440 normally has a homeotropic state where the liquid crystal 441 is aligned perpendicularly to the first electrode unit 410 and the second electrode unit 420. Further, the liquid crystal 441 in the second liquid crystal unit 440 may be a positive liquid crystal which may be changed in alignment by a horizontal (x-axis) electric field, but is not limited thereto. The liquid crystal 441 in the second liquid crystal unit 440 has a long axis 441L and a short axis 441S. Herein, a refractive index of the short axis 441S of the liquid crystal 441 in the second liquid crystal unit 440 is identical to the refractive index of the short axis 430S of the liquid crystal 430a in the first liquid crystal unit 430 and the refractive index of the polymer 430c in the first liquid crystal unit 430. A refractive index of the long axis 441L of the liquid crystal 441 in the second liquid crystal unit 440 is different from the refractive index of the short axis 441S of the liquid crystal 441 in the second liquid crystal unit 440. Further, the refractive index of the long axis 441L of the liquid crystal 441 in the second liquid crystal unit 440 may be different from the refractive index of the long axis 430L of the liquid crystal 430a in the first liquid crystal unit 430. In other words, the liquid crystal 430a in the second liquid crystal unit 440 and the liquid crystal 441 in the second liquid crystal unit 440 may be the same positive liquid crystal, or may be positive liquid crystals identical only in a refractive index of a short axis. The coloring member 442 in the second liquid crystal unit 440 is substantially the same as the coloring member 142 described above with reference to FIG. 1 through FIG. 3. Therefore, a detailed explanation thereof will be omitted.

The second substrate 421 is disposed on the second liquid crystal unit 440 and a second alignment film 452 of the alignment unit 450. In the light control device 400 according to still another exemplary embodiment of the present invention unlike the light control device 100 illustrated in FIG. 1 through FIG. 3, only the second substrate 421 is disposed on the second liquid crystal unit 440 but any additional electrode is not disposed thereon.

Next, referring to FIG. 7B, the first electrode unit 410 of the light control device 400 includes the first substrate 411, the first electrode 412, an insulating layer 413, and a common electrode 414. Specifically, the first electrode 412 including the plurality of pattern electrodes 412a and 412b configured to apply a horizontal electric field to the plurality of liquid crystal units 430 and 440 is disposed on the first substrate 411, the insulating layer 413 is disposed between the first substrate 411 and the first electrode 412, and the common electrode 414 is disposed between the insulating layer 413 and the first substrate 411.

The common electrode 414 is formed into a layer shape on the first substrate 411. The common electrode 414 may be formed of a transparent conductive material which has conductivity and also transmits external light. The common electrode 414 may be formed of the same material as, for example, the first electrode 412.

The insulating layer 413 insulates the first electrode 412 and the common electrode 414. The insulating layer 413 may be formed of, for example, an inorganic insulating material such as silicon oxide or silicon nitride, but is not sure to be limited thereto. That is, the insulating layer 413 may be formed of an organic insulating material such as photo acryl or benzocyclobutene (BCB).

The first electrode 412 and the common electrode 414 are configured to apply a horizontal electric field to the plurality of liquid crystal units 430 and 440. Specifically, voltages having different polarities may be supplied to the first electrode 412 and the common electrode 414, respectively. For example, when a positive (+) voltage is applied to the plurality of pattern electrodes 412a and 412b of the first electrode 412 and a negative (−) voltage is applied to the common electrode, a horizontal electric field may be applied to the plurality of liquid crystal units 430 and 440.

Hereinafter, driving methods of a transparent mode and a light shielding mode of the light control device 400 illustrated in FIG. 7A and FIG. 7B will be described.

In the normal state of the light control device 400, the liquid crystal 441 in the second liquid crystal unit 440 is perpendicular to the first electrode unit 410 and the second electrode unit 420. Thus, the coloring member 442 is also aligned in a vertical direction with respect to the first electrode unit 410 and the second electrode unit 420. As described above, the refractive index of the short axis 430S of the liquid crystal 430a in the first liquid crystal unit 430, the refractive index of the polymer 430c in the first liquid crystal unit 430, and the refractive index of the short axis 441S of the liquid crystal 441 in the second liquid crystal unit 440 are identical to each other. Therefore, in a state where an electric field is not applied to the first liquid crystal unit 430 and the second liquid crystal unit 440, a light incident into the light control device 400 passes through the light control device 400. Further, the light incident into the light control device 400 reaches a short axis 442S of the coloring member 442 which is relatively shorter than a long axis 442L of the coloring member 442. Therefore, an amount of the light absorbed by the coloring member 442 is very small. Also, most of the light passes through the first liquid crystal unit 430 and the second liquid crystal unit 440, and, thus, the light control device 400 can be implemented in a transparent mode in which a transparent state is maintained. That is, in the normal state of the light control device 400, liquid crystals are aligned to transmit a light incident from the outside. Thus, in the normal state, the light control device 400 can implement a transparent mode. Accordingly, power consumption of the light control device 400 can be reduced.

In case of a positive liquid crystal, a long axis of the positive liquid crystal moves toward a direction of an electrical field. Therefore, when a voltage is supplied to the plurality of pattern electrodes 412a and 412b of the first electrode unit 410 or the plurality of pattern electrodes 412a and 412b and the common electrode 414, a horizontal electric field may be generated, so that the alignment of the liquid crystal 430a and the liquid crystal 441 may be changed.

When a voltage is supplied to the plurality of pattern electrodes 412a and 412b or the plurality of pattern electrodes 412a and 412b and the common electrode 414, an electric field is generated in the first liquid crystal unit 430. In this case, the liquid crystal 430a in the first liquid crystal unit 430 is aligned so as to scatter the light incident from the outside. That is, when an electric field is applied to the first liquid crystal unit 430, the liquid crystal 430a is aligned from a homeotropic state where the long axis 430L is aligned perpendicularly to the first electrode unit 410 and the second electrode unit 420 to a planar state. Thus, there is made a difference in refractive index between the polymer 430c and the liquid crystal 430a, so that the light incident from the outside is scattered. An incident light path of the light incident into the second liquid crystal unit 440 via the first liquid crystal unit 430 through light scattering is longer than an incident light path of the light incident into the first liquid crystal unit 430. Since an incident light path of the light scattered by the first liquid crystal unit 430 is increased as such, the light is more likely to reach the coloring member 442 positioned within the second liquid crystal unit 440.

When a voltage is supplied to the plurality of pattern electrodes 412*a* and 412*b* or the plurality of pattern electrodes 412*a* and 412*b* and the common electrode 414, an electric field is generated in the second liquid crystal unit 440. In this case, the liquid crystal 441 in the second liquid crystal unit 440 lies in an X-axis direction or Z-axis direction with respect to the first electrode unit 410 and the second electrode unit 420 in a homeotropic state where the long axis 441L is aligned perpendicularly to the first electrode unit 410 and the second electrode unit 420. Therefore, the light incident through the first liquid crystal unit 430 is scattered by the liquid crystal 441 in the second liquid crystal unit 440.

Accordingly, the light primarily scattered by the first liquid crystal unit 430 is secondarily scattered by the liquid crystal 441 in the planar state within the second liquid crystal unit 440. Therefore, the light path of the light primarily scattered by the first liquid crystal unit 430 is further increased due to secondary scattering within the second liquid crystal unit 440, and, thus, the light is more likely to reach the coloring member 442.

If an electric field is applied to the second liquid crystal unit 440 and the liquid crystal 441 is aligned in the planar state, the coloring member 442 lies according to a lying direction of the adjacent liquid crystal 441 (i.e., alignment direction of the liquid crystal 441) under the influence of the electric field.

Therefore, the light scattered by the liquid crystal 430*a* in the first liquid crystal unit 430 and the liquid crystal 441 in the second liquid crystal unit 440 reaches the long axis 442L of the coloring member 442 which is relatively longer than the short axis 442S of the coloring member 442. Therefore, the light reaches a very large area of the coloring member 442. Thus, most of the light is absorbed by the coloring member 442. That is, in a state where an electric field is applied, light scattering and light absorption occur at the same time within the second liquid crystal unit 440. Therefore, the light control device 400 may be driven in a light shielding mode in which a light shielding state is maintained while exhibiting a color, for example, black color, of the coloring member 442.

Although not illustrated in FIG. 7A and FIG. 7B, the wall 270 and the refractive index matching layer 380 illustrated in FIG. 5 and FIG. 6 may also be applied to the light control device 400.

Figure 8:
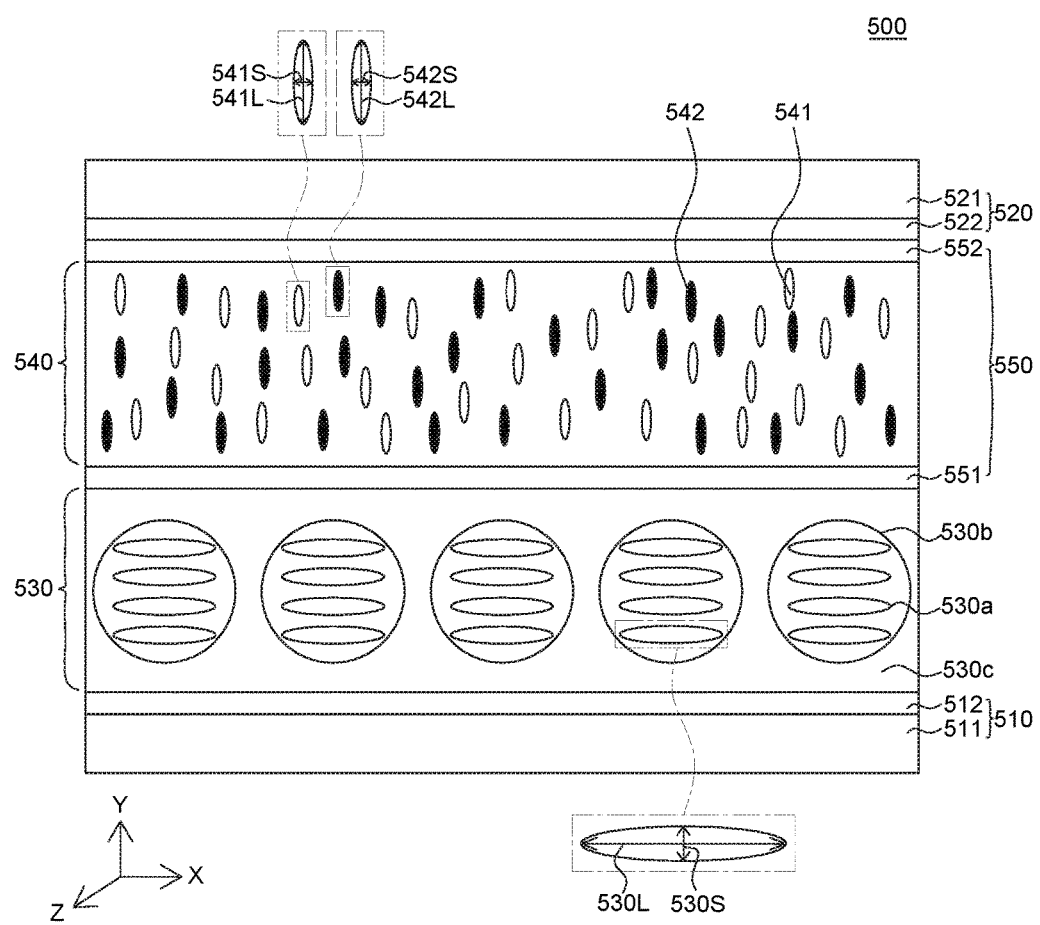
FIG. 8 is a cross-sectional view of a light control device according to still another exemplary embodiment of the present invention.

FIG. 8 is a cross-sectional view of a light control device according to still another exemplary embodiment of the present invention. Referring to FIG. 8, a light control device 500 includes a first electrode unit 510, a second electrode unit 520, a first liquid crystal unit 530, a second liquid crystal unit 540, and an alignment unit 550. The first electrode unit 510, the second electrode unit 520, the second liquid crystal unit 540, and the alignment unit 550 illustrated in FIG. 8 are substantially the same as the first electrode unit 110, the second electrode unit 120, the second liquid crystal unit 140, and the alignment unit 150 described above with reference to FIG. 1 through FIG. 3. Therefore, a detailed explanation of the first electrode unit 510, the second electrode unit 520, the second liquid crystal unit 540, and the alignment unit 550 illustrated in FIG. 8 will be omitted.

Referring to FIG. 8, the first liquid crystal unit 530 includes a droplet 530*b* including a liquid crystal 530*a* and a polymer dispersed liquid crystal (PDLC) including a polymer 530*c*. The liquid crystal 530*a* in the first liquid crystal unit 530 normally has a planar state where the liquid crystal 530*a* is aligned parallel to the first electrode unit 510 and the second electrode unit 520. That is, in a normal state where a voltage is not applied to a first electrode 512 and a second electrode 522 of the light control device 500 and an electric field is not applied to the first liquid crystal unit 530, a long axis 530L of the liquid crystal 530*a* in the first liquid crystal unit 530 is aligned in a horizontal direction with respect to the first electrode unit 510 and the second electrode unit 520. Further, the liquid crystal 530*a* in the first liquid crystal unit 530 may be a positive liquid crystal which may be changed in alignment by a horizontal (x-axis) electric field, but is not limited thereto. The first liquid crystal unit 530 except the droplets 530*b* is in a solid state due to the polymer 530*c*.

The liquid crystal 530*a* in the first liquid crystal unit 530 has the long axis 530L and a short axis 530S. Herein, a refractive index of the long axis 530L of the liquid crystal 530*a* in the first liquid crystal unit 530 is identical to a refractive index of the polymer 530*c* and a refractive index of the short axis 530S is different from the refractive index of the polymer 530*c*. Further, the refractive index of the long axis 530L of the liquid crystal 530*a* in the first liquid crystal unit 530 is identical to a short axis 541S of a liquid crystal 541 in the second liquid crystal unit 540.

Hereinafter, driving methods of a transparent mode and a light shielding mode of the light control device 500 illustrated in FIG. 8 will be described.

As described above, the refractive index of the long axis 530L of the liquid crystal 530*a* in the first liquid crystal unit 530, the refractive index of the polymer 530*c* in the first liquid crystal unit 530, and the refractive index of the short axis 541S of the liquid crystal 541 in the second liquid crystal unit 540 are identical to each other. Therefore, in the normal state of the light control device 500, i.e., a state where an electric field is not applied to the first liquid crystal unit 530 and the second liquid crystal unit 540, a light incident into the light control device 500 passes through the light control device 500. Accordingly, in the normal state of the light control device 500, liquid crystals are aligned to transmit a light incident from the outside. Thus, in the normal state, the light control device 500 can implement a transparent mode. Therefore, power consumption of the light control device 500 can be reduced.

In case of a positive liquid crystal, a long axis of the positive liquid crystal moves toward a direction of an electrical field, and in case of a negative liquid crystal, a short axis of the negative liquid crystal moves toward a direction of an electric field. Therefore, when a voltage is supplied to the first electrode 512 and the second electrode 522 and a vertical electric field is generated, the alignment of the liquid crystal 530*a* as a positive liquid crystal in the first liquid crystal unit 530 and the liquid crystal 541 as a negative liquid crystal in the second liquid crystal unit 540 may be changed.

When a voltage is supplied to the first electrode 512 and the second electrode 522 and an electric field is applied to the first liquid crystal unit 530, the liquid crystal 530*a* in the first liquid crystal unit 530 is aligned so as to scatter the light incident from the outside. That is, when an electric field is applied to the first liquid crystal unit 530, the liquid crystal 530*a* is changed to a homeotropic state where the long axis 530L is aligned perpendicularly to the first electrode unit 510 and the second electrode unit 520. Thus, there is made a difference in refractive index between the polymer 530c and the liquid crystal 530a, so that the light incident from the outside is scattered.

When a voltage is applied to the first electrode 512 and the second electrode 522 and an electric field is applied to the second liquid crystal unit 540, the liquid crystal 541 in the second liquid crystal unit 540 lies. In this case, a long axis 541L of the liquid crystal 541 in the second liquid crystal unit 540 indicates an X-axis direction or Z-axis direction with respect to the first electrode unit 510 and the second electrode unit 520. Accordingly, the light incident through the first liquid crystal unit 530 is scattered by the liquid crystal 541 in the second liquid crystal unit 540.

Accordingly, the light primarily scattered by the first liquid crystal unit 530 is secondarily scattered by the liquid crystal 541 in the planar state within the second liquid crystal unit 540. Therefore, a light path of the light primarily scattered by the first liquid crystal unit 530 is further increased due to secondary scattering within the second liquid crystal unit 540, and, thus, the light is more likely to reach a coloring member 542.

If an electric field is applied to the second liquid crystal unit 540 and the liquid crystal 541 is aligned in the planar state, the coloring member 542 lies according to a lying direction of the adjacent liquid crystal 541 under the influence of the electric field. Therefore, the light scattered by the liquid crystal 530a in the first liquid crystal unit 530 and the liquid crystal 541 in the second liquid crystal unit 540 reaches a long axis 542L of the coloring member 542 which is relatively longer than a short axis 542S of the coloring member 542. Therefore, the light reaches a very large area of the coloring member 542. Thus, most of the light is absorbed by the coloring member 542. In this case, the light control device 500 may be driven in a light shielding mode in which a light shielding state is maintained while exhibiting a color, for example, black color, of the coloring member 542.

Although not illustrated in FIG. 8, the wall 270 and the refractive index matching layer 380 illustrated in FIG. 5 and FIG. 6 may also be applied to the light control device 500.

Figure 9A:
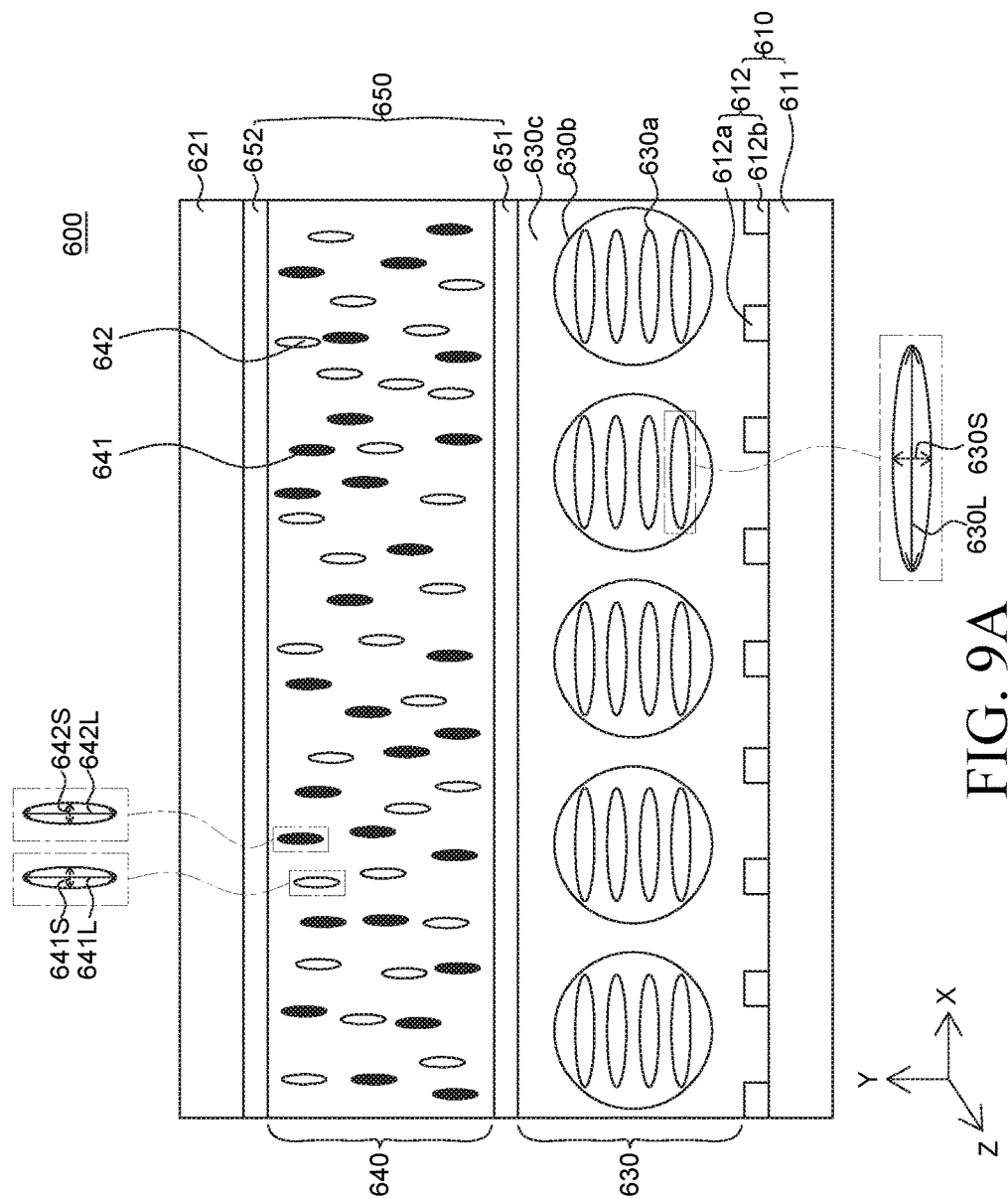
FIG. 9A and FIG. 9B are cross-sectional views of a light control device according to still another exemplary embodiment of the present invention.
Figure 9B:
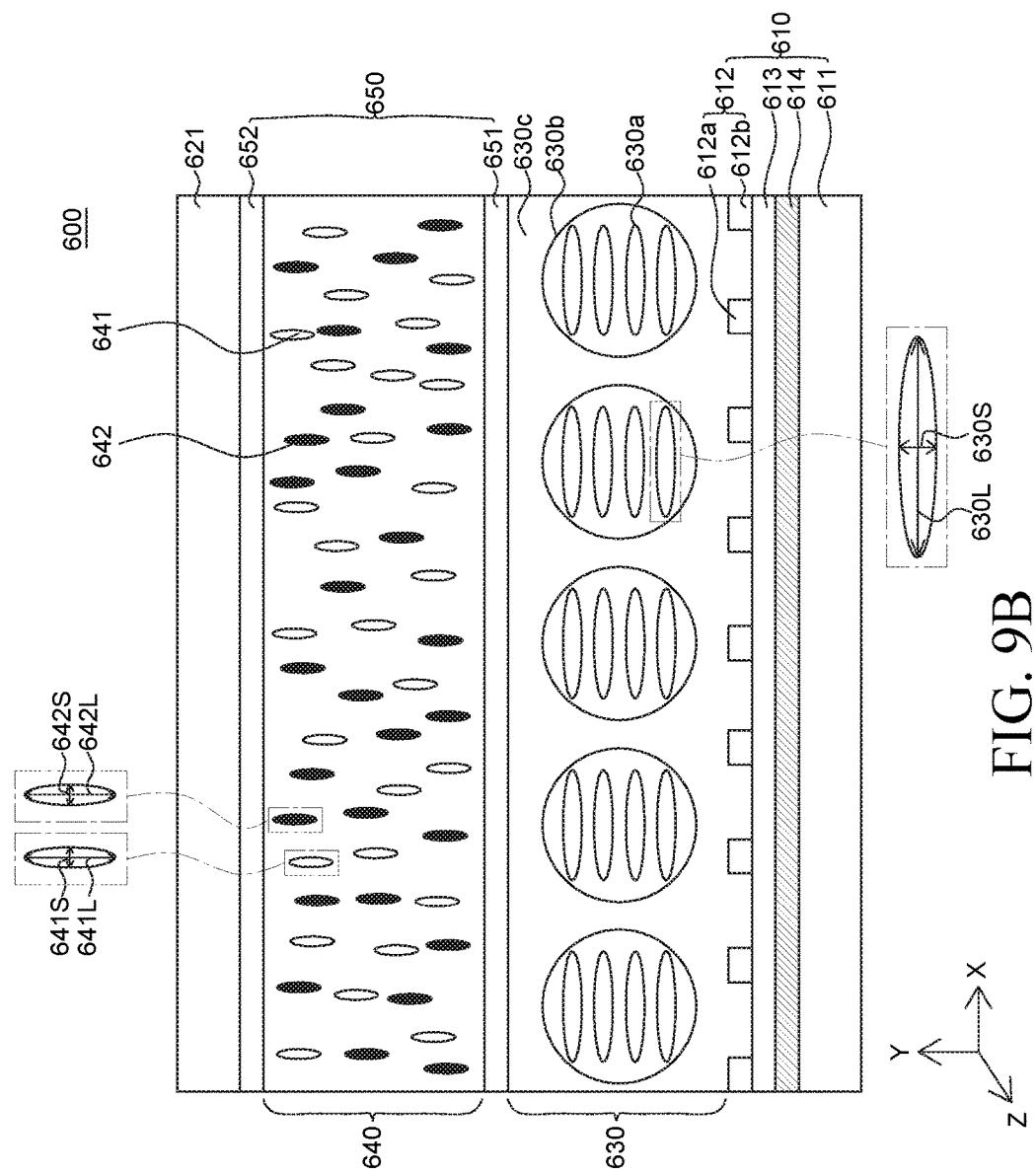

FIG. 9A and FIG. 9B are cross-sectional views of a light control device according to still another exemplary embodiment of the present invention. Referring to FIG. 9A, a light control device 600 includes a first electrode unit 610, a second substrate 621, a first liquid crystal unit 630, a second liquid crystal unit 640, and an alignment unit 650. The first electrode unit 610, the second substrate 621, the second liquid crystal unit 640, and the alignment unit 650 illustrated in FIG. 9A are substantially the same as the first electrode unit 410, the second substrate 421, the second liquid crystal unit 440, and the alignment unit 450 described above with reference to FIG. 7A and FIG. 7B. Therefore, a detailed explanation of the first electrode unit 610, the second substrate 621, the second liquid crystal unit 640, and the alignment unit 650 illustrated in FIG. 9A will be omitted.

Referring to FIG. 9A, the first liquid crystal unit 630 includes a droplet 630b including a liquid crystal 630a and a polymer dispersed liquid crystal (PDLC) including a polymer 630c. The liquid crystal 630a in the first liquid crystal unit 630 normally has a planar state where the liquid crystal 630a is aligned parallel to the first electrode unit 610 and a second electrode unit 620. That is, in a normal state where a voltage is not applied to a first electrode 612 and a second electrode 622 of the light control device 600 and an electric field is not applied to the first liquid crystal unit 630, a long axis 630L of the liquid crystal 630a in the first liquid crystal unit 630 is aligned in a horizontal direction with respect to the first electrode unit 610 and the second electrode unit 620. Further, the liquid crystal 630a in the first liquid crystal unit 630 may be a negative liquid crystal which may be changed in alignment by a vertical (y-axis) electric field, but is not limited thereto. The first liquid crystal unit 630 except the droplets 630b is in a solid state due to the polymer 630c.

The liquid crystal 630a in the first liquid crystal unit 630 has the long axis 630L and a short axis 630S. Herein, a refractive index of the long axis 630L is identical to a refractive index of the polymer 630c and a refractive index of the short axis 630S is different from the refractive index of the polymer 630c. Further, the refractive index of the long axis 630L of the liquid crystal 630a in the first liquid crystal unit 630 is identical to a short axis 641S of a liquid crystal 641 in the second liquid crystal unit 640.

Next, referring to FIG. 9B, the first electrode unit 610 of the light control device 600 includes a first substrate 611, a first electrode 612, an insulating layer 613, and a common electrode 614. Specifically, the first electrode 612 including a plurality of pattern electrodes 612a and 612b configured to apply a horizontal electric field to a plurality of liquid crystal units 630 and 640 is disposed on the first substrate 611. The insulating layer 613 is disposed between the first substrate 611 and the first electrode 612. The common electrode 614 is disposed between the insulating layer 613 and the first substrate 611. The insulating layer 613 and the common electrode 614 are substantially the same as the insulating layer 413 and the common electrode 414 illustrated in FIG. 7B. Therefore, a detailed explanation thereof will be omitted.

Hereinafter, driving methods of a transparent mode and a light shielding mode of the light control device 600 illustrated in FIG. 9A and FIG. 9B will be described.

In the normal state of the light control device 600, the liquid crystal 641 in the second liquid crystal unit 640 is perpendicular to the first electrode unit 610 and the second electrode unit 620. Thus, a coloring member 642 is also aligned in a vertical direction with respect to the first electrode unit 610 and the second electrode unit 620. As described above, the refractive index of the long axis 630L of the liquid crystal 630a in the first liquid crystal unit 630, the refractive index of the polymer 630c in the first liquid crystal unit 630, and the refractive index of the short axis 641S of the liquid crystal 641 in the second liquid crystal unit 640 are identical to each other. Therefore, in a state where an electric field is not applied to the first liquid crystal unit 630 and the second liquid crystal unit 640, a light incident into the light control device 600 passes through the light control device 600. Further, the light incident into the light control device 600 reaches a short axis 642S of the coloring member 642 which is relatively shorter than a long axis 642L of the coloring member 642. Therefore, an amount of the light incident into the light control device 700 and then absorbed by the coloring member 642 is very small. Also, most of the light passes through the first liquid crystal unit 630 and the second liquid crystal unit 640, and, thus, the light control device 600 can be implemented in a transparent mode in which a transparent state is maintained. Accordingly, in the normal state of the light control device 600, liquid crystals are aligned to transmit a light incident from the outside. Thus, in the normal state, the light control device 600 can implement a transparent mode. Therefore, power consumption of the light control device 600 can be reduced.

In case of a positive liquid crystal, a long axis of the positive liquid crystal moves toward a direction of an electrical field, and in case of a negative liquid crystal, a short axis of the negative liquid crystal moves toward a direction of an electric field. Therefore, when a voltage is supplied to the plurality of pattern electrodes 612a and 612b of the first electrode 612 or the plurality of pattern electrodes 612a and 612b and the common electrode 614 and a horizontal electric field is generated, the alignment of the liquid crystal 630a as a negative liquid crystal in the first liquid crystal unit 630 and the liquid crystal 641 as a positive liquid crystal in the second liquid crystal unit 640 may be changed.

When a voltage is applied to the plurality of pattern electrodes 612a and 612b or the plurality of pattern electrodes 612a and 612b and the common electrode 614 and an electric field is applied to the first liquid crystal unit 630, the liquid crystal 630a in the first liquid crystal unit 630 is aligned so as to scatter the light incident from the outside. That is, when an electric field is applied to the first liquid crystal unit 630, the liquid crystal 630a is changed to a homeotropic state where the long axis 630L is aligned perpendicularly to the first electrode unit 610 and the second electrode unit 620. Thus, there is made a difference in refractive index between the polymer 630c and the liquid crystal 630a, so that the light incident from the outside is scattered. An incident light path of the light incident into the second liquid crystal unit 640 via the first liquid crystal unit 630 through light scattering is longer than an incident light path of the light incident into the first liquid crystal unit 630. Since an incident light path of the light scattered by the first liquid crystal unit 630 is increased, the light is more likely to reach the coloring member 642 positioned within the second liquid crystal unit 640.

When a voltage is applied to the plurality of pattern electrodes 612a and 612b or the plurality of pattern electrodes 612a and 612b and the common electrode 614 and an electric field is applied to the second liquid crystal unit 640, the liquid crystal 641 in the second liquid crystal unit 640 lies in an X-axis direction or Z-axis direction with respect to the first electrode unit 610 and the second electrode unit 620 in a homeotropic state where a long axis 641L is aligned perpendicularly to the first electrode unit 610 and the second electrode unit 620. Therefore, the light incident through the first liquid crystal unit 630 is scattered by the liquid crystal 641 in the second liquid crystal unit 640.

Accordingly, the light primarily scattered by the first liquid crystal unit 630 is secondarily scattered by the liquid crystal 641 in the planar state within the second liquid crystal unit 640. Therefore, the light path of the light primarily scattered by the first liquid crystal unit 630 is further increased due to secondary scattering within the second liquid crystal unit 640, and, thus, the light is more likely to reach the coloring member 642.

If an electric field is applied to the second liquid crystal unit 640 and the liquid crystal 641 is aligned in the planar state, the coloring member 642 lies according to a lying direction of the adjacent liquid crystal 641 (i.e., alignment direction of the liquid crystal 641) under the influence of the electric field.

Therefore, the light scattered by the liquid crystal 630a in the first liquid crystal unit 630 and the liquid crystal 641 in the second liquid crystal unit 640 reaches the long axis 642L of the coloring member 642 which is relatively longer than the short axis 642S of the coloring member 642. Therefore, the light reaches a very large area of the coloring member 642. Thus, most of the light is absorbed by the coloring member 642. In this case, the light control device 600 may be driven in a light shielding mode in which a light shielding state is maintained while exhibiting a color, for example, black color, of the coloring member 642.

Although not illustrated in FIG. 9A and FIG. 9B, the wall 270 and the refractive index matching layer 380 illustrated in FIG. 5 and FIG. 6 may also be applied to the light control device 600.

Figure 10A:
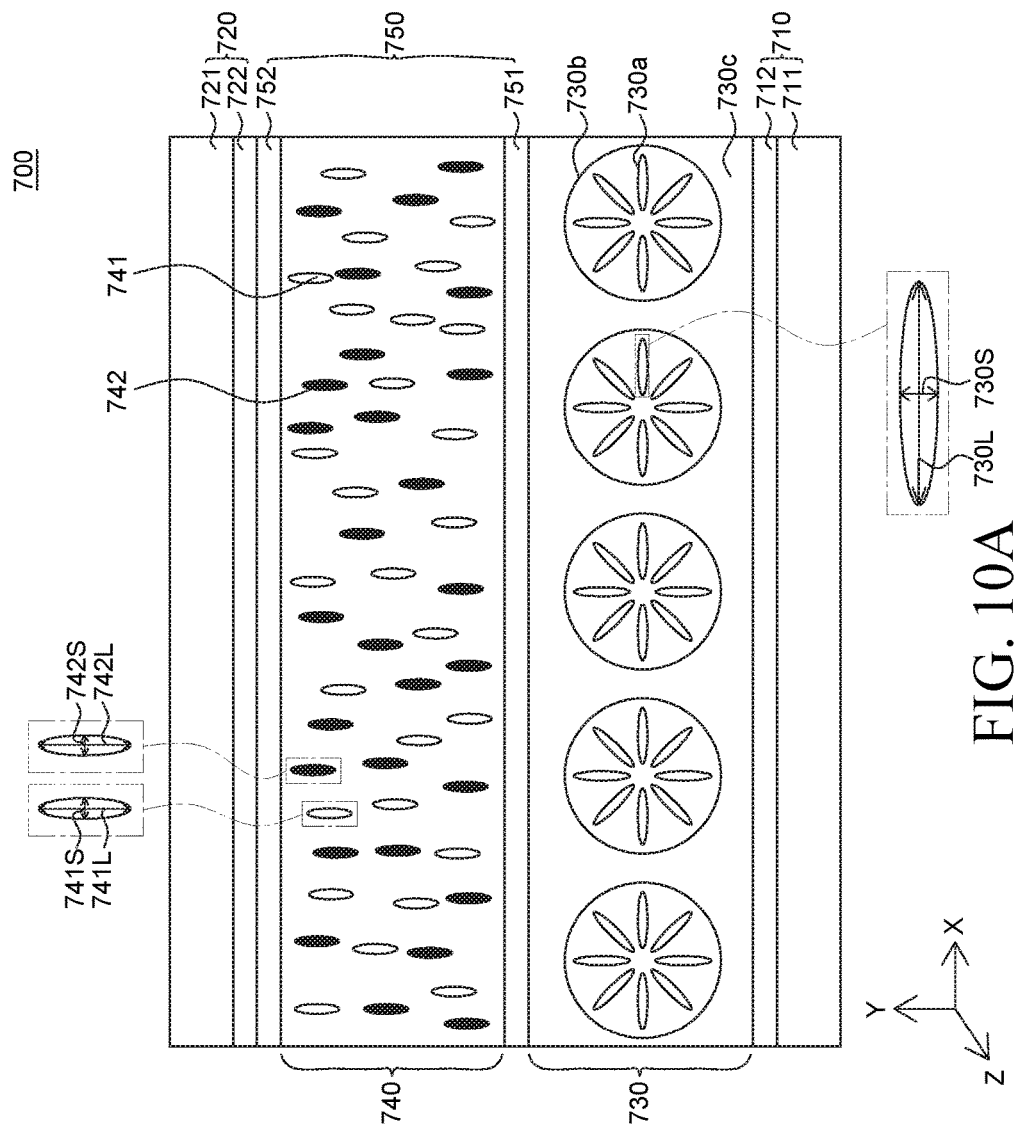
FIG. 10A is a cross-sectional view of a light control device according to still another exemplary embodiment of the present invention.
Figure 10B:
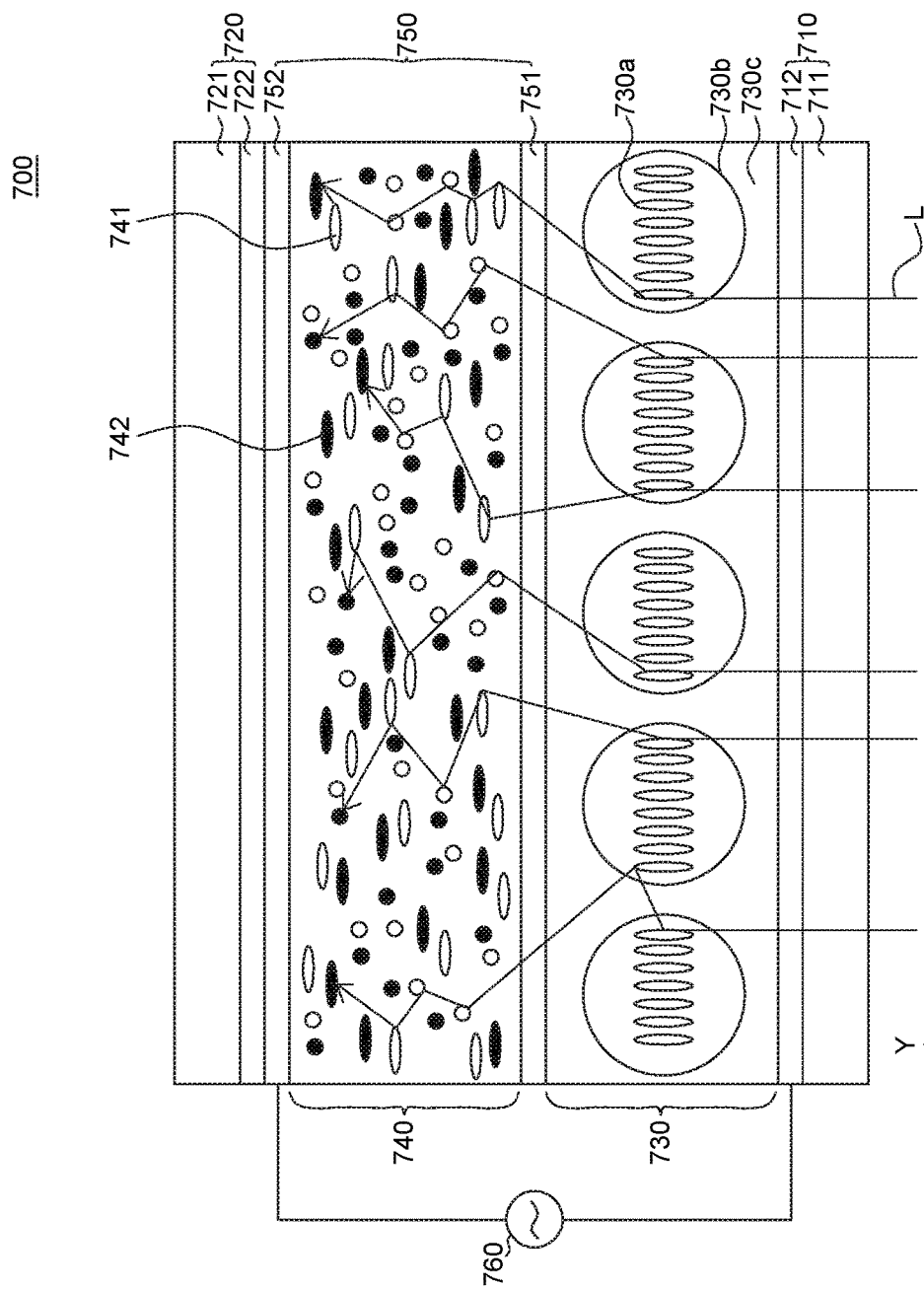
FIG. 10B is a schematic cross-sectional view illustrating a light shielding mode of the light control device illustrated in FIG. 10A when a first liquid crystal unit of the light control device is a positive liquid crystal.
Figure 10C:
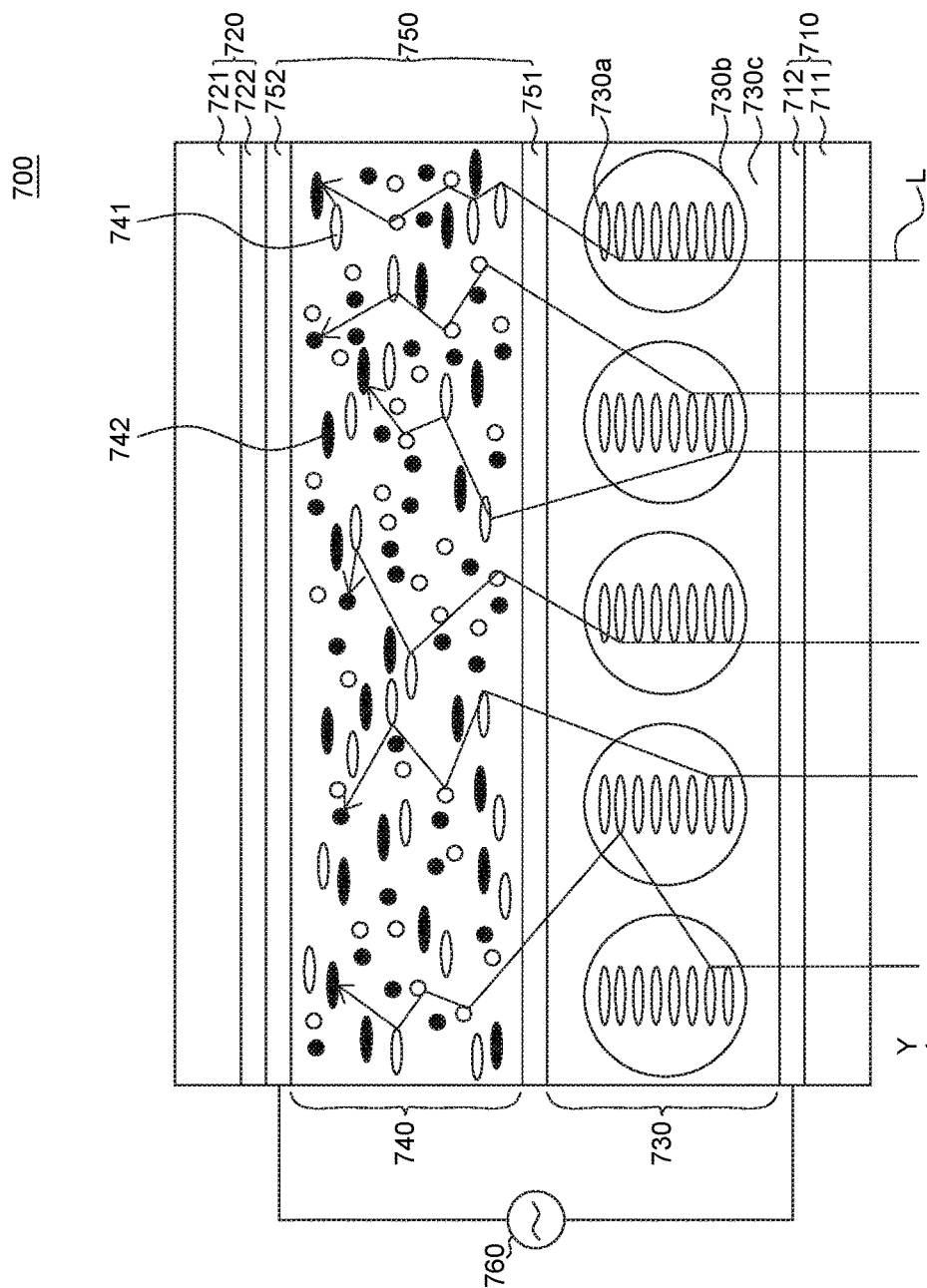
FIG. 10C is a schematic cross-sectional view illustrating a light shielding mode of the light control device illustrated in FIG. 10A when a first liquid crystal unit of the light control device is a negative liquid crystal.

FIG. 10A is a cross-sectional view of a light control device according to still another exemplary embodiment of the present invention. FIG. 10B is a schematic cross-sectional view illustrating a light shielding mode of the light control device illustrated in FIG. 10A when a first liquid crystal unit of the light control device is a positive liquid crystal. FIG. 10C is a schematic cross-sectional view illustrating a light shielding mode of the light control device illustrated in FIG. 10A when a first liquid crystal unit of the light control device is a negative liquid crystal. Referring to FIG. 10A, a light control device 700 includes a first electrode unit 710, a second electrode unit 720, a first liquid crystal unit 730, a second liquid crystal unit 740, and an alignment unit 750. The first electrode unit 710, the second electrode unit 720, the second liquid crystal unit 740, and the alignment unit 750 illustrated in FIG. 10A are substantially the same as the first electrode unit 110, the second electrode unit 120, the second liquid crystal unit 140, and the alignment unit 150 described above with reference to FIG. 1 through FIG. 3. Therefore, a detailed explanation of the first electrode unit 710, the second electrode unit 720, the second liquid crystal unit 740, and the alignment unit 750 illustrated in FIG. 10A will be omitted.

Referring to FIG. 10A, the first liquid crystal unit 730 includes a droplet 730b including a liquid crystal 730a and a polymer dispersed liquid crystal (PDLC) including a polymer 730c. The liquid crystal 730a in the first liquid crystal unit 730 normally has an isotropic state. Herein, the isotropic state refers to a state where one end of a long axis of the liquid crystal 730a is aligned toward a central portion of the droplet 730b and the other end opposite to the one end of the long axis of the liquid crystal 730a is aligned toward an edge of the droplet 730b, as illustrated in FIG. 10A. Further, the liquid crystal 730a in the first liquid crystal unit 730 may be a negative liquid crystal which may be changed in alignment by a vertical (y-axis) electric field or may be positive liquid crystal which may be changed in alignment by a horizontal (x-axis) electric field. The first liquid crystal unit 730 except the droplets 730b is in a solid state due to the polymer 730c.

An average refractive index of the liquid crystal 730a in the first liquid crystal unit 730 is identical to a refractive index of the polymer 730c. The liquid crystal 730a in the isotropic state within the first liquid crystal unit 730 is not aligned in a specific direction such as a vertical direction or horizontal direction. Therefore, since the polymer 730c is formed of a material having a refractive index identical to the average refractive index of the liquid crystal 730a in the first liquid crystal unit 730, a refractive index of the liquid crystal 730a in the first liquid crystal unit 730 may be identical to the refractive index of the polymer 730c in the normal state. Herein, the average refractive index of the liquid crystal 730a has a value between a refractive index of a short axis 730S and a refractive index of a long axis 730L of the liquid crystal 730a. In any case where the liquid crystal 730a in the first liquid crystal unit 730 is a positive liquid crystal or a negative liquid crystal, the average refractive index of the liquid crystal 730a is identical to the refractive index of the polymer 730c. Further, the average refractive index of the liquid crystal 730a in the first liquid crystal unit 730 is identical to a refractive index of a short axis 741S of a liquid crystal 741 in the second liquid crystal unit 740.

Herein, the liquid crystal 730a in the first liquid crystal unit 730 has the long axis 730L and the short axis 730S as illustrated in FIG. 10A. In this case, if the liquid crystal 730a is a positive liquid crystal, the refractive index of the short axis 730S of the liquid crystal 730a is different from the refractive index of the polymer 730c. Further, if the liquid crystal 730a is a negative liquid crystal, the refractive index of the long axis 730L of the liquid crystal 730a is different from the refractive index of the polymer 730c.

For example, if the liquid crystal 730a is a positive liquid crystal and the polymer 730c has a refractive index of 1.5, a material of the liquid crystal 730a may be determined such that the average refractive index of the liquid crystal 730a is 1.5 and the refractive index of the short axis 730S of the liquid crystal 730a is not 1.5. Further, if the liquid crystal 730a is a negative liquid crystal and the polymer 730c has a refractive index of 1.5, a material of the liquid crystal 730a may be determined such that the average refractive index of the liquid crystal 730a is 1.5 and the refractive index of the long axis 730L of the liquid crystal 730a is not 1.5.

Hereinafter, a driving method for a transparent mode of the light control device 700 illustrated in FIG. 10A will be described.

In the normal state of the light control device 700, the liquid crystal 741 in the second liquid crystal unit 740 is perpendicular to the first electrode unit 710 and the second electrode unit 720. Thus, a coloring member 742 is also aligned in a vertical direction with respect to the first electrode unit 710 and the second electrode unit 720. As described above, the average refractive index of the liquid crystal 730a in the first liquid crystal unit 730, the refractive index of the polymer 730c in the first liquid crystal unit 730, and the refractive index of the short axis 741S of the liquid crystal 741 in the second liquid crystal unit 740 are identical to each other. Therefore, in a state where an electric field is not applied to the first liquid crystal unit 730 and the second liquid crystal unit 740, a light incident into the light control device 700 passes through the light control device 700. Further, the light incident into the light control device 700 reaches a short axis 742S of the coloring member 742 which is relatively shorter than a long axis 742L of the coloring member 742. Therefore, an amount of the light incident into the light control device 700 and then absorbed by the coloring member 742 is very small. Also, most of the light passes through the first liquid crystal unit 730 and the second liquid crystal unit 740. Thus, the light control device 700 can be implemented in a transparent mode in which a transparent state is maintained. Accordingly, in the normal state of the light control device 700, liquid crystals are aligned to transmit a light incident from the outside. Thus, in the normal state, the light control device 700 can implement a transparent mode. Therefore, power consumption of the light control device 700 can be reduced.

Hereinafter, a driving method for a light shielding mode of the light control device 700 illustrated in FIG. 10A will be described with reference to FIG. 10B and FIG. 10C.

First, referring to FIG. 10B, in case of a positive liquid crystal, a long axis of the positive liquid crystal moves toward a direction of an electrical field, and in case of a negative liquid crystal, a short axis of the negative liquid crystal moves toward a direction of an electric field. Therefore, when a voltage is supplied to the first electrode 712 and the second electrode 722 using a power supply 760 to generate a vertical electric field, the alignment of the liquid crystal 730a as a positive liquid crystal in the first liquid crystal unit 730 and the liquid crystal 741 as a negative liquid crystal in the second liquid crystal unit 740 may be changed.

When a voltage is applied to the first electrode 712 and the second electrode 722 and an electric field is applied to the first liquid crystal unit 730, the liquid crystal 730a in the first liquid crystal unit 730 is aligned so as to scatter a light L incident from the outside. That is, when an electric field is applied to the first liquid crystal unit 730, the liquid crystal 730a is changed to a homeotropic state where the long axis 730L is aligned perpendicularly to the first electrode unit 710 and the second electrode unit 720. Thus, there is made a difference in refractive index between the polymer 730c and the liquid crystal 730a, so that the light L incident from the outside is scattered. An incident light path of the light L incident into the second liquid crystal unit 740 via the first liquid crystal unit 730 through light scattering is longer than an incident light path of the light L incident into the first liquid crystal unit 730. Since an incident light path of the light L scattered by the first liquid crystal unit 730 is increased as such, the light L is more likely to reach the coloring member 742 positioned within the second liquid crystal unit 740.

When a voltage is applied to the first electrode 712 and the second electrode 722 and an electric field is applied to the second liquid crystal unit 740, a long axis 741L of the liquid crystal 741 in the second liquid crystal unit 740 lies in an X-axis direction or Z-axis direction with respect to the first electrode unit 710 and the second electrode unit 720. Therefore, the light L incident through the first liquid crystal unit 730 is scattered by the liquid crystal 741 in the second liquid crystal unit 740.

Accordingly, the light L primarily scattered by the first liquid crystal unit 730 is secondarily scattered by the liquid crystal 741 in the planar state within the second liquid crystal unit 740. Therefore, the light path of the light L primarily scattered by the first liquid crystal unit 730 is further increased due to secondary scattering within the second liquid crystal unit 740, and, thus, the light L is more likely to reach the coloring member 742.

If an electric field is applied to the second liquid crystal unit 740 and the liquid crystal 741 is aligned in the planar state, the coloring member 742 lies according to a lying direction of the adjacent liquid crystal 741 (i.e., alignment direction of the liquid crystal 741) under the influence of the electric field.

Therefore, the light L scattered by the liquid crystal 730a in the first liquid crystal unit 730 and the liquid crystal 741 in the second liquid crystal unit 740 reaches the long axis 742L of the coloring member 742 which is relatively longer than the short axis 742S of the coloring member 742. In this case, the light L reaches a very large area of the coloring member 742. Thus, most of the light L is absorbed by the coloring member 742. Thus, the light control device 700 may be driven in a light shielding mode in which a light shielding state is maintained while exhibiting a color, for example, black color, of the coloring member 742.

Referring to FIG. 10C, in case of a negative liquid crystal, a short axis of the negative liquid crystal moves toward a direction of an electric field. Therefore, when a voltage is supplied to the first electrode 712 and the second electrode 722 and a vertical electric field is generated, the alignment of the liquid crystal 730a as a negative liquid crystal in the first liquid crystal unit 730 and the liquid crystal 741 in the second liquid crystal unit 740 may be changed.

When a voltage is applied to the first electrode 712 and the second electrode 722 and an electric field is applied to the first liquid crystal unit 730, the liquid crystal 730a in the first liquid crystal unit 730 is aligned so as to scatter the light L incident from the outside. That is, when an electric field is applied to the first liquid crystal unit 730, the liquid crystal 730a is changed to a planar state where the long axis 730L is aligned parallel to the first electrode unit 710 and the second electrode unit 720. Thus, there is made a difference in refractive index between the polymer 730c and the liquid crystal 730a, so that the light L incident from the outside is scattered. A change in state of the liquid crystal 741 in the second liquid crystal unit 740 and scattering of the light L are substantially the same as those described above with reference to FIG. 10B. Therefore, a detailed explanation thereof will be omitted.

Although not illustrated in FIG. 10A through FIG. 10C, the wall 270 and the refractive index matching layer 380 illustrated in FIG. 5 and FIG. 6 may also be applied to the light control device 700.

Figure 11A:
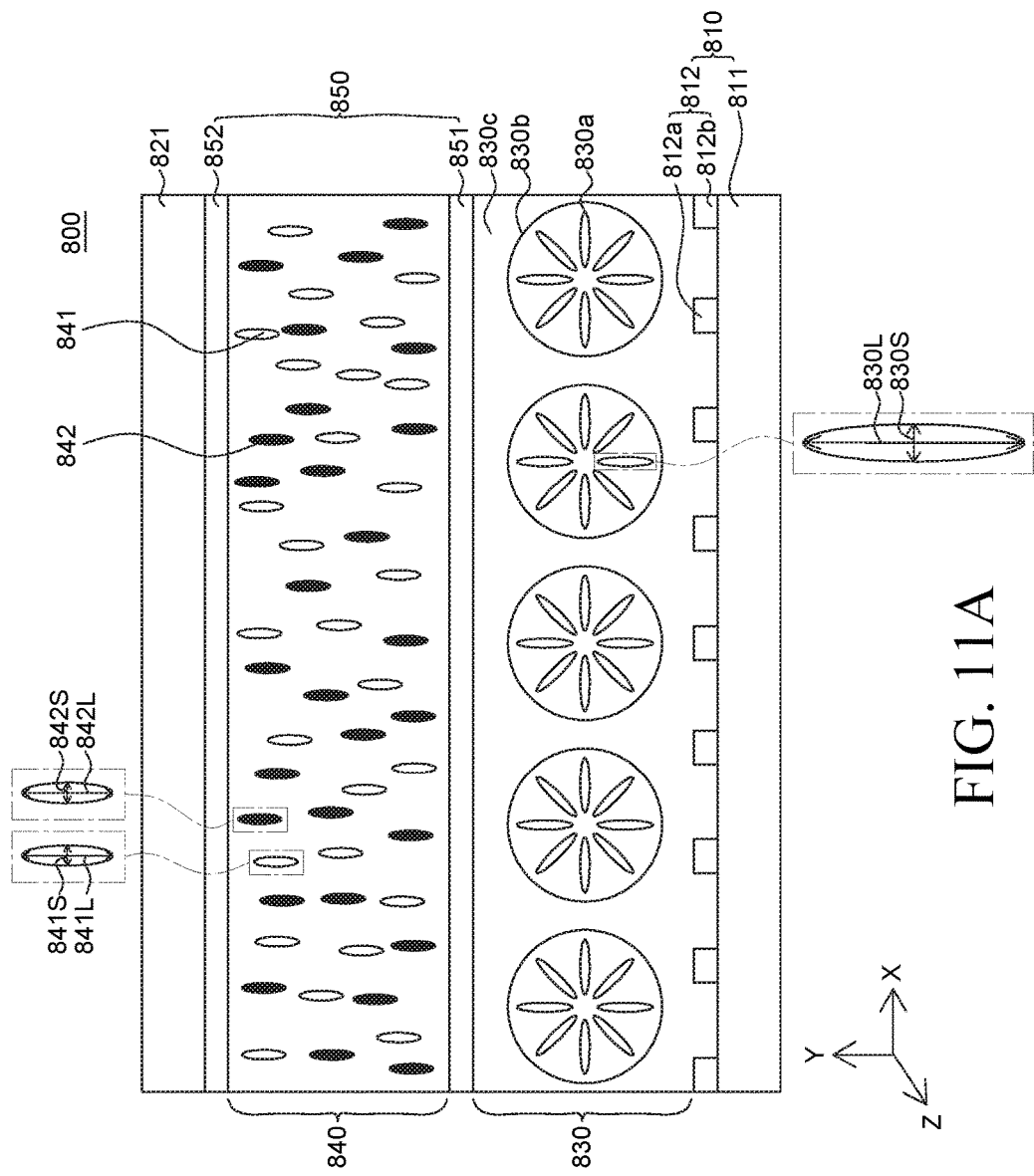
FIG. 11A and FIG. 11B are cross-sectional views of a light control device according to still another exemplary embodiment of the present invention.
Figure 11B:
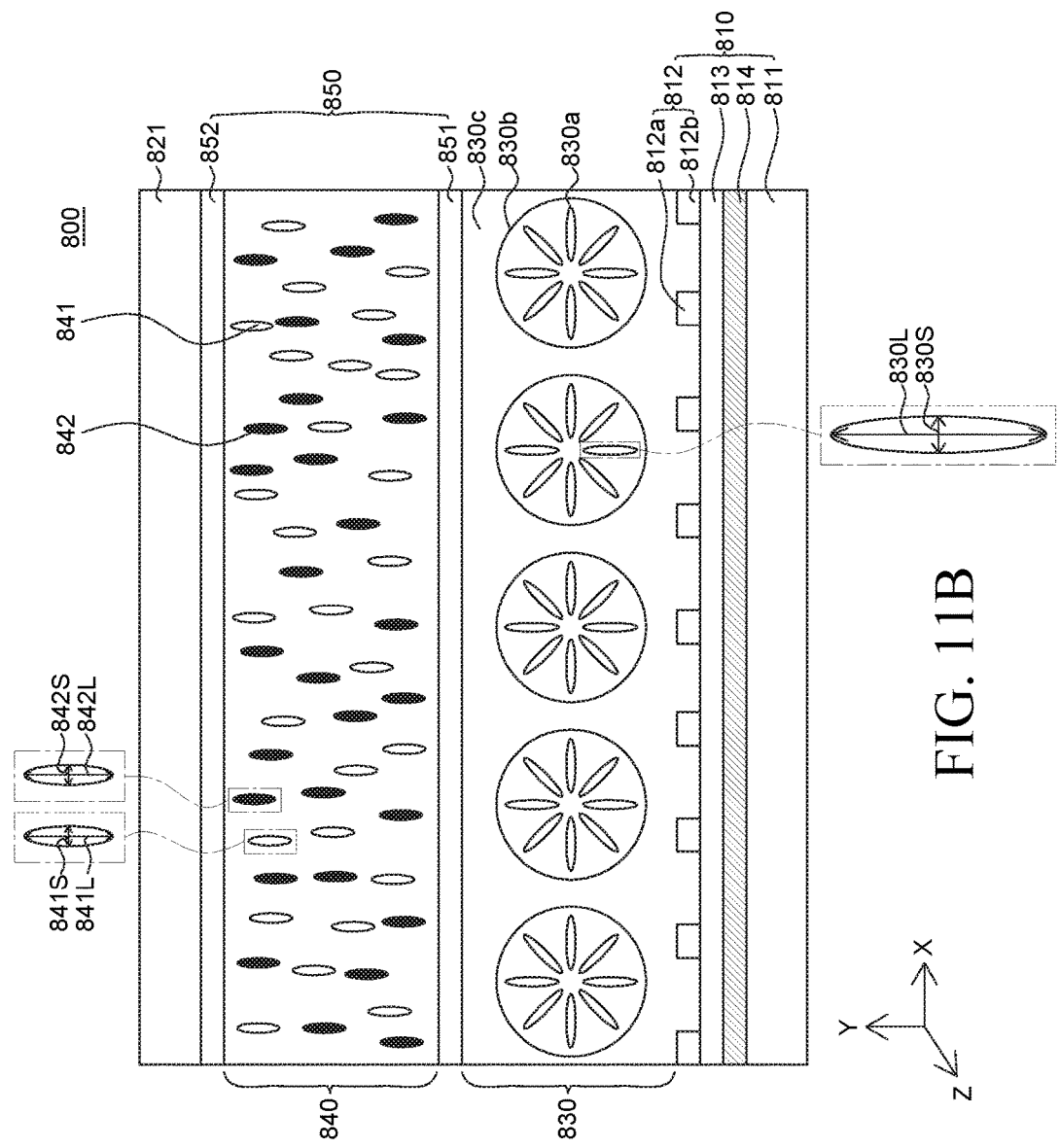

FIG. 11A and FIG. 11B are cross-sectional views of a light control device according to still another exemplary embodiment of the present invention. First, referring to FIG. 11A, a light control device 800 includes a first electrode unit 810, a second substrate 821, a first liquid crystal unit 830, a second liquid crystal unit 840, and an alignment unit 850. The first electrode unit 810, the second substrate 821, the second liquid crystal unit 840, and the alignment unit 850 illustrated in FIG. 11A are substantially the same as the first electrode unit 410, the second substrate 421, the second liquid crystal unit 440, and the alignment unit 450 described above with reference to FIG. 7A and FIG. 7B. Therefore, a detailed explanation of the first electrode unit 810, the second substrate 821, the second liquid crystal unit 840, and the alignment unit 850 illustrated in FIG. 11A will be omitted.

Referring to FIG. 11A, the first liquid crystal unit 830 includes a droplet 830b including a liquid crystal 830a and a polymer dispersed liquid crystal (PDLC) including a polymer 830c. The liquid crystal 830a in the first liquid crystal unit 830 normally has an isotropic state. Further, the liquid crystal 830a in the first liquid crystal unit 830 may be a negative liquid crystal which may be changed in alignment by a vertical (y-axis) electric field or may be positive liquid crystal which may be changed in alignment by a horizontal (x-axis) electric field. The first liquid crystal unit 830 except the droplets 830b is in a solid state due to the polymer 830c.

An average refractive index of the liquid crystal 830a in the first liquid crystal unit 830 is identical to a refractive index of the polymer 830c. That is, in any case where the liquid crystal 830a in the first liquid crystal unit 830 is a positive liquid crystal or a negative liquid crystal, the average refractive index of the liquid crystal 830a is identical to the refractive index of the polymer 830c. Further, the average refractive index of the liquid crystal 830a in the first liquid crystal unit 830 is identical to a refractive index of a short axis 841S of a liquid crystal 841 in the second liquid crystal unit 840.

Herein, the liquid crystal 830a in the first liquid crystal unit 830 has a long axis 830L and a short axis 830S as illustrated in FIG. 11A. In this case, if the liquid crystal 830a is a positive liquid crystal, the refractive index of the short axis 830S of the liquid crystal 830a is different from the refractive index of the polymer 830c. Further, if the liquid crystal 830a is a negative liquid crystal, the refractive index of the long axis 830L of the liquid crystal 830a is different from the refractive index of the polymer 830c.

Next, referring to FIG. 11B, the first electrode unit 810 of the light control device 800 includes a first substrate 811, a first electrode 812, an insulating layer 813, and a common electrode 814. Specifically, the first electrode 812 including a plurality of pattern electrodes 812a and 812b configured to apply a horizontal electric field to a plurality of liquid crystal units 830 and 840 is disposed on the first substrate 811, the insulating layer 813 is disposed between the first substrate 811 and the first electrode 812, and the common electrode 814 is disposed between the insulating layer 813 and the first substrate 811. The insulating layer 813 and the common electrode 814 are substantially the same as the insulating layer 413 and the common electrode 414 illustrated in FIG. 7B. Therefore, a detailed explanation thereof will be omitted.

Hereinafter, driving methods of a transparent mode and a light shielding mode of the light control device 800 illustrated in FIG. 11A and FIG. 11B will be described.

In the normal state of the light control device 800, the liquid crystal 841 in the second liquid crystal unit 840 is perpendicular to the first electrode unit 810 and the second electrode unit 820. Thus, a coloring member 842 is also aligned in a vertical direction with respect to the first electrode unit 810 and the second electrode unit 820. As described above, the average refractive index of the liquid crystal 830a in the first liquid crystal unit 830, the refractive index of the polymer 830c in the first liquid crystal unit 830, and the refractive index of the short axis 841S of the liquid crystal 841 in the second liquid crystal unit 840 are identical to each other. Therefore, in a state where an electric field is not applied to the first liquid crystal unit 830 and the second liquid crystal unit 840, a light incident into the light control device 800 passes through the light control device 800. Further, the light incident into the light control device 800 reaches a short axis 842S of the coloring member 842 which is relatively shorter than a long axis 842L of the coloring member 842. Therefore, an amount of the light absorbed by the coloring member 842 is very small. Also, most of the light of the light control device 800 passes through the first liquid crystal unit 830 and the second liquid crystal unit 840. Thus, the light control device 800 can be implemented in a transparent mode in which a transparent state is maintained. Accordingly, in the normal state of the light control device 800, liquid crystals are aligned to transmit a light incident from the outside. Thus, in the normal state, the light control device 800 can implement a transparent mode. Therefore, power consumption of the light control device 800 can be reduced.

In case of a positive liquid crystal, a long axis of the positive liquid crystal moves toward a direction of an electrical field, and in case of a negative liquid crystal, a short axis of the negative liquid crystal moves toward a direction of an electric field. Therefore, when a voltage is supplied to the plurality of pattern electrodes 812a and 812b of the first electrode unit 810 or the plurality of pattern electrodes 812a and 812b and the common electrode 814 and a horizontal electric field is generated, the alignment of the liquid crystal 830a and the liquid crystal 841 may be changed.

When a voltage is applied to the plurality of pattern electrodes 812a and 812b or the plurality of pattern electrodes 812a and 812b and the common electrode 814 and an electric field is applied to the first liquid crystal unit 830, the liquid crystal 830a in the first liquid crystal unit 830 is aligned so as to scatter the light incident from the outside. That is, when the liquid crystal 830a is a positive liquid crystal and an electric field is applied to the first liquid crystal unit 830, the liquid crystal 830a is changed to a homeotropic state where the long axis 830L is aligned perpendicularly to the first electrode unit 810 and the second electrode unit 820. Thus, there is made a difference in refractive index between the polymer 830c and the liquid crystal 830a, so that the light incident from the outside is scattered. Further, if the liquid crystal 830a is a negative liquid crystal and an electric field is applied to the first liquid crystal unit 830, the liquid crystal 830a is changed to a planar state where the long axis 830L is aligned parallel to the first electrode unit 810 and the second electrode unit 820. Thus, there is made a difference in refractive index between the polymer 830c and the liquid crystal 830a, so that the light incident from the outside is scattered. An incident light path of the light incident into the second liquid crystal unit 840 via the first liquid crystal unit 830 through light scattering is longer than an incident light path of the light incident into the first liquid crystal unit 830. Since an incident light path of the light scattered by the first liquid crystal unit 830 is increased as such, the light is more likely to reach the coloring member 842 positioned within the second liquid crystal unit 840.

When a voltage is applied to the plurality of pattern electrodes 812a and 812b or the plurality of pattern electrodes 812a and 812b and the common electrode 814 and an electric field is applied to the second liquid crystal unit 840, the liquid crystal 841 in the second liquid crystal unit 840 lies. In this case, a long axis 841L of the liquid crystal 841 in the second liquid crystal unit 840 indicates an X-axis direction or Z-axis direction with respect to the first electrode unit 810 and the second electrode unit 820. Accordingly, the light incident through the first liquid crystal unit 830 is scattered by the liquid crystal 841 in the second liquid crystal unit 840.

Accordingly, the light primarily scattered by the first liquid crystal unit 830 is secondarily scattered by the liquid crystal 841 in the planar state within the second liquid crystal unit 840. Therefore, a light path of the light primarily scattered by the first liquid crystal unit 830 is further increased due to secondary scattering within the second liquid crystal unit 840, and, thus, the light scattered is more likely to reach the coloring member 842.

If an electric field is applied to the second liquid crystal unit 840 and the liquid crystal 841 is aligned in the planar state, the coloring member 842 lies according to a lying direction of the adjacent liquid crystal 841 (i.e., alignment direction of the liquid crystal 841) under the influence of the electric field.

Therefore, the light scattered by the liquid crystal 830a in the first liquid crystal unit 830 and the liquid crystal 841 in the second liquid crystal unit 840 reaches the long axis 842L of the coloring member 842 which is relatively longer than the short axis 842S of the coloring member 842. Therefore, the light reaches a very large area of the coloring member 842. Thus, most of the light is absorbed by the coloring member 842. Thus, the light control device 800 may be driven in a light shielding mode in which a light shielding state is maintained while exhibiting a color, for example, black color, of the coloring member 842.

Although not illustrated in FIG. 11A and FIG. 11B, the wall 270 and the refractive index matching layer 380 illustrated in FIG. 5 and FIG. 6 may also be applied to the light control device 800.

Figure 12A:
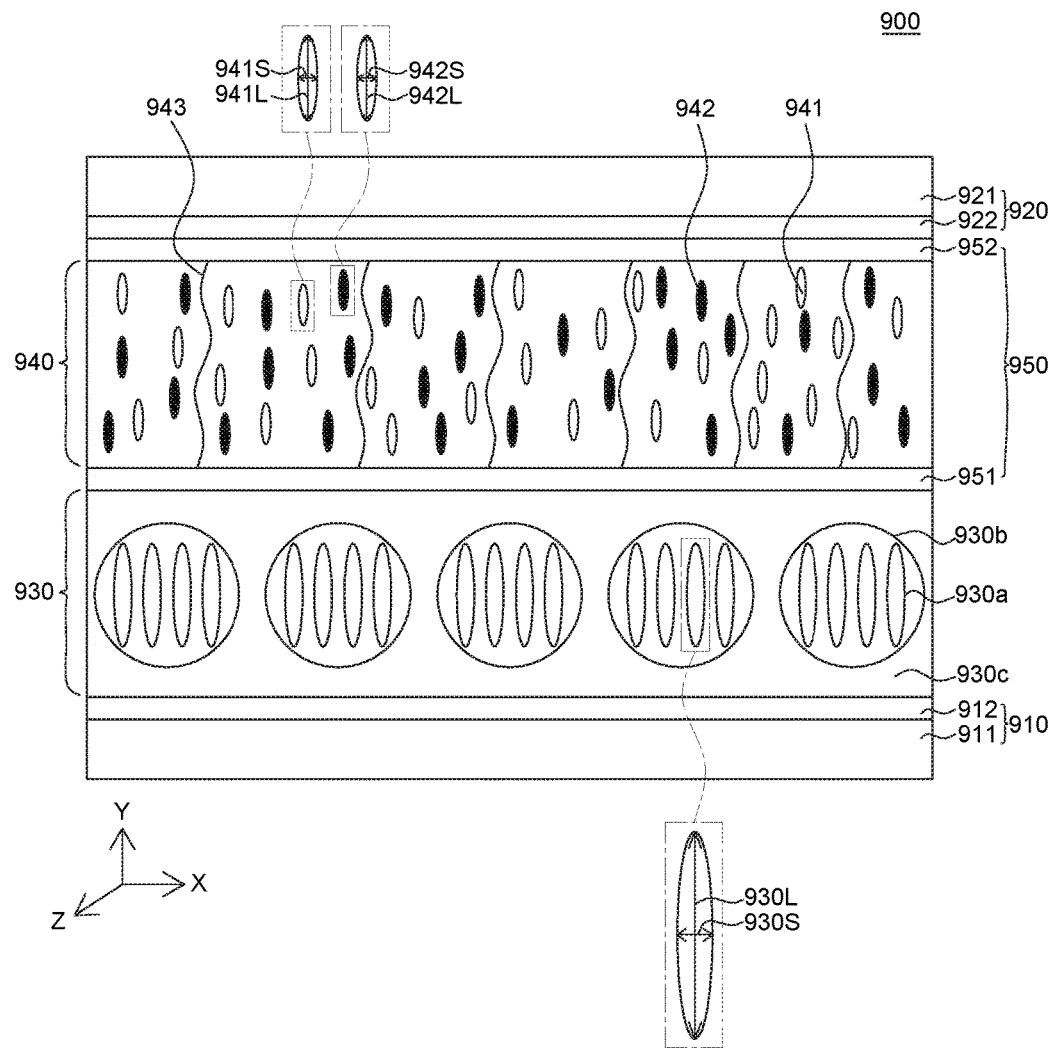
FIG. 12A is a cross-sectional view of a light control device according to still another exemplary embodiment of the present invention.
Figure 12B:
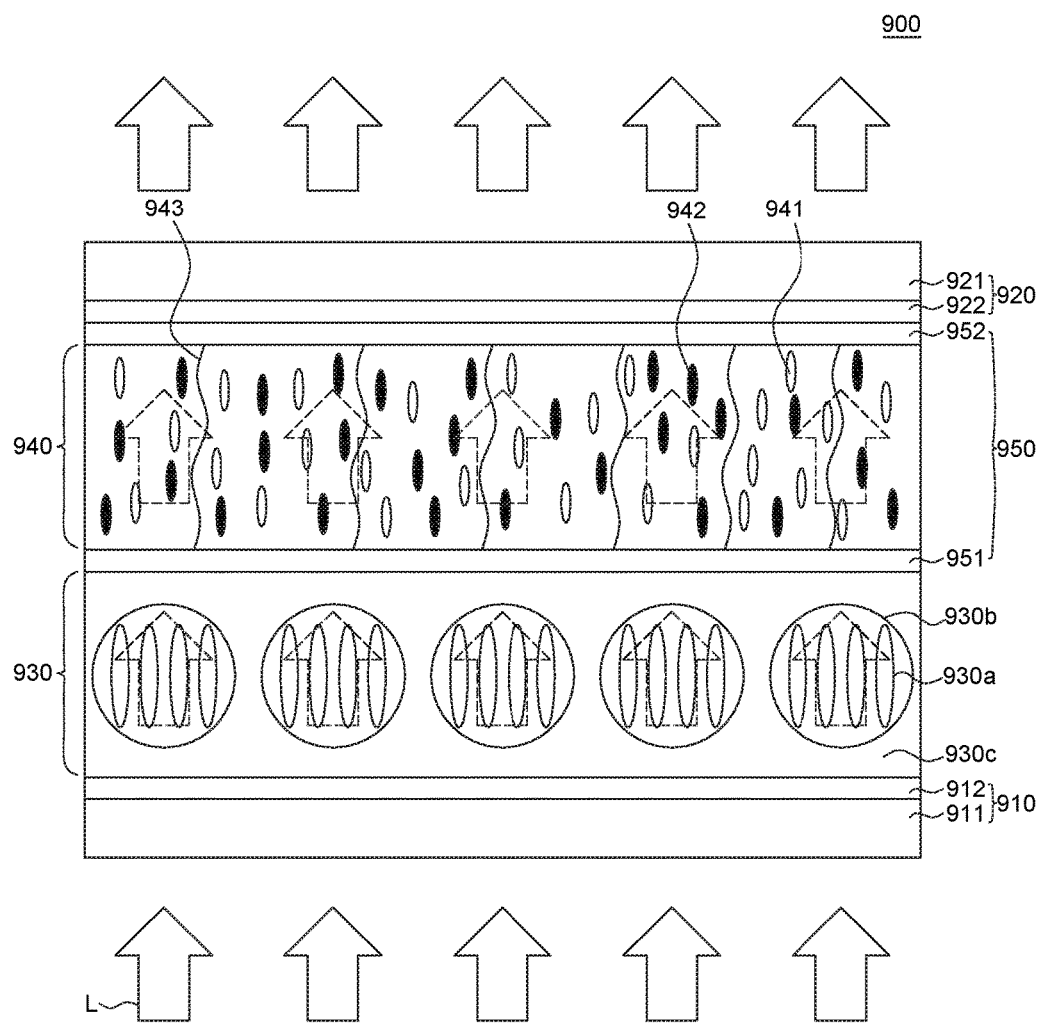
FIG. 12B is a cross-sectional view illustrating a transparent mode of the light control device illustrated in FIG. 12A.
Figure 12C:
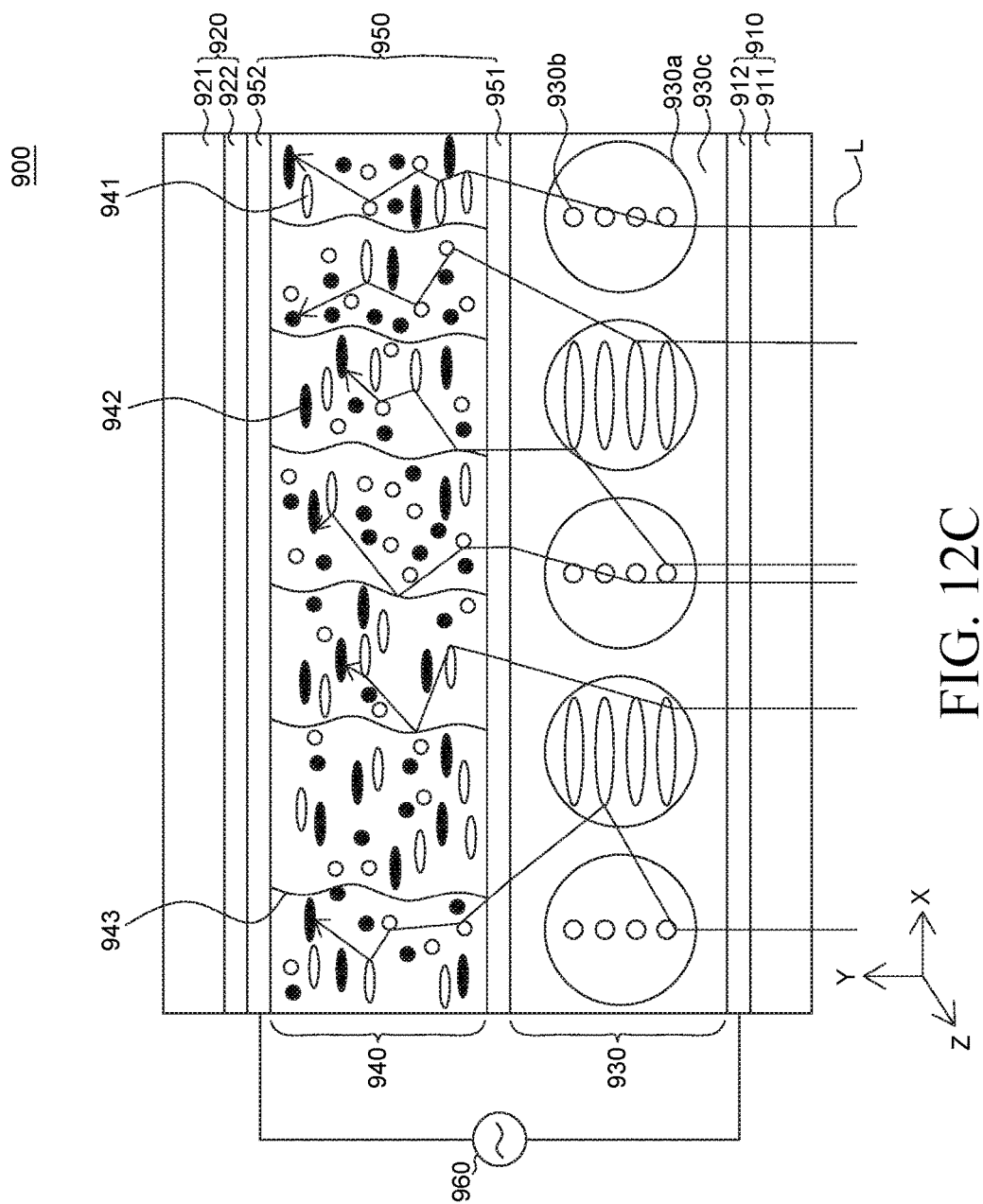
FIG. 12C is a cross-sectional view illustrating a light shielding mode of the light control device illustrated in FIG. 12A.

FIG. 12A is a cross-sectional view of a light control device according to still another exemplary embodiment of the present invention. FIG. 12B is a cross-sectional view illustrating a transparent mode of the light control device illustrated in FIG. 12A. FIG. 12C is a cross-sectional view illustrating a light shielding mode of the light control device illustrated in FIG. 12A. Referring to FIG. 12A through FIG. 12C, a light control device 900 includes a first electrode unit 910, a second electrode unit 920, a first liquid crystal unit 930, a second liquid crystal unit 940, and an alignment unit 950. The first electrode unit 910, the second electrode unit 920, the first liquid crystal unit 930, and the alignment unit 950 illustrated in FIG. 12A through FIG. 12C are substantially the same as the first electrode unit 110, the second electrode unit 120, the first liquid crystal unit 130, and the alignment unit 150 described above with reference to FIG. 1 through FIG. 3. Therefore, a detailed explanation of the first electrode unit 910, the second electrode unit 920, the first liquid crystal unit 930, and the alignment unit 950 illustrated in FIG. 12A through FIG. 12C will be omitted.

Referring to FIG. 12A, the second liquid crystal unit 940 includes a polymer networked liquid crystal (PNLC) including a liquid crystal 941, a coloring member 942, and a network 943. The liquid crystal 941 in the second liquid crystal unit 940 normally has a homeotropic state where the liquid crystal 941 is aligned perpendicularly to the first electrode unit 910 and the second electrode unit 920. Further, the liquid crystal 941 in the second liquid crystal unit 940 may be a negative liquid crystal which may be changed in alignment by a vertical (y-axis) electric field, but is not limited thereto.

The coloring member 942 has a long axis 942S and a short axis 942S and may be changed in alignment under the influence of an alignment direction of the liquid crystal 941 of the second liquid crystal unit 940 in which the coloring member 942 is positioned. That is, the coloring member 942 is normally aligned in a vertical direction with respect to the first electrode unit 910 and the second electrode unit 920 along with the liquid crystal 941 of the second liquid crystal unit 940. Thus, as the long axis 942L of the coloring member 942 is increased and the short axis 942S thereof is decreased, a high transparency can be maintained during a transparent mode and a high light shielding degree can be maintained during a light shielding mode.

The network 943 is positioned in a polymer networked form in the second liquid crystal unit 940. The network 943 is formed of a photocurable monomer formed of a transparent material or a thermally curable monomer formed of a transparent material that transmits light. Specifically, if a photocurable monomer and the liquid crystal 941 are mixed to prepare a mixed liquid crystal and then light is irradiated to the mixed liquid crystal, the monomer is converted into a polymer during a phase separation between the liquid crystal 941 and the monomer. As a result, the network 943 having a net shape or a network shape is formed within the second liquid crystal unit 940. The network 943 has the same refractive index as a polymer 930c in the first liquid crystal unit 930.

Further, since the network 943 is formed into a net shape in a top-down direction within the second liquid crystal unit 940, the network 943 enables the liquid crystal 941 to be aligned perpendicularly. Further, in addition, the network 943 may maintain a cell gap.

Hereinafter, driving methods of a transparent mode and a light shielding mode of the light control device 900 will be described with reference to FIG. 12B and FIG. 12C.

First, referring to FIG. 12B, in the normal state of the light control device 900, the liquid crystal 941 in the second liquid crystal unit 940 is perpendicular to the first electrode unit 910 and the second electrode unit 920. Thus, the coloring member 942 is also aligned in the vertical direction with respect to the first electrode unit 910 and the second electrode unit 920. As described above, a refractive index of a short axis 930S of a liquid crystal 930*a* in the first liquid crystal unit 930, a refractive index of the polymer 930*c* in the first liquid crystal unit 930, a refractive index of a short axis 941S of the liquid crystal 941 in the second liquid crystal unit 940, and a refractive index of the network 943 in the second liquid crystal unit 940 are identical to each other. Therefore, in a state where an electric field is not applied to the first liquid crystal unit 930 and the second liquid crystal unit 940, a light L incident into the light control device 900 passes through the light control device 900. Further, the light L incident into the light control device 900 reaches a short axis 942S of the coloring member 942 which is relatively shorter than a long axis 942L of the coloring member 942. Therefore, an amount of the light L absorbed by the coloring member 942 is very small. Also, most of the light L passes through the first liquid crystal unit 930 and the second liquid crystal unit 940. Thus, the light control device 900 can be implemented in a transparent mode in which a transparent state is maintained. Accordingly, in the normal state of the light control device 900, liquid crystals are aligned to transmit the light L incident from the outside. Thus, in the normal state, the light control device 900 can implement a transparent mode. Therefore, power consumption of the light control device 900 can be reduced.

In case of a negative liquid crystal, a short axis of the negative liquid crystal moves toward a direction of an electric field. Therefore, as illustrated in FIG. 12C, when a voltage is supplied to a first electrode 912 of the first electrode unit 910 and a second electrode 922 of the second electrode unit 920 using a power supply 1060 to generate a vertical electric field, the alignment of the liquid crystal 930*a* and the liquid crystal 941 may be changed.

When a voltage is applied to the first electrode 912 and the second electrode 922 and an electric field is applied to the first liquid crystal unit 930, the liquid crystal 930*a* in the first liquid crystal unit 930 is aligned so as to scatter a light L incident from the outside. That is, when an electric field is applied to the first liquid crystal unit 930, the long axis 930L of the liquid crystal 930*a* is changed to a planar state with respect to the first electrode unit 910 and the second electrode unit 920. Thus, there is made a difference in refractive index between the polymer 930*c* and the liquid crystal 930*a*, so that the light L incident from the outside is scattered. An incident light path of the light L incident into the second liquid crystal unit 940 via the first liquid crystal unit 930 through light scattering is longer than an incident light path of the light L incident into the first liquid crystal unit 930. Since an incident light path of the light L scattered by the first liquid crystal unit 930 is increased as such, the light L is more likely to reach the coloring member 942 positioned within the second liquid crystal unit 940.

When a voltage is applied to the first electrode 912 and the second electrode 922 and an electric field is applied to the second liquid crystal unit 940, a long axis 941L of the liquid crystal 941 in the second liquid crystal unit 940 lies in an X-axis direction or Z-axis direction with respect to the first electrode unit 910 and the second electrode unit 920. Therefore, the light L incident through the first liquid crystal unit 930 is scattered by the liquid crystal 941 in the second liquid crystal unit 940. Further, the light L incident through the first liquid crystal unit 930 is scattered by the network 943 as well as the liquid crystal 941 in the planar state.

Accordingly, the light L primarily scattered by the first liquid crystal unit 930 is secondarily scattered by the liquid crystal 941 in the planar state and the network 943 within the second liquid crystal unit 940. Therefore, the light path of the light L primarily scattered by the first liquid crystal unit 930 is further increased due to secondary scattering within the second liquid crystal unit 940, and, thus, the light L is more likely to reach the coloring member 942.

If an electric field is applied to the second liquid crystal unit 940 and the liquid crystal 941 is aligned in the planar state, the coloring member 942 lies according to a lying direction of the adjacent liquid crystal 941 (i.e., alignment direction of the liquid crystal 941) under the influence of the electric field.

Therefore, the light L scattered by the liquid crystal 930*a* in the first liquid crystal unit 930 and the liquid crystal 941 in the second liquid crystal unit 940 reaches the long axis 942L of the coloring member 942 which is relatively longer than the short axis 942S. Therefore, the light L reaches a very large area of the coloring member 942. Thus, most of the light L is absorbed by the coloring member 942. Thus, the light control device 900 may be driven in a light shielding mode in which a light shielding state is maintained while exhibiting a color, for example, black color, of the coloring member 942.

Although not illustrated in FIG. 12A through FIG. 12C, the wall 270 and the refractive index matching layer 380 illustrated in FIG. 5 and FIG. 6 may also be applied to the light control device 900.

Figure 13A:
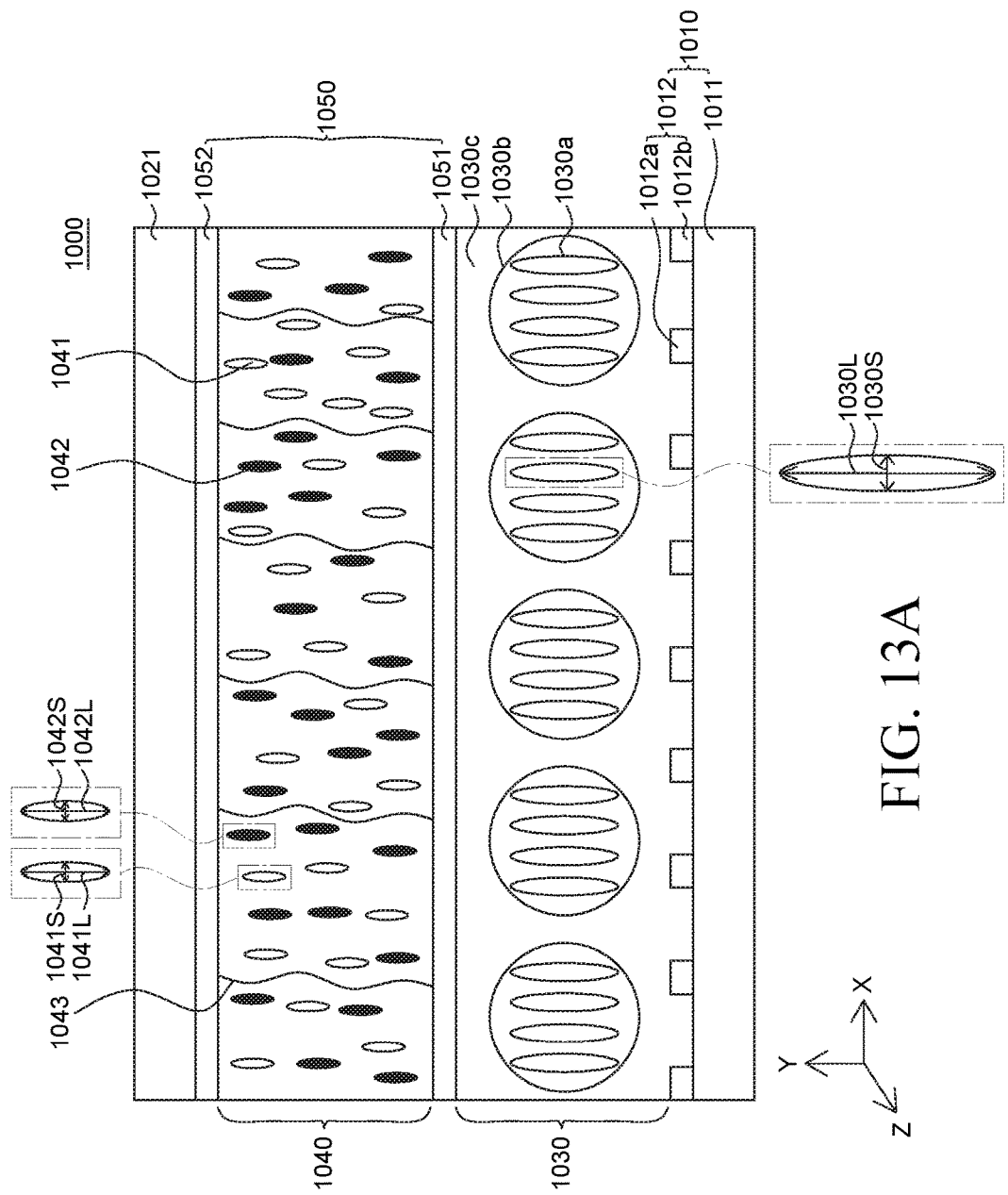
FIG. 13A and FIG. 13B are cross-sectional views of a light control device according to still another exemplary embodiment of the present invention.
Figure 13B:
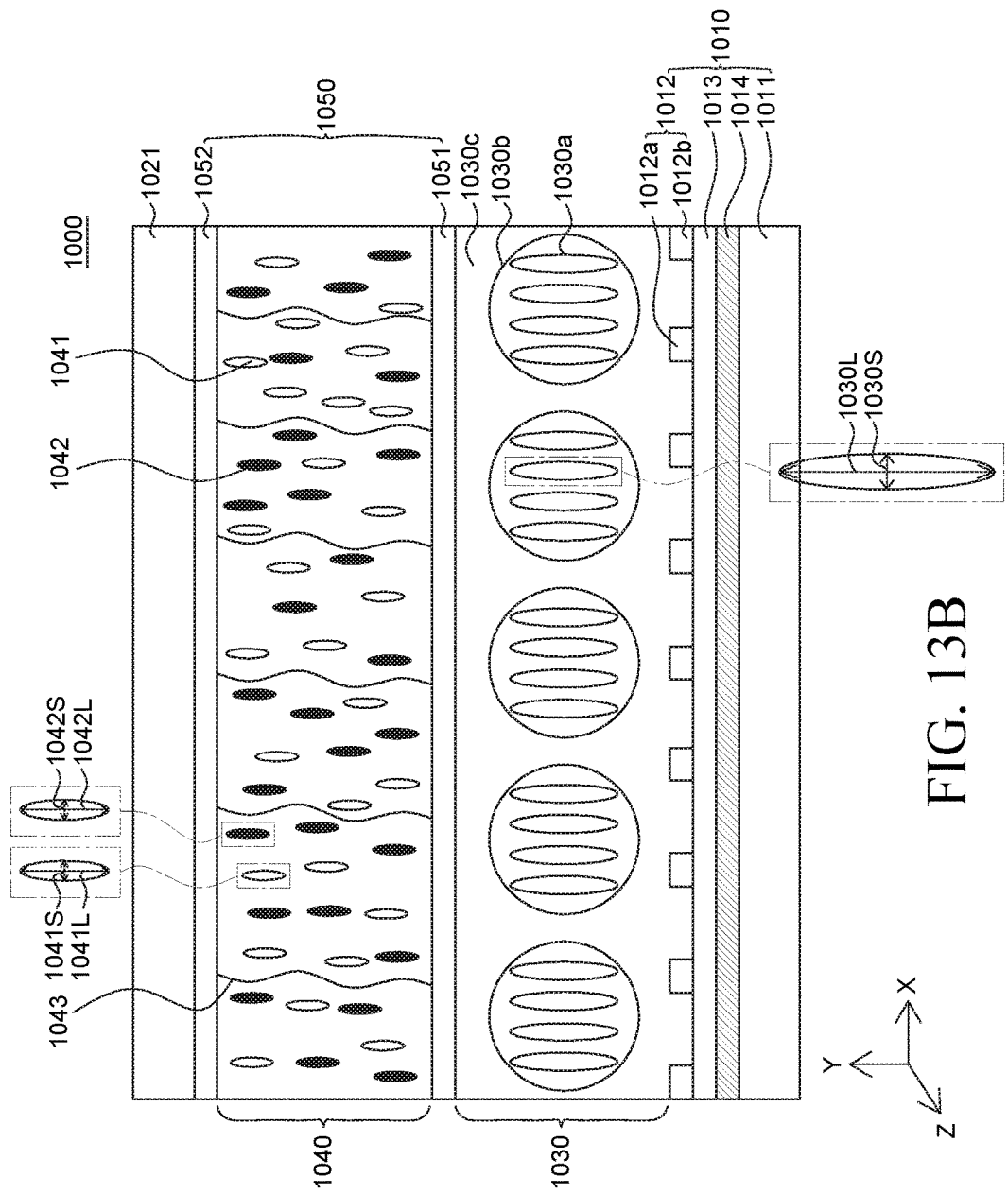

FIG. 13A and FIG. 13B are cross-sectional views of a light control device according to still another exemplary embodiment of the present invention. First, referring to FIG. 13A, a light control device 1000 includes a first electrode unit 1010, a second substrate 1021, a first liquid crystal unit 1030, a second liquid crystal unit 1040, and an alignment unit 1050. The first electrode unit 1010, the second substrate 1021, the first liquid crystal unit 1030, and the alignment unit 1050 illustrated in FIG. 13A are substantially the same as the first electrode unit 410, the second substrate 421, the first liquid crystal unit 430, and the alignment unit 450 described above with reference to FIG. 7A and FIG. 7B. Therefore, a detailed explanation of the first electrode unit 1010, the second substrate 1021, the first liquid crystal unit 1030, and the alignment unit 1050 illustrated in FIG. 13A will be omitted.

Referring to FIG. 13A, the second liquid crystal unit 1040 includes a polymer networked liquid crystal (PNLC) including a liquid crystal 1041, a coloring member 1042, and a network 1043. The liquid crystal 1041 in the second liquid crystal unit 1040 normally has a homeotropic state where the liquid crystal 1041 is aligned perpendicularly to the first electrode unit 1010 and a second electrode unit 1020. Further, the liquid crystal 1041 in the second liquid crystal unit 1040 may be a positive liquid crystal which may be changed in alignment by a horizontal (x-axis) electric field, but is not limited thereto.

The coloring member 1042 has a long axis 1042S and a short axis 1042S and may be changed in alignment under the influence of an alignment direction of the liquid crystal 1041 of the second liquid crystal unit 1040 in which the coloring member 1042 is positioned.

The network 1043 is positioned in a polymer networked form in the second liquid crystal unit 1040. The network 1043 is formed of a photocurable monomer formed of a transparent material or a thermally curable monomer formed of a transparent material that transmits light. The network 1043 has the same refractive index as a polymer 1030*c* in the first liquid crystal unit 1030. Further, since the network 1043 is formed into a net shape in a top-down direction within the second liquid crystal unit 1040, the network 1043 enables the liquid crystal 1041 to be aligned perpendicularly. Further, in addition, the network 1043 may maintain a cell gap of the second liquid crystal unit 1040.

Next, referring to FIG. 13B, the first electrode unit 1010 of the light control device 1000 includes a first substrate 1011, a first electrode 1012, an insulating layer 1013, and a common electrode 1014. Specifically, the first electrode 1012 including a plurality of pattern electrodes 1012a and 1012b configured to apply a horizontal electric field to a plurality of liquid crystal units 1030 and 1040 is disposed on the first substrate 1011. The insulating layer 1013 is disposed between the first substrate 1011 and the first electrode 1012, and the common electrode 1014 is disposed between the insulating layer 1013 and the first substrate 1011.

Hereinafter, driving methods of a transparent mode and a light shielding mode of the light control device 1000 illustrated in FIG. 13A and FIG. 13B will be described.

In the normal state of the light control device 1000, the liquid crystal 1041 in the second liquid crystal unit 1040 is perpendicular to the first electrode unit 1010 and the second electrode unit 1020. Thus, the coloring member 1042 is also aligned in a vertical direction with respect to the first electrode unit 1010 and the second electrode unit 1020. As described above, a refractive index of a short axis 1030S of the liquid crystal 1030a in the first liquid crystal unit 1030, a refractive index of the polymer 1030c in the first liquid crystal unit 1030, a refractive index of a short axis 1041S of the liquid crystal 1041 in the second liquid crystal unit 1040, and a refractive index of the network 1043 in the second liquid crystal unit 1040 are identical to each other. Therefore, in a state where an electric field is not applied to the first liquid crystal unit 1030 and the second liquid crystal unit 1040, a light incident into the light control device 1000 passes through the light control device 1000. Further, the light incident into the light control device 1000 reaches a short axis 1042S of the coloring member 1042 which is relatively shorter than a long axis 1042L of the coloring member 1042. Therefore, an amount of the light incident into the light control device 1000 and then absorbed by the coloring member 1042 is very small. Also, most of the light passes through the first liquid crystal unit 1030 and the second liquid crystal unit 1040. Thus, the light control device 1000 can be implemented in a transparent mode in which a transparent state is maintained. Accordingly, in the normal state of the light control device 1000, liquid crystals are aligned to transmit a light incident from the outside. Thus, in the normal state, the light control device 1000 can implement a transparent mode. Therefore, power consumption of the light control device 1000 can be reduced.

In case of a positive liquid crystal, a long axis of the positive liquid crystal moves toward a direction of an electric field. Therefore, when a voltage is supplied to the plurality of pattern electrodes 1012a and 1012b of the first electrode unit 1010 or the plurality of pattern electrodes 1012a and 1012b and the common electrode 1014 and a horizontal electric field is generated, the alignment of the liquid crystal 1030a and the liquid crystal 1041 may be changed.

When a voltage is applied to the plurality of pattern electrodes 1012a and 1012b or the plurality of pattern electrodes 1012a and 1012b and the common electrode 1014 and an electric field is applied to the first liquid crystal unit 1030, the liquid crystal 1030a in the first liquid crystal unit 1030 is aligned so as to scatter the light incident from the outside. That is, when an electric field is applied to the first liquid crystal unit 1030, the liquid crystal 1030a is changed from a homeotropic state to a planar state. Thus, there is made a difference in refractive index between the polymer 1030c and the liquid crystal 1030a, so that the light incident from the outside is scattered. An incident light path of the light incident into the second liquid crystal unit 1040 via the first liquid crystal unit 1030 through light scattering is longer than an incident light path of the light incident into the first liquid crystal unit 1030. Since an incident light path of the light scattered by the first liquid crystal unit 1030 is increased as such, the light is more likely to reach the coloring member 1042 positioned within the second liquid crystal unit 1040.

When a voltage is applied to the plurality of pattern electrodes 1012a and 1012b or the plurality of pattern electrodes 1012a and 1012b and the common electrode 1014 and an electric field is applied to the second liquid crystal unit 1040, a long axis 1041L of the liquid crystal 1041 in the second liquid crystal unit 1040 lies in an X-axis direction or Z-axis direction with respect to the first electrode unit 1010 and the second electrode unit 1020. Therefore, the light incident through the first liquid crystal unit 1030 is scattered by the liquid crystal 1041 in the second liquid crystal unit 1040. Further, the light L incident through the first liquid crystal unit 1030 is scattered by the network 1043 as well as the liquid crystal 1041 in the planar state.

Accordingly, the light primarily scattered by the first liquid crystal unit 1030 is secondarily scattered by the liquid crystal 1041 in the planar state and the network 1043 within the second liquid crystal unit 1040. Therefore, the light path of the light primarily scattered by the first liquid crystal unit 1030 is further increased due to secondary scattering within the second liquid crystal unit 1040, and, thus, the light is more likely to reach the coloring member 1042.

If an electric field is applied to the second liquid crystal unit 1040 and the liquid crystal 1041 is aligned in the planar state, the coloring member 1042 lies according to a lying direction of the adjacent liquid crystal 1041 (i.e., alignment direction of the liquid crystal 1041) under the influence of the electric field.

Therefore, the light scattered by the liquid crystal 1030a in the first liquid crystal unit 1030 and the liquid crystal 1041 in the second liquid crystal unit 1040 reaches the long axis 1042L of the coloring member 1042 which is relatively longer than the short axis 1042S of the coloring member 1042. Therefore, the light reaches a very large area of the coloring member 1042. Thus, most of the light is absorbed by the coloring member 1042. Thus, the light control device 1000 may be driven in a light shielding mode in which a light shielding state is maintained while exhibiting a color, for example, black color, of the coloring member 1042.

Although not illustrated in FIG. 13A and FIG. 13B, the wall 270 and the refractive index matching layer 380 illustrated in FIG. 5 and FIG. 6 may also be applied to the light control device 1000.

Figure 14:
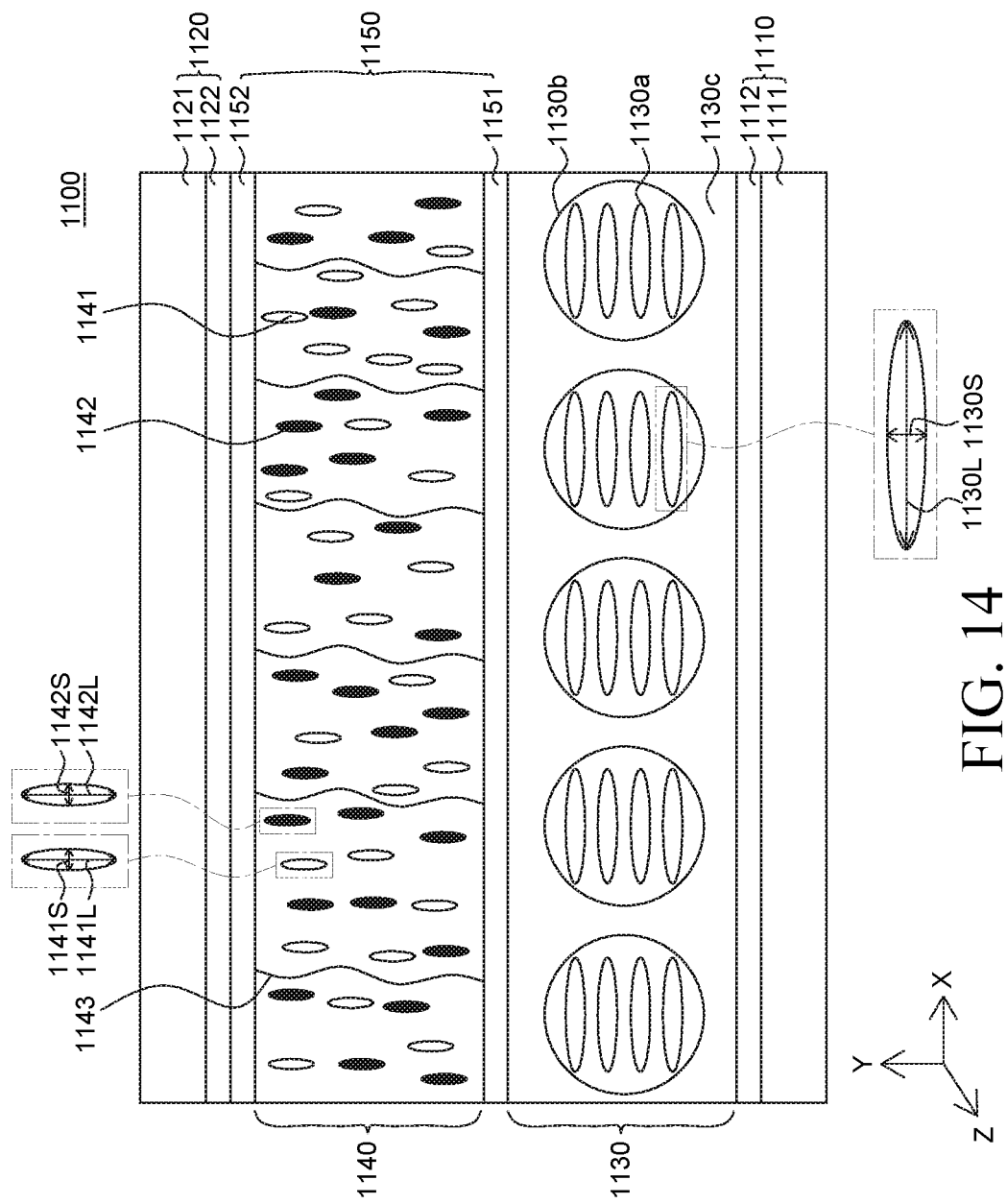
FIG. 14 is a cross-sectional view of a light control device according to still another exemplary embodiment of the present invention.

FIG. 14 is a cross-sectional view of a light control device according to still another exemplary embodiment of the present invention. Referring to FIG. 14, a light control device 1100 includes a first electrode unit 1110, a second electrode unit 1120, a first liquid crystal unit 1130, a second liquid crystal unit 1140, and an alignment unit 1150. The first electrode unit 1110, the second electrode unit 1120, the first liquid crystal unit 1130, and the alignment unit 1150 illustrated in FIG. 14 are substantially the same as the first electrode unit 510, the second electrode unit 520, the first liquid crystal unit 530, and the alignment unit 550 described above with reference to FIG. 8. Therefore, a detailed explanation of the first electrode unit 1110, the second electrode unit 1120, the first liquid crystal unit 1130, and the alignment unit 1150 illustrated in FIG. 14 will be omitted.

Referring to FIG. 14, the second liquid crystal unit 1140 includes a polymer networked liquid crystal (PNLC) including a liquid crystal 1141, a coloring member 1142, and a network 1143. The liquid crystal 1141 in the second liquid crystal unit 1140 normally has a homeotropic state where the liquid crystal 1141 is aligned perpendicularly to the first electrode unit 1110 and the second electrode unit 1120. Further, the liquid crystal 1141 in the second liquid crystal unit 1140 may be a negative liquid crystal which may be changed in alignment by a vertical (y-axis) electric field, but is not limited thereto.

The coloring member 1142 has a long axis 1142S and a short axis 1142S and may be changed in alignment under the influence of an alignment direction of the liquid crystal 1141 of the second liquid crystal unit 1140 in which the coloring member 1142 is positioned.

The network 1143 is positioned in a polymer networked form in the second liquid crystal unit 1140. The network 1143 is formed of a photocurable monomer formed of a transparent material or a thermally curable monomer formed of a transparent material that transmits light. The network 1143 has the same refractive index as a polymer 1130c in the first liquid crystal unit 1130. Further, since the network 1143 is formed into a net shape in a top-down direction within the second liquid crystal unit 1140, the network 1143 enables the liquid crystal 1141 to be aligned perpendicularly. Further, in addition, the network 1143 may maintain a cell gap of the second liquid crystal unit 1140.

Hereinafter, driving methods of a transparent mode and a light shielding mode of the light control device 1100 illustrated in FIG. 14 will be described.

As described above, a refractive index of a long axis 1130L of a liquid crystal 1130a in the first liquid crystal unit 1130, a refractive index of the polymer 1130c in the first liquid crystal unit 1130, a refractive index of a short axis 1141S of the liquid crystal 1141 in the second liquid crystal unit 1140, and a refractive index of the network 1143 in the second liquid crystal unit 1140 are identical to each other. Therefore, in the normal state of the light control device 1100, i.e., a state where an electric field is not applied to the first liquid crystal unit 1130 and the second liquid crystal unit 1140, a light incident into the light control device 1100 passes through the light control device 1100. Accordingly, in the normal state of the light control device 1100, liquid crystals are aligned to transmit a light incident from the outside. Thus, in the normal state, the light control device 1100 can implement a transparent mode. Therefore, power consumption of the light control device 1100 can be reduced.

In case of a positive liquid crystal, a long axis of the positive liquid crystal moves toward a direction of an electrical field, and in case of a negative liquid crystal, a short axis of the negative liquid crystal moves toward a direction of an electric field. Therefore, when a voltage is supplied to the first electrode 1112 and the second electrode 1122 and a vertical electric field is generated, the alignment of the liquid crystal 1130a as a positive liquid crystal in the first liquid crystal unit 1130 and the liquid crystal 1141 as a negative liquid crystal in the second liquid crystal unit 1140 may be changed.

When a voltage is supplied to the first electrode 1112 and the second electrode 1122 and an electric field is applied to the first liquid crystal unit 1130, the liquid crystal 1130a in the first liquid crystal unit 1130 is aligned so as to scatter the light incident from the outside. That is, when an electric field is applied to the first liquid crystal unit 1130, the liquid crystal 1130a is changed to a homeotropic state where the long axis 1130L is aligned perpendicularly to the first electrode unit 1110 and the second electrode unit 1120. Thus, there is made a difference in refractive index between the polymer 1130c and the liquid crystal 1130a, so that the light incident from the outside is scattered.

When a voltage is applied to the first electrode 1112 and the second electrode 1122 and an electric field is applied to the second liquid crystal unit 1140, a long axis 1141L of the liquid crystal 1141 in the second liquid crystal unit 1140 lies in an X-axis direction or Z-axis direction with respect to the first electrode unit 1110 and the second electrode unit 1120. Therefore, the light incident through the first liquid crystal unit 1130 is scattered by the liquid crystal 1141 in the second liquid crystal unit 1140. Further, the light incident through the first liquid crystal unit 1130 is scattered by the network 1143 as well as the liquid crystal 1141 in the planar state.

Accordingly, the light primarily scattered by the first liquid crystal unit 1130 is secondarily scattered by the liquid crystal 1141 in the planar state and the network 1143 within the second liquid crystal unit 1140. Therefore, the light path of the light primarily scattered by the first liquid crystal unit 1130 is further increased due to secondary scattering within the second liquid crystal unit 1140, and, thus, the light is more likely to reach the coloring member 1142.

If an electric field is applied to the second liquid crystal unit 1140 and the liquid crystal 1141 is aligned in the planar state, the coloring member 1142 lies according to a lying direction of the adjacent liquid crystal 1141 (i.e., alignment direction of the liquid crystal 1141) under the influence of the electric field.

Therefore, the light scattered by the liquid crystal 1130a in the first liquid crystal unit 1130 and the liquid crystal 1141 in the second liquid crystal unit 1140 reaches the long axis 1142L of the coloring member 1142 which is relatively longer than the short axis 1142S of the coloring member 1142. Therefore, the light reaches a very large area of the coloring member 1142. Thus, most of the light is absorbed by the coloring member 1142. Therefore, the light control device 1100 may be driven in a light shielding mode in which a light shielding state is maintained while exhibiting a color, for example, black color, of the coloring member 1142.

Although not illustrated in FIG. 14, the wall 270 and the refractive index matching layer 380 illustrated in FIG. 5 and FIG. 6 may also be applied to the light control device 1100.

Figure 15A:
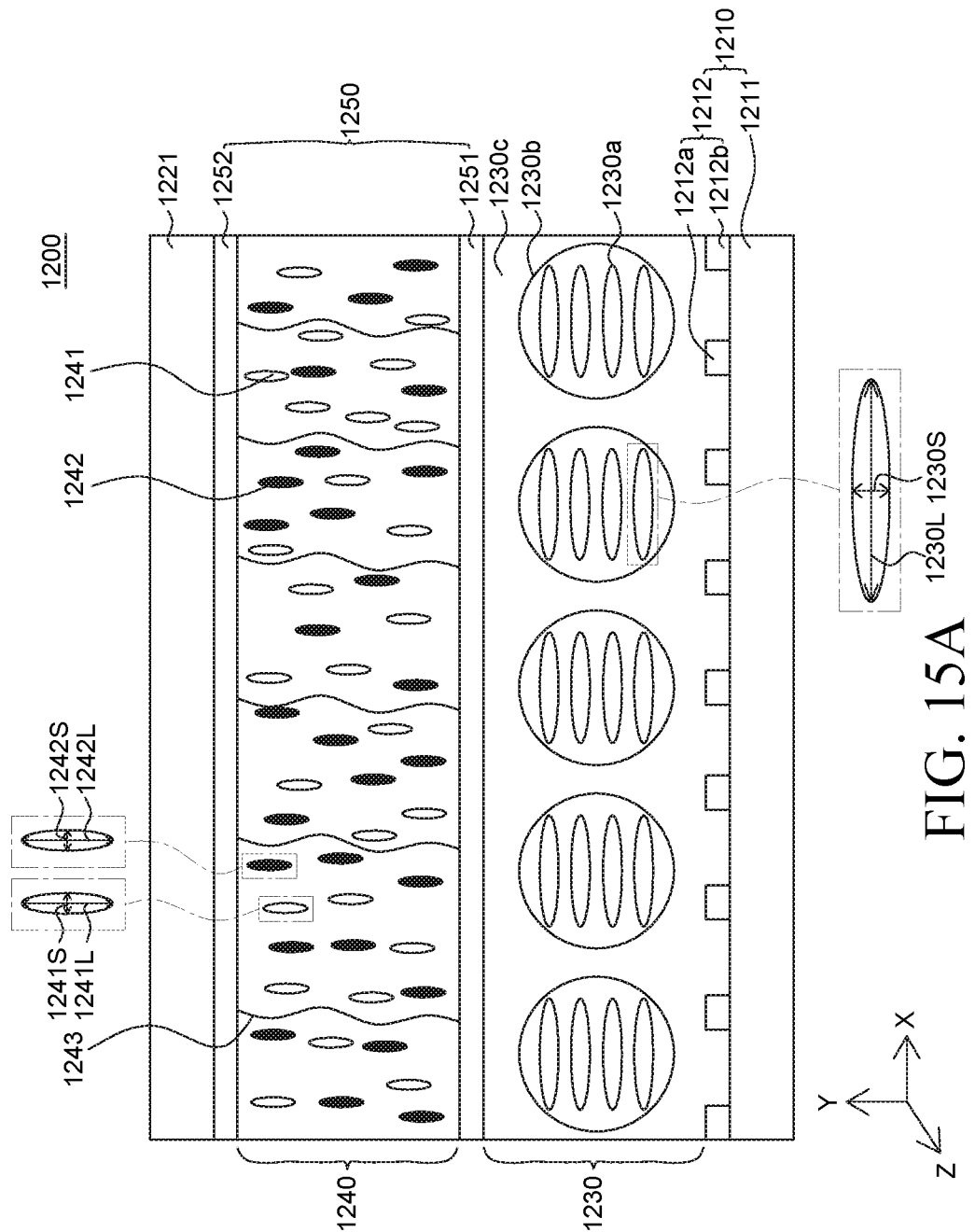
FIG. 15A and FIG. 15B are cross-sectional views of a light control device according to still another exemplary embodiment of the present invention.
Figure 15B:
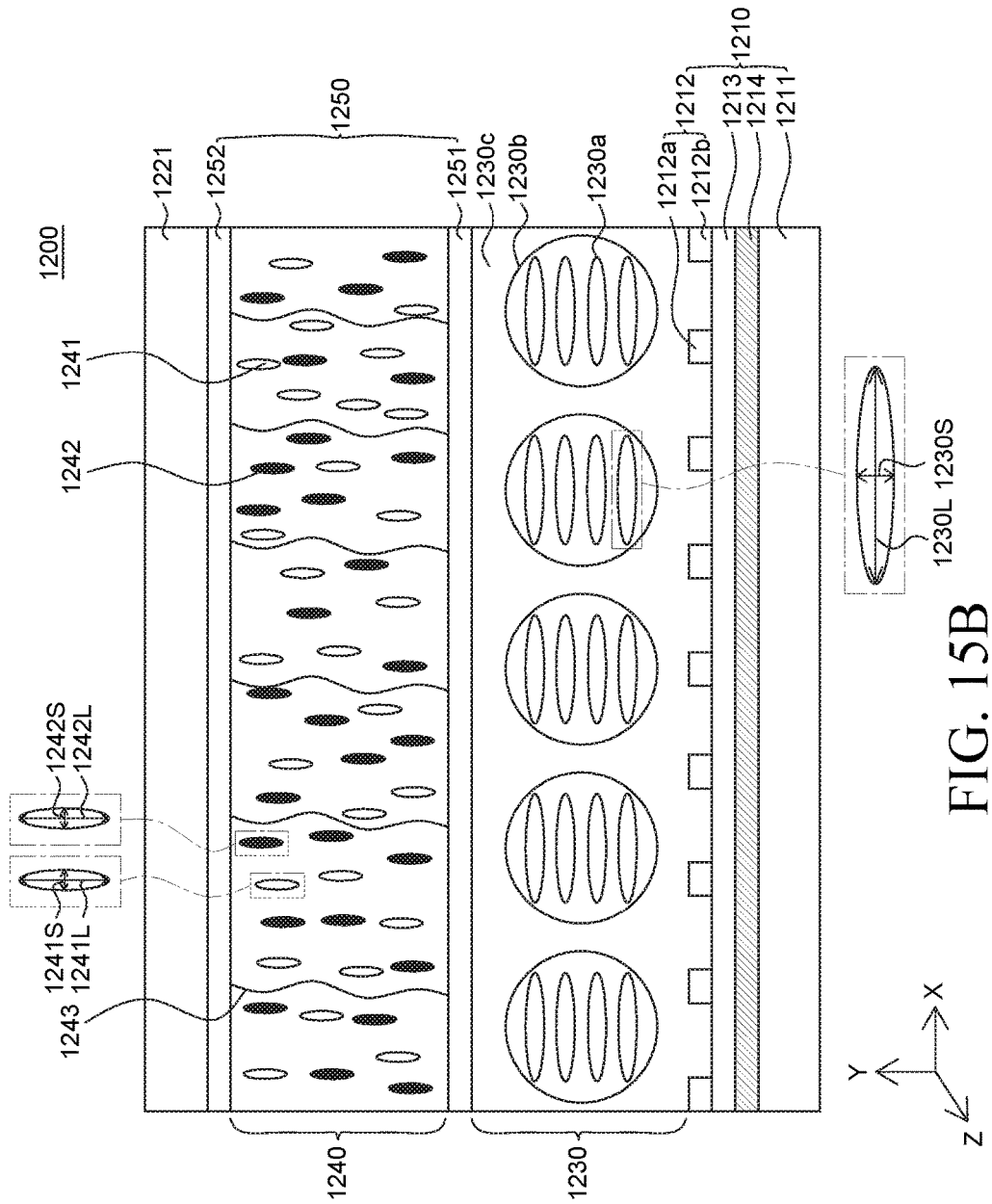

FIG. 15A and FIG. 15B are cross-sectional views of a light control device according to still another exemplary embodiment of the present invention. First, referring to FIG. 15A, a light control device 1200 includes a first electrode unit 1210, a second substrate 1221, a first liquid crystal unit 1230, a second liquid crystal unit 1240, and an alignment unit 1250. The first electrode unit 1210, the second substrate 1221, the first liquid crystal unit 1230, and the alignment unit 1250 illustrated in FIG. 15A are substantially the same as the first electrode unit 610, the second substrate 621, the first liquid crystal unit 630, and the alignment unit 650 described above with reference to FIG. 9A and FIG. 9B. Therefore, a detailed explanation of the first electrode unit 1210, the second substrate 1221, the first liquid crystal unit 1230, and the alignment unit 1250 illustrated in FIG. 15A will be omitted.

Referring to FIG. 15A, the second liquid crystal unit 1240 includes a polymer networked liquid crystal (PNLC) including a liquid crystal 1241, a coloring member 1242, and a network 1243. The liquid crystal 1241 in the second liquid crystal unit 1240 normally has a homeotropic state where the liquid crystal 1241 is aligned perpendicularly to the first electrode unit 1210 and a second electrode unit 1220. Further, the liquid crystal 1241 in the second liquid crystal unit 1240 may be a positive liquid crystal which may be changed in alignment by a horizontal (x-axis) electric field, but is not limited thereto.

The coloring member 1242 has a long axis 1242S and a short axis 1242S and may be changed in alignment under the influence of an alignment direction of the liquid crystal 1241 of the second liquid crystal unit 1240 in which the coloring member 1242 is positioned.

The network 1243 is positioned in a polymer networked form in the second liquid crystal unit 1240. The network 1243 is formed of a photocurable monomer formed of a transparent material or a thermally curable monomer formed of a transparent material that transmits light. The network 1243 has the same refractive index as a polymer 1230c in the first liquid crystal unit 1230. Further, since the network 1243 is formed into a net shape in a top-down direction within the second liquid crystal unit 1240, the network 1243 enables the liquid crystal 1241 to be aligned perpendicularly. Further, in addition, the network 1243 may maintain a cell gap of the second liquid crystal unit 1240.

Next, referring to FIG. 15B, the first electrode unit 1210 of the light control device 1200 includes a first substrate 1211, a first electrode 1212, an insulating layer 1213, and a common electrode 1214. Specifically, the first electrode 1212 including a plurality of pattern electrodes 1212a and 1212b configured to apply a horizontal electric field to a plurality of liquid crystal units 1230 and 1240 is disposed on the first substrate 1211. The insulating layer 1213 is disposed between the first substrate 1211 and the first electrode 1212, and the common electrode 1214 is disposed between the insulating layer 1213 and the first substrate 1211.

Hereinafter, driving methods of a transparent mode and a light shielding mode of the light control device 1200 illustrated in FIG. 15A and FIG. 15B will be described.

In the normal state of the light control device 1200, the liquid crystal 1241 in the second liquid crystal unit 1240 is perpendicular to the first electrode unit 1210 and the second electrode unit 1220. Thus, the coloring member 1242 is also aligned in a vertical direction with respect to the first electrode unit 1210 and the second electrode unit 1220. As described above, a refractive index of a short axis 1230S of a liquid crystal 1230a in the first liquid crystal unit 1230, a refractive index of the polymer 1230c in the first liquid crystal unit 1230, a refractive index of a short axis 1241S of the liquid crystal 1241 in the second liquid crystal unit 1240, and a refractive index of the network 1243 in the second liquid crystal unit 1240 are identical to each other. Therefore, in a state where an electric field is not applied to the first liquid crystal unit 1230 and the second liquid crystal unit 1240, a light incident into the light control device 1200 passes through the light control device 1200. Further, the light incident into the light control device 1200 reaches a short axis 1242S of the coloring member 1242 which is relatively shorter than a long axis 1242L of the coloring member 1242. Therefore, an amount of the light absorbed by the coloring member 1242 is very small. Also, most of the light of the light control device 1200 passes through the first liquid crystal unit 1230 and the second liquid crystal unit 1240. Thus, the light control device 1200 can be implemented in a transparent mode in which a transparent state is maintained. Accordingly, in the normal state of the light control device 1200, liquid crystals are aligned to transmit a light incident from the outside. Thus, in the normal state, the light control device 1200 can implement a transparent mode. Therefore, power consumption of the light control device 1200 can be reduced.

In case of a positive liquid crystal, a long axis of the positive liquid crystal moves toward a direction of an electrical field, and in case of a negative liquid crystal, a short axis of the negative liquid crystal moves toward a direction of an electric field. Therefore, when a voltage is supplied to the plurality of pattern electrodes 1212a and 1212b of the first electrode unit 1210 or the plurality of pattern electrodes 1212a and 1212b and the common electrode 1214 and a horizontal electric field is generated, the alignment of the liquid crystal 1230a and the liquid crystal 1241 may be changed.

When a voltage is supplied to the plurality of pattern electrodes 1212a and 1212b or the plurality of pattern electrodes 1212a and 1212b and the common electrode 1214 and an electric field is applied to the first liquid crystal unit 1230, the liquid crystal 1230a in the first liquid crystal unit 1230 is aligned so as to scatter the light incident from the outside. In this case, when an electric field is applied to the first liquid crystal unit 1230, the liquid crystal 1230a is changed from a planar state to a homeotropic state. Thus, there is made a difference in refractive index between the polymer 1230c and the liquid crystal 1230a, so that the light incident from the outside is scattered. An incident light path of the light incident into the second liquid crystal unit 1240 via the first liquid crystal unit 1230 through light scattering is longer than an incident light path of the light incident into the first liquid crystal unit 1230. An incident light path of the light scattered by the first liquid crystal unit 1230 is increased as such. Therefore, the light L with the increased incident light path is more likely to reach the coloring member 1242 positioned within the second liquid crystal unit 1240.

When a voltage is applied to the plurality of pattern electrodes 1212a and 1212b or the plurality of pattern electrodes 1212a and 1212b and the common electrode 1214 and an electric field is applied to the second liquid crystal unit 1240, a long axis 1241L of the liquid crystal 1241 in the second liquid crystal unit 1240 lies in an X-axis direction or Z-axis direction with respect to the first electrode unit 1210 and the second electrode unit 1220. Therefore, the light incident through the first liquid crystal unit 1230 is scattered by the liquid crystal 1241 in the second liquid crystal unit 1240. Further, the light incident through the first liquid crystal unit 1230 is scattered by the network 1243 as well as the liquid crystal 1241 in the planar state.

Accordingly, the light primarily scattered by the first liquid crystal unit 1230 is secondarily scattered by the liquid crystal 1241 in the planar state and the network 1243 within the second liquid crystal unit 1240. Therefore, the light path of the light primarily scattered by the first liquid crystal unit 1230 is further increased due to secondary scattering within the second liquid crystal unit 1240, and, thus, the light is more likely to reach the coloring member 1242.

If an electric field is applied to the second liquid crystal unit 1240 and the liquid crystal 1241 is aligned in the planar state, the coloring member 1242 lies according to a lying direction of the adjacent liquid crystal 1241 (i.e., alignment direction of the liquid crystal 1241) under the influence of the electric field.

Therefore, the light scattered by the liquid crystal 1230a in the first liquid crystal unit 1230 and the liquid crystal 1241 in the second liquid crystal unit 1240 reaches the long axis 1242L of the coloring member 1242 which is relatively longer than the short axis 1242S of the coloring member 1242. Therefore, the light reaches a very large area of the coloring member 1242. Thus, most of the light is absorbed by the coloring member 1242. Therefore, the light control device 1200 may be driven in a light shielding mode in which a light shielding state is maintained while exhibiting a color, for example, black color, of the coloring member 1242.

Although not illustrated in FIG. 15A and FIG. 15B, the wall 270 and the refractive index matching layer 380 illustrated in FIG. 5 and FIG. 6 may also be applied to the light control device 1200.

Figure 16A:
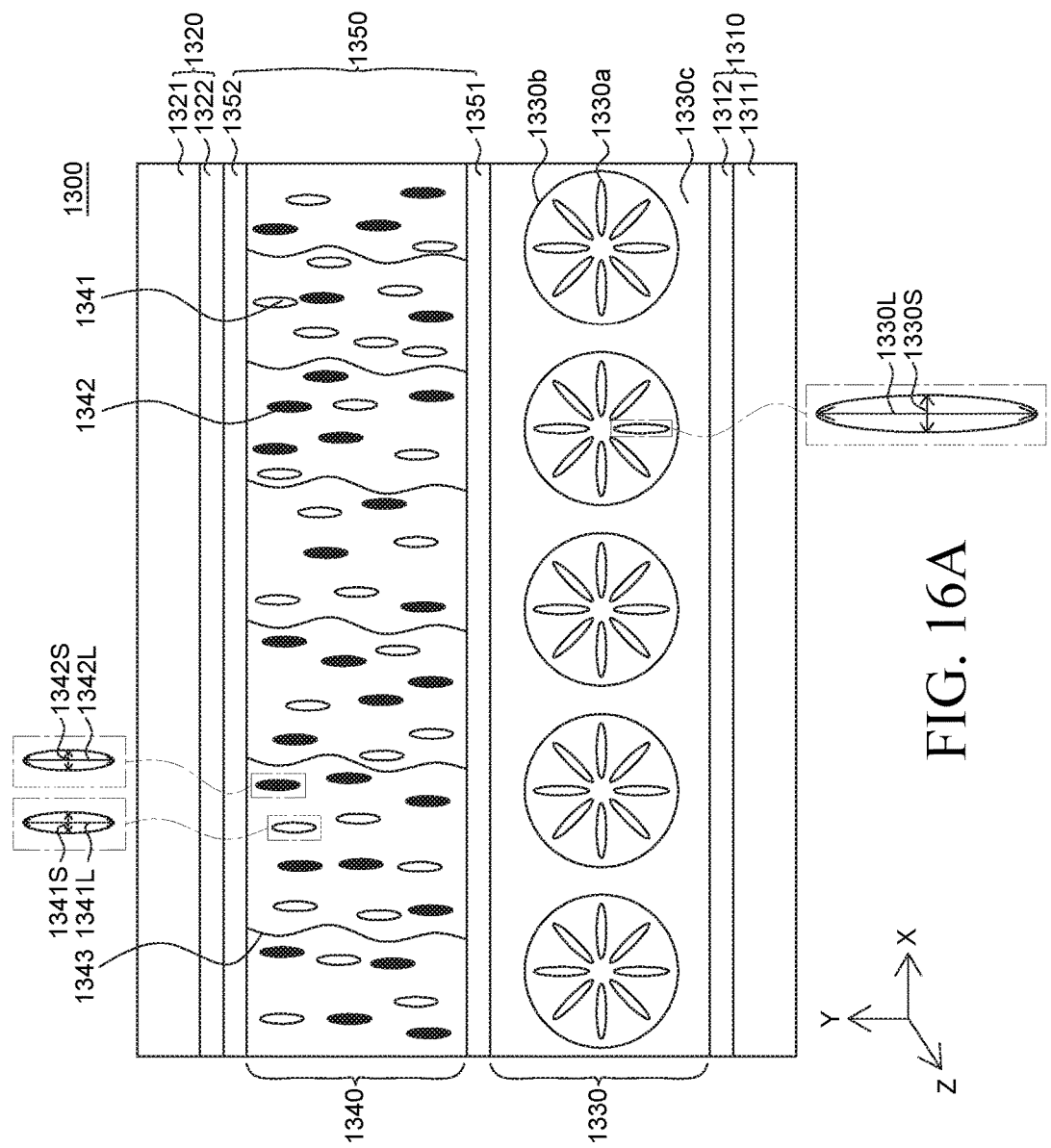
FIG. 16A is a cross-sectional view of a light control device according to still another exemplary embodiment of the present invention.
Figure 16B:
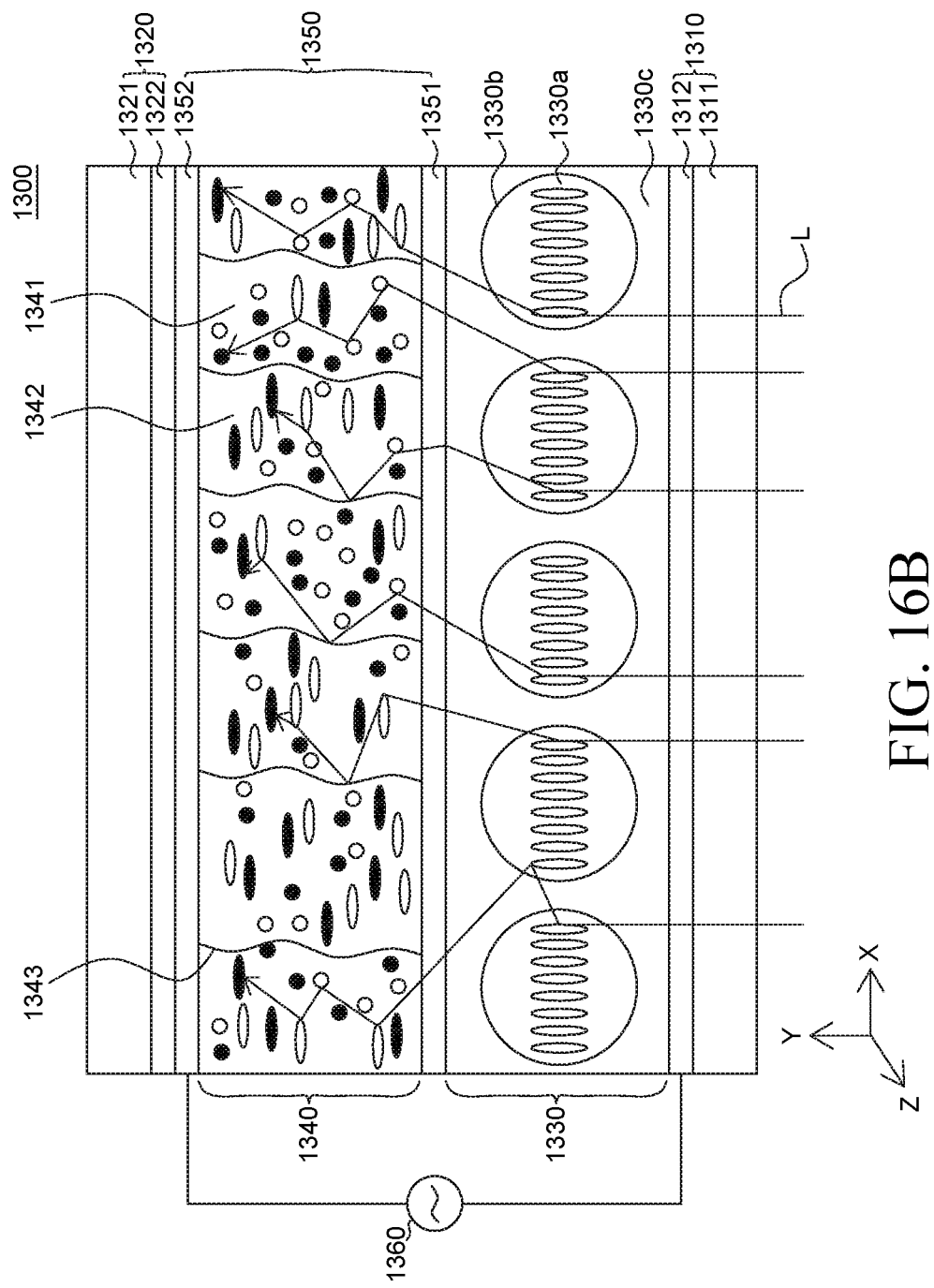
FIG. 16B is a schematic cross-sectional view illustrating a light shielding mode of the light control device illustrated in FIG. 16A when a first liquid crystal unit of the light control device is a positive liquid crystal.
Figure 16C:
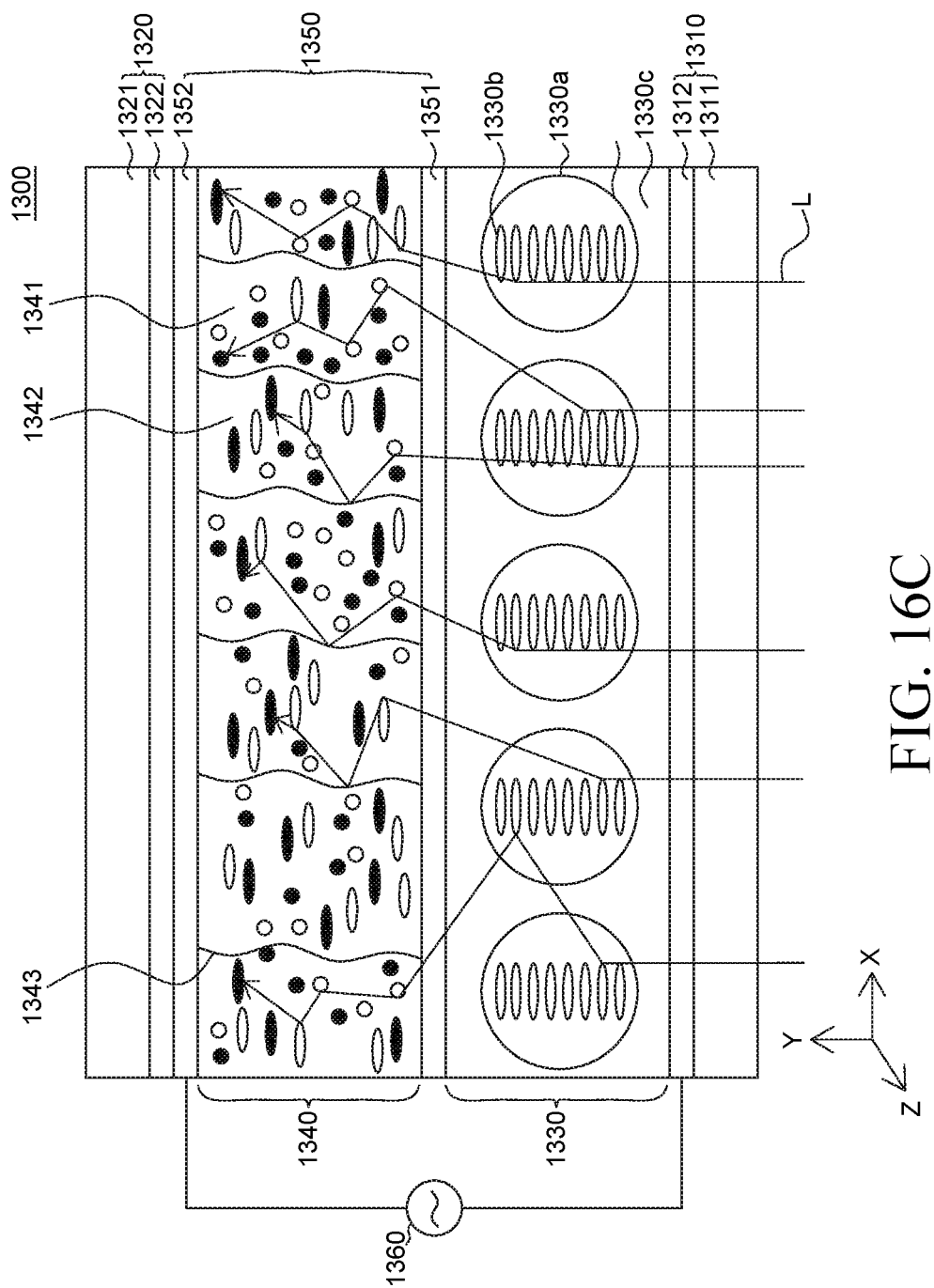
FIG. 16C is a schematic cross-sectional view illustrating a light shielding mode of the light control device illustrated in FIG. 16A when a first liquid crystal unit of the light control device is a negative liquid crystal.

FIG. 16A is a cross-sectional view of a light control device according to still another exemplary embodiment of the present invention. FIG. 16B is a schematic cross-sectional view illustrating a light shielding mode of the light control device illustrated in FIG. 16A when a first liquid crystal unit of the light control device is a positive liquid crystal. FIG. 16C is a schematic cross-sectional view illustrating a light shielding mode of the light control device illustrated in FIG. 16A when a first liquid crystal unit of the light control device is a negative liquid crystal. Referring to FIG. 16A through FIG. 16C, a light control device 1300 includes a first electrode unit 1310, a second electrode unit 1320, a first liquid crystal unit 1330, a second liquid crystal unit 1340, and an alignment unit 1350. The first electrode unit 1310, the second electrode unit 1320, the first liquid crystal unit 1330, and the alignment unit 1350 illustrated in FIG. 16A through FIG. 16C are substantially the same as the first electrode unit 710, the second electrode unit 720, the first liquid crystal unit 730, and the alignment unit 750 described above with reference to FIG. 10A through FIG. 10B. Therefore, a detailed explanation of the first electrode unit 1310, the second electrode unit 1320, the first liquid crystal unit 1330, and the alignment unit 1350 illustrated in FIG. 16A through FIG. 16C will be omitted.

Referring to FIG. 16A, the second liquid crystal unit 1340 includes a polymer networked liquid crystal (PNLC) including a liquid crystal 1341, a coloring member 1342, and a network 1343. The liquid crystal 1341 in the second liquid crystal unit 1340 normally has a homeotropic state where the liquid crystal 1341 is aligned perpendicularly to the first electrode unit 1310 and the second electrode unit 1320. Further, the liquid crystal 1341 in the second liquid crystal unit 1340 may be a negative liquid crystal which may be changed in alignment by a vertical (y-axis) electric field, but is not limited thereto.

The coloring member 1342 has a long axis 1342S and a short axis 1342S and may be changed in alignment under the influence of an alignment direction of the liquid crystal 1341 of the second liquid crystal unit 1340 in which the coloring member 1342 is positioned.

The network 1343 is positioned in a polymer networked form in the second liquid crystal unit 1340. The network 1343 is formed of a photocurable monomer formed of a transparent material or a thermally curable monomer formed of a transparent material that transmits light. The network 1343 has the same refractive index as a polymer 1330c in the first liquid crystal unit 1330. Further, since the network 1343 is formed into a net shape in a top-down direction within the second liquid crystal unit 1340, the network 1343 enables the liquid crystal 1341 to be aligned perpendicularly. Further, in addition, the network 1343 may maintain a cell gap of the second liquid crystal unit 1340.

Hereinafter, a driving method for a transparent mode of the light control device 1300 illustrated in FIG. 16A will be described.

In the normal state of the light control device 1300, the liquid crystal 1341 in the second liquid crystal unit 1340 is perpendicular to the first electrode unit 1310 and the second electrode unit 1320. Thus, the coloring member 1342 is also aligned in a vertical direction with respect to the first electrode unit 1310 and the second electrode unit 1320. As described above, an average refractive index of a liquid crystal 1330a in the first liquid crystal unit 1330, a refractive index of the polymer 1330c in the first liquid crystal unit 1330, a refractive index of a short axis 1341S of the liquid crystal 1341 in the second liquid crystal unit 1340, and a refractive index of the network 1343 in the second liquid crystal unit 1340 are identical to each other. Therefore, in a state where an electric field is not applied to the first liquid crystal unit 1330 and the second liquid crystal unit 1340, a light incident into the light control device 1300 passes through the light control device 1300. Further, the light incident into the light control device 1300 reaches a short axis 1342S of the coloring member 1342 which is relatively shorter than a long axis 1342L of the coloring member 1342. Therefore, an amount of the light absorbed by the coloring member 1342 is very small. Also, most of the light passes through the first liquid crystal unit 1330 and the second liquid crystal unit 1340. Thus, the light control device 1300 can be implemented in a transparent mode in which a transparent state is maintained. Accordingly, in the normal state of the light control device 1300, liquid crystals are aligned to transmit a light incident from the outside. Thus, in the normal state, the light control device 1300 can implement a transparent mode. Therefore, power consumption of the light control device 1300 can be reduced.

Hereinafter, a driving method for a light shielding mode of the light control device 1300 illustrated in FIG. 16A will be described with reference to FIG. 16B and FIG. 16C.

First, referring to FIG. 16B, in case of a positive liquid crystal, a long axis of the positive liquid crystal moves toward a direction of an electrical field, and in case of a negative liquid crystal, a short axis of the negative liquid crystal moves toward a direction of an electric field. Therefore, when a voltage is supplied to the first electrode 1312 and the second electrode 1322 using a power supply 1360 to generate a vertical electric field, the alignment of the liquid crystal 1330a as a positive liquid crystal in the first liquid crystal unit 1330 and the liquid crystal 1341 as a negative liquid crystal in the second liquid crystal unit 1340 may be changed.

When a voltage is applied to the first electrode 1312 and the second electrode 1322 and an electric field is applied to the first liquid crystal unit 1330, the liquid crystal 1330a in the first liquid crystal unit 1330 is aligned so as to scatter a light L incident from the outside. That is, when an electric field is applied to the first liquid crystal unit 1330, the liquid crystal 1330a is changed to a homeotropic state where a long axis 1330L is aligned perpendicularly to the first electrode unit 1310 and the second electrode unit 1320. Thus, there is made a difference in refractive index between the polymer 1330c and the liquid crystal 1330a, so that the light L incident from the outside is scattered.

When a voltage is applied to the first electrode 1312 and the second electrode 1322 and an electric field is applied to the second liquid crystal unit 1340, the liquid crystal 1341 in the second liquid crystal unit 1340 lies. In this case, a long axis 1341L of the liquid crystal 1341 in the second liquid crystal unit 1340 indicates an X-axis direction or Z-axis direction with respect to the first electrode unit 1310 and the second electrode unit 1320. Therefore, the light L incident through the first liquid crystal unit 1330 is scattered by the liquid crystal 1341 in the second liquid crystal unit 1340. Further, the light L incident through the first liquid crystal unit 1330 is scattered by the network 1343 as well as the liquid crystal 1341 in the planar state.

Accordingly, the light L primarily scattered by the first liquid crystal unit 1330 is secondarily scattered by the liquid crystal 1341 in the planar state and the network 1343 within the second liquid crystal unit 1340. Therefore, the light path of the light L primarily scattered by the first liquid crystal unit 1330 is further increased due to secondary scattering within the second liquid crystal unit 1340, and, thus, the light L is more likely to reach the coloring member 1342.

If an electric field is applied to the second liquid crystal unit 1340 and the liquid crystal 1341 is aligned in the planar state, the coloring member 1342 lies according to a lying direction of the adjacent liquid crystal 1341 (i.e., alignment direction of the liquid crystal 1341) under the influence of the electric field.

Therefore, the light L scattered by the liquid crystal 1330a in the first liquid crystal unit 1330 and the liquid crystal 1341 in the second liquid crystal unit 1340 reaches the long axis 1342L of the coloring member 1342 which is relatively longer than the short axis 1342S of the coloring member 1342. Therefore, the light L reaches a very large area of the coloring member 1342. Thus, most of the light L is absorbed by the coloring member 1342. In this case, the light control device 1300 may be driven in a light shielding mode in which a light shielding state is maintained while exhibiting a color, for example, black color, of the coloring member 1342.

Referring to FIG. 16C, in case of a negative liquid crystal, a short axis of the negative liquid crystal moves toward a direction of an electric field. Therefore, when a voltage is supplied to the first electrode 1312 and the second electrode 1322 using the power supply 1360 to generate a vertical electric field, the alignment of the liquid crystal 1330a as a negative liquid crystal in the first liquid crystal unit 1330 and the liquid crystal 1341 in the second liquid crystal unit 1340 may be changed.

When a voltage is applied to the first electrode 1312 and the second electrode 1322 and an electric field is applied to the first liquid crystal unit 1330, the liquid crystal 1330a in the first liquid crystal unit 1330 is aligned so as to scatter the light L incident from the outside. That is, when an electric field is applied to the first liquid crystal unit 1330, the liquid crystal 1330a is changed to a planar state where the long axis 1330L is aligned parallel to the first electrode unit 1310 and the second electrode unit 1320. Thus, there is made a difference in refractive index between the polymer 1330c and the liquid crystal 1330a, so that the light L incident from the outside is scattered. A change in state of the liquid crystal 1341 in the second liquid crystal unit 1340 and scattering of the light L are substantially the same as those described above with reference to FIG. 16B. Therefore, a detailed explanation thereof will be omitted.

Although not illustrated in FIG. 16A through FIG. 16C, the wall 270 and the refractive index matching layer 380 illustrated in FIG. 5 and FIG. 6 may also be applied to the light control device 1300.

Figure 17A:
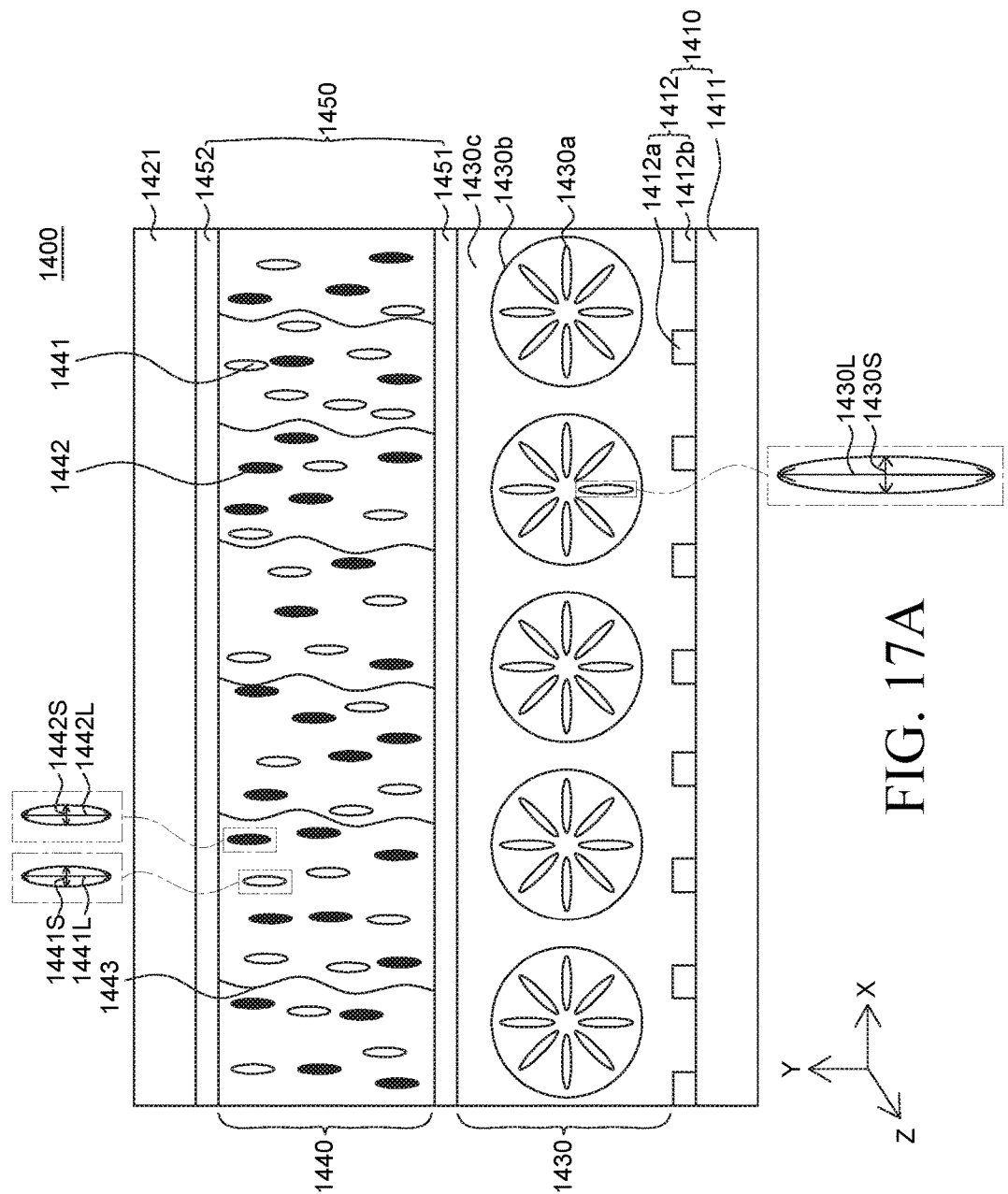
FIG. 17A and FIG. 17B are cross-sectional views of a light control device according to still another exemplary embodiment of the present invention.
Figure 17B:
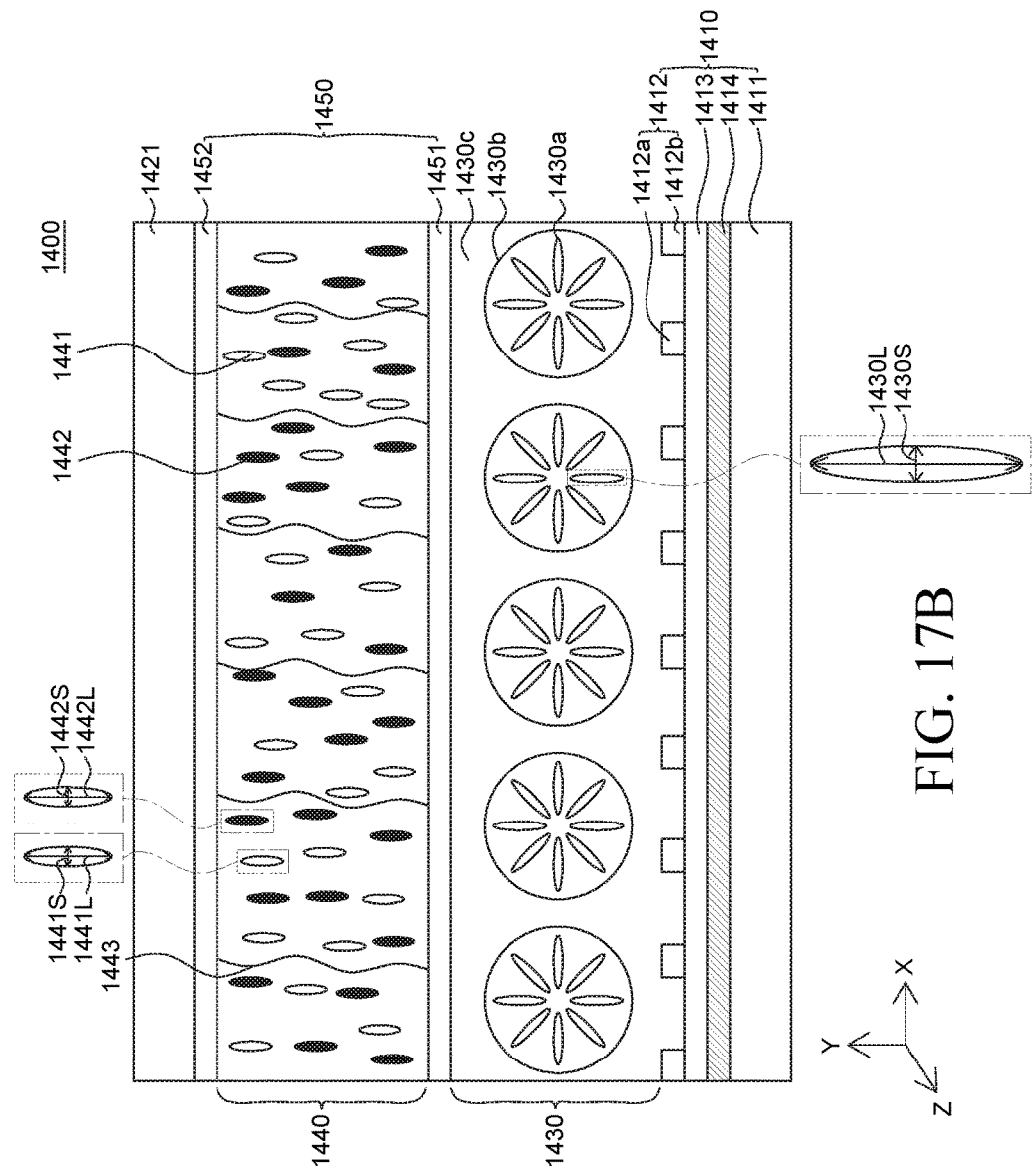

FIG. 17A and FIG. 17B are cross-sectional views of a light control device according to still another exemplary embodiment of the present invention. First, referring to FIG. 17A, a light control device 1400 includes a first electrode unit 1410, a second substrate 1421, a first liquid crystal unit 1430, a second liquid crystal unit 1440, and an alignment unit 1450. The first electrode unit 1410, the second substrate 1421, the first liquid crystal unit 1430, and the alignment unit 1450 illustrated in FIG. 17A are substantially the same as the first electrode unit 810, the second substrate 821, the first liquid crystal unit 830, and the alignment unit 850 described above with reference to FIG. 11A and FIG. 11B. Therefore, a detailed explanation of the first electrode unit 1410, the second substrate 1421, the first liquid crystal unit 1430, and the alignment unit 1450 illustrated in FIG. 17A will be omitted.

Referring to FIG. 17A, the second liquid crystal unit 1440 includes a polymer networked liquid crystal (PNLC) including a liquid crystal 1441, a coloring member 1442, and a network 1443. The liquid crystal 1441 in the second liquid crystal unit 1440 normally has a homeotropic state where the liquid crystal 1441 is aligned perpendicularly to the first electrode unit 1410 and a second electrode unit 1420. Further, the liquid crystal 1441 in the second liquid crystal unit 1440 may be a positive liquid crystal which may be changed in alignment by a horizontal (x-axis) electric field, but is not limited thereto.

The coloring member 1442 has a long axis 1442S and a short axis 1442S and may be changed in alignment under the influence of an alignment direction of the liquid crystal 1441 of the second liquid crystal unit 1440 in which the coloring member 1442 is positioned.

The network 1443 is positioned in a polymer networked form in the second liquid crystal unit 1440. The network 1443 is formed of a photocurable monomer formed of a transparent material or a thermally curable monomer formed of a transparent material that transmits light. The network 1443 has the same refractive index as a polymer 1430c in the first liquid crystal unit 1430. Further, since the network 1443 is formed into a net shape in a top-down direction within the second liquid crystal unit 1440, the network 1443 enables the liquid crystal 1441 to be aligned perpendicularly. Further, in addition, the network 1443 may maintain a cell gap of the second liquid crystal unit 1440.

Next, referring to FIG. 17B, the first electrode unit 1410 of the light control device 1400 includes a first substrate 1411, a first electrode 1412, an insulating layer 1413, and a common electrode 1414. Specifically, the first electrode 1412 including a plurality of pattern electrodes 1412a and 1412b configured to apply a horizontal electric field to a plurality of liquid crystal units 1430 and 1440 is disposed on the first substrate 1411. The insulating layer 1413 is disposed between the first substrate 1411 and the first electrode 1412, and the common electrode 1414 is disposed between the insulating layer 1413 and the first substrate 1411.

Hereinafter, driving methods of a transparent mode and a light shielding mode of the light control device 1400 illustrated in FIG. 17A and FIG. 17B will be described.

In the normal state of the light control device 1400, the liquid crystal 1441 in the second liquid crystal unit 1440 is perpendicular to the first electrode unit 1410 and the second electrode unit 1420. Thus, the coloring member 1442 is also aligned in a vertical direction with respect to the first electrode unit 1410 and the second electrode unit 1420. As described above, an average refractive index of a liquid crystal 1430a in the first liquid crystal unit 1430, a refractive index of the polymer 1430c in the first liquid crystal unit 1430, a refractive index of a short axis 1441S of the liquid crystal 1441 in the second liquid crystal unit 1440, and a refractive index of the network 1443 in the second liquid crystal unit 1440 are identical to each other. Therefore, in a state where an electric field is not applied to the first liquid crystal unit 1430 and the second liquid crystal unit 1440, a light incident into the light control device 1400 passes through the light control device 1400. Further, the light incident into the light control device 1400 reaches a short axis 1442S of the coloring member 1442 which is relatively shorter than a long axis 1442L of the coloring member 1442. Therefore, an amount of the light absorbed by the coloring member 1442 is very small. Also, most of the light of the light control device 1400 passes through the first liquid crystal unit 1430 and the second liquid crystal unit 1440. Thus, the light control device 1400 can be implemented in a transparent mode in which a transparent state is maintained. Accordingly, in the normal state of the light control device 1400, liquid crystals are aligned to transmit a light incident from the outside. Thus, in the normal state, the light control device 1400 can implement a transparent mode. Therefore, power consumption of the light control device 1400 can be reduced.

In case of a positive liquid crystal, a long axis of the positive liquid crystal moves toward a direction of an electrical field, and in case of a negative liquid crystal, a short axis of the negative liquid crystal moves toward a direction of an electric field. Therefore, when a voltage is supplied to the plurality of pattern electrodes 1412a and 1412b of the first electrode unit 1410 or the plurality of pattern electrodes 1412a and 1412b and the common electrode 1414 and a horizontal electric field is generated, the alignment of the liquid crystal 1430a and the liquid crystal 1441 may be changed.

When a voltage is supplied to the plurality of pattern electrodes 1412a and 1412b or the plurality of pattern electrodes 1412a and 1412b and the common electrode 1414 and an electric field is applied to the first liquid crystal unit 1430, the liquid crystal 1430a in the first liquid crystal unit 1430 is aligned so as to scatter the light incident from the outside. That is, if the liquid crystal 1430a is a positive liquid crystal and an electric field is applied to the first liquid crystal unit 1430, the liquid crystal 1430a is changed to a homeotropic state where a long axis 1430L is aligned perpendicularly to the first electrode unit 1410 and the second electrode unit 1420. Thus, there is made a difference in refractive index between the polymer 1430c and the liquid crystal 1430a, so that the light incident from the outside is scattered. Further, if the liquid crystal 1430a is a negative liquid crystal and an electric field is applied to the first liquid crystal unit 1430, the liquid crystal 1430a is changed to a planar state where the long axis 1430L is aligned parallel to the first electrode unit 1410 and the second electrode unit 1420. Thus, there is made a difference in refractive index between the polymer 1430c and the liquid crystal 1430a, so that the light incident from the outside is scattered. An incident light path of the light incident into the second liquid crystal unit 1440 via the first liquid crystal unit 1430 through light scattering is longer than an incident light path of the light incident into the first liquid crystal unit 1430. Since an incident light path of the light scattered by the first liquid crystal unit 1430 is increased as such, the light is more likely to reach the coloring member 1442 positioned within the second liquid crystal unit 1440.

When a voltage is applied to the plurality of pattern electrodes 1412a and 1412b or the plurality of pattern electrodes 1412a and 1412b and the common electrode 1414 and an electric field is applied to the second liquid crystal unit 1440, the liquid crystal 1441 in the second liquid crystal unit 1440 lies. In this case, a long axis 1441L of the liquid crystal 1441 in the second liquid crystal unit 1440 indicates an X-axis direction or Z-axis direction with respect to the first electrode unit 1410 and the second electrode unit 1420. Accordingly, the light incident through the first liquid crystal unit 1430 is scattered by the liquid crystal 1441 in the second liquid crystal unit 1440. Further, the light incident through the first liquid crystal unit 1430 is scattered by the network 1443 as well as the liquid crystal 1441 in the planar state.

Accordingly, the light primarily scattered by the first liquid crystal unit 1430 is secondarily scattered by the liquid crystal 1441 in the planar state and the network 1443 within the second liquid crystal unit 1440. Therefore, the light path of the light primarily scattered by the first liquid crystal unit 1430 is further increased due to secondary scattering within the second liquid crystal unit 1440, and, thus, the light is more likely to reach the coloring member 1442.

If an electric field is applied to the second liquid crystal unit 1440 and the liquid crystal 1441 is aligned in the planar state, the coloring member 1442 lies according to a lying direction of the adjacent liquid crystal 1441 (i.e., alignment direction of the liquid crystal 1441) under the influence of the electric field.

Therefore, the light scattered by the liquid crystal 1430a in the first liquid crystal unit 1430 and the liquid crystal 1441 in the second liquid crystal unit 1440 reaches the long axis 1442L of the coloring member 1442 which is relatively longer than the short axis 1442S. In this case, the light reaches a very large area of the coloring member 1442. Thus, most of the light is absorbed by the coloring member 1442. Thus, the light control device 1400 may be driven in a light shielding mode in which a light shielding state is maintained while exhibiting a color, for example, black color, of the coloring member 1442.

Although not illustrated in FIG. 17A and FIG. 17B, the wall 270 and the refractive index matching layer 380 illustrated in FIG. 5 and FIG. 6 may also be applied to the light control device 1400.

FIG. 18A through FIG. 18E are process cross-sectional views provided to explain a method for manufacturing a light control device according to an exemplary embodiment of the present invention. FIG. 18A through FIG. 18E are process cross-sectional views provided to explain a method for manufacturing the light control device 100 illustrated in FIG. 1 through FIG. 4.

Figure 18A:
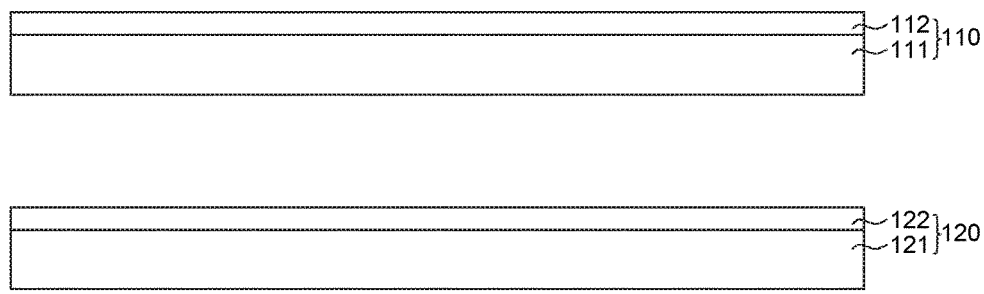
FIG. 18A through FIG. 18E are process cross-sectional views provided to explain a method for manufacturing a light control device according to an exemplary embodiment of the present invention.

As illustrated in FIG. 18A, the first electrode unit 110 is prepared by forming the first electrode 112 on the first substrate 111 which may be formed of a glass-based or plastic-based material. Further, the second electrode unit 120 is prepared by forming the second electrode 122 on the second substrate 121 which may be formed of a glass-based or plastic-based material. When the first electrode 112 is formed on the first substrate 111 and the second electrode 122 is formed on the second substrate 121, sputtering, patterning, CVD (Chemical Vapor Deposition), coating methods, and the like, may be used.

Figure 18B:
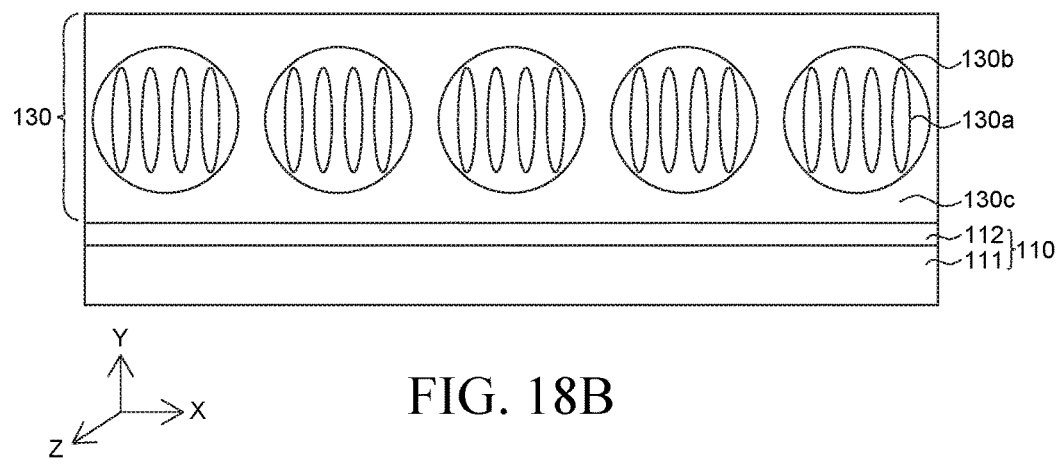

Then, referring to FIG. 18B, the first liquid crystal unit 130 is formed on the first electrode unit 110.

Specifically, a first mixed liquid crystal for forming the first liquid crystal unit 130 is coated on the first electrode unit 110 and cured with UV rays, so that the first liquid crystal unit 130 may be formed. The first mixed liquid crystal includes a plurality of monomers different in surface energy, the liquid crystal 130a, and a photo initiator. Herein, a mixing ratio of the plurality of monomers and the liquid crystal 130a may be from 30 wt %: 70 wt % to 50 wt %: 50 wt %. If the percentage of the plurality of monomers included in the first mixed liquid crystal is equal to or lower than 30 wt %, a light shielding ratio of the first liquid crystal unit 130 in a light shielding mode is decreased. Further, if the percentage of the plurality of monomers included in the first mixed liquid crystal is equal to or higher than 50 wt %, a transmittance ratio of the first liquid crystal unit 130 in a transparent mode is decreased. Therefore, the mixing ratio of the plurality of monomers and the liquid crystal 130a may be determined within the above-described range in consideration of a light shielding ratio or a transmittance ratio. However, the ratio may be modified depending on a cell gap of the first liquid crystal unit 130, the degree of curing of the first substrate 111, and a purpose of use.

The first liquid crystal unit 130 is formed through UV curing. Herein, in order for the liquid crystal 130a in the first liquid crystal unit 130 to be aligned in a vertical direction (y-axis direction), the plurality of monomers includes monomers different from each other in surface energy. Among the plurality of monomers different from each other, a monomer having a relatively higher surface energy is converted into the polymer 130c through UV curing, and a monomer having a relatively low surface energy becomes a surface portion of the droplet 130b through UV curing. Therefore, surface of the droplet 130b is decreased. Accordingly, the droplet 130b with the decreased surface energy enables the first liquid crystal 130a to be aligned in the vertical direction (y-axis direction). A UV wavelength range for UV curing may be from 10 nm to 400 nm, preferably 320 nm to 380 nm. Further, a UV irradiation time is different for each of the plurality of monomers, and may be, for example, from 10 seconds to 100 seconds. In this case, a UV intensity may be from 20 mW/cm$^2$ to 50 mW/cm$^2$.

Figure 18C:
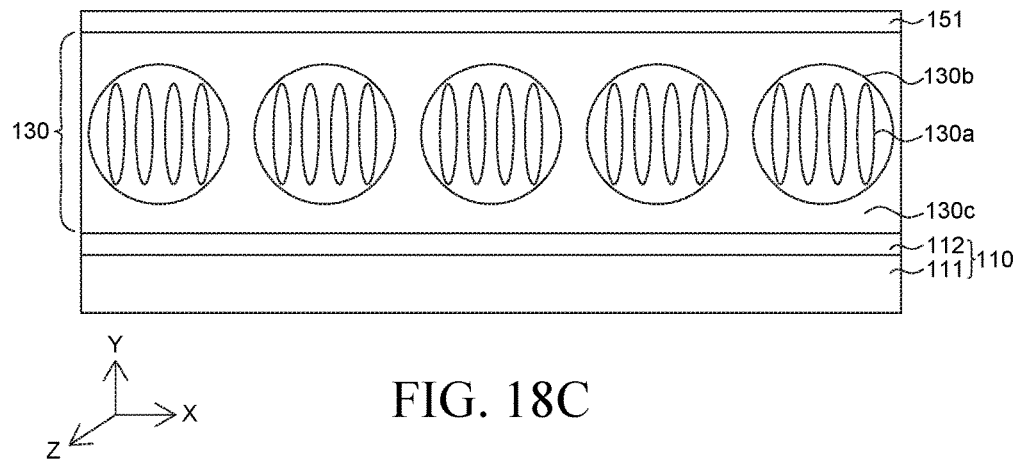

Then, referring to FIG. 18C, the first alignment film 151 is formed on the first liquid crystal unit 151. For example, the first alignment film may be formed by mixing an alignment material with a solvent such as isopropyl alcohol (IPA) and coating the mixture on the first liquid crystal unit 130, and then vaporizing the solvent. However, a method for preparing the first alignment film 151 is not limited thereto.

Figure 18D:
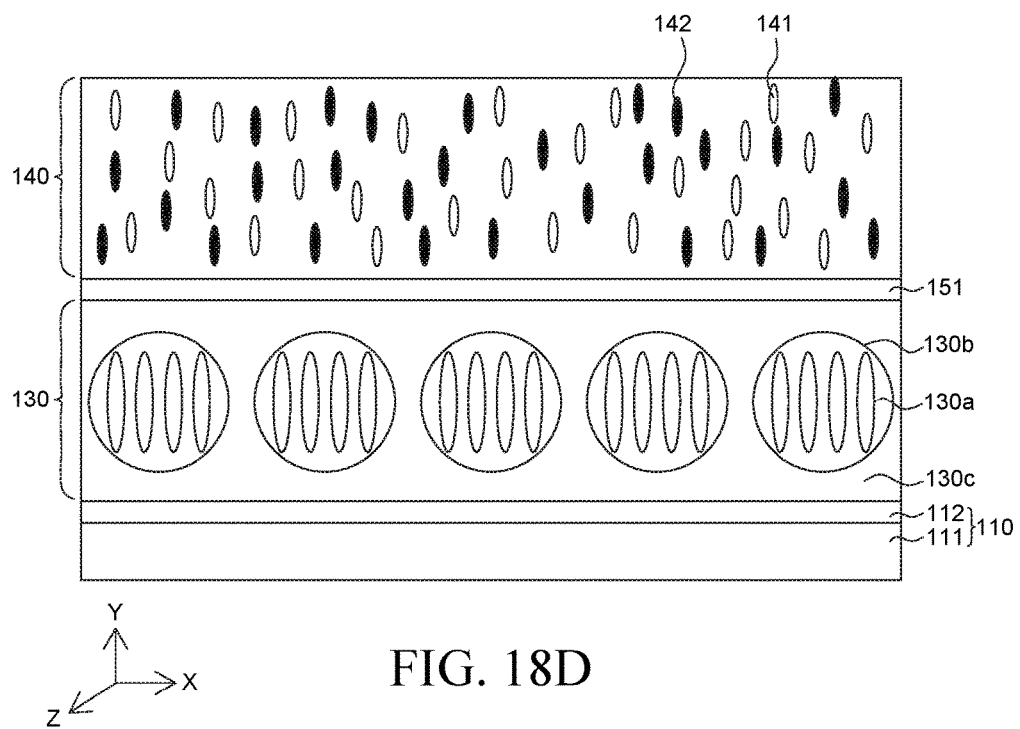

Then, referring to FIG. 18D, the second liquid crystal unit 140 is formed on the first alignment film 151. In order to form the second liquid crystal unit 140, a second mixed liquid crystal may be injected or coated on the first alignment film 151. The second mixed liquid crystal includes the liquid crystal 141 and the coloring member 142. The coloring member 142 included in the second mixed liquid crystal may be included in an amount of from 0.5 wt % to 5 wt % in the second mixed liquid crystal. In order to obtain a sufficient light shielding ratio with the coloring member 142 in the light shielding mode, the coloring member 142 may be included in an amount of 0.5 wt % or more in the second mixed liquid crystal. Further, the coloring member 142 can absorb a part of light even in the transparent mode. Therefore, in order to obtain a sufficient transmittance ratio in the transparent mode, it is necessary to determine the amount of the coloring member 142 needs to be determined so as not to greatly decrease a transmittance ratio. Thus, the coloring member 142 may be included in an amount of 5 wt % or less in the second mixed liquid crystal.

Figure 18E:
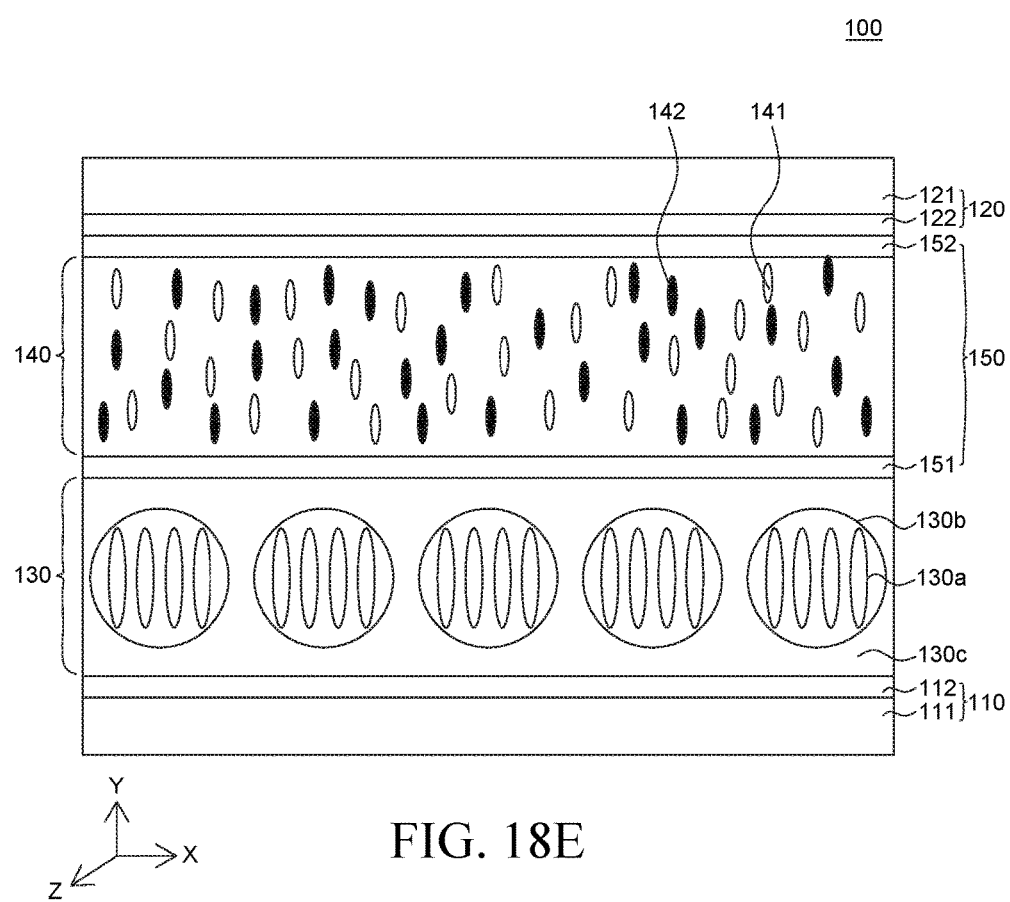

Then, referring to FIG. 18E, the second alignment film 152 and the second electrode unit 120 are formed on the second liquid crystal unit 140. Specifically, after the second alignment film 152 is formed on the second electrode unit 120, the second electrode unit 120 on which the second alignment film 152 is formed may be disposed on the second liquid crystal unit 140. As a result, the light control device 100 may be manufactured. A method for preparing the second alignment film 152 on the second electrode unit 120 may be the same as the method for preparing the first alignment film 151.

In some exemplary embodiments, the liquid crystal 130a in the first liquid crystal unit 130 may be aligned in a horizontal direction (x-axis direction) or may be aligned in an isotropic state. That is, the liquid crystal 130a in the first liquid crystal unit 130 may be aligned in the horizontal direction like the liquid crystal 530a in the first liquid crystal unit 530 illustrated in FIG. 8, or may be aligned in the isotropic state like the liquid crystal 730a in the first liquid crystal unit 730 illustrated in FIG. 10A. In order to change the alignment of the liquid crystal 130a in the first liquid crystal unit 130 as such, the UV curing condition for the first mixed liquid crystal may be modified. For example, the UV irradiation time, the UV wavelength range, the UV intensity, and the temperature for forming the first liquid crystal unit 130 may be modified. Accordingly, the liquid crystal 130a in the first liquid crystal unit 130 may be aligned in the horizontal direction or may be aligned in the isotropic state. Otherwise, the kinds of the monomers and the kind of the liquid crystal 130a included in the first mixed liquid crystal may be modified, so that the liquid crystal 130a in the first liquid crystal unit 130 may be aligned in the horizontal direction or may be aligned in the isotropic state.

In some exemplary embodiments, the first liquid crystal unit 130 may be formed without performing a UV curing process. Specifically, the droplet 130b covering the liquid crystal 130a is formed by polymerizing the liquid crystal 130a and the monomers. Then, the droplet 130b is dispersed in the solvent, and the solvent in which the droplet is dispersed is coated on the first electrode unit 110. Herein, the liquid crystal 130a within the droplet 130b is not aligned in a specific direction but randomly aligned and disposed on the first electrode unit 110. Then, the solvent is vaporized by drying the solvent, and the droplet 130b is changed from a spherical shape to an elliptical one. While the droplet 130b is changed in shape as such, the droplet 130b is pressed and the liquid crystal 130a within the droplet 130b is aligned in the vertical direction. As such, the first liquid crystal unit 130 may be formed without performing a UV curing process.

In some exemplary embodiments, the method for manufacturing the light control device 100 illustrated in FIG. 18A through FIG. 18E may use a roll-to-roll process.

Figure 19A:
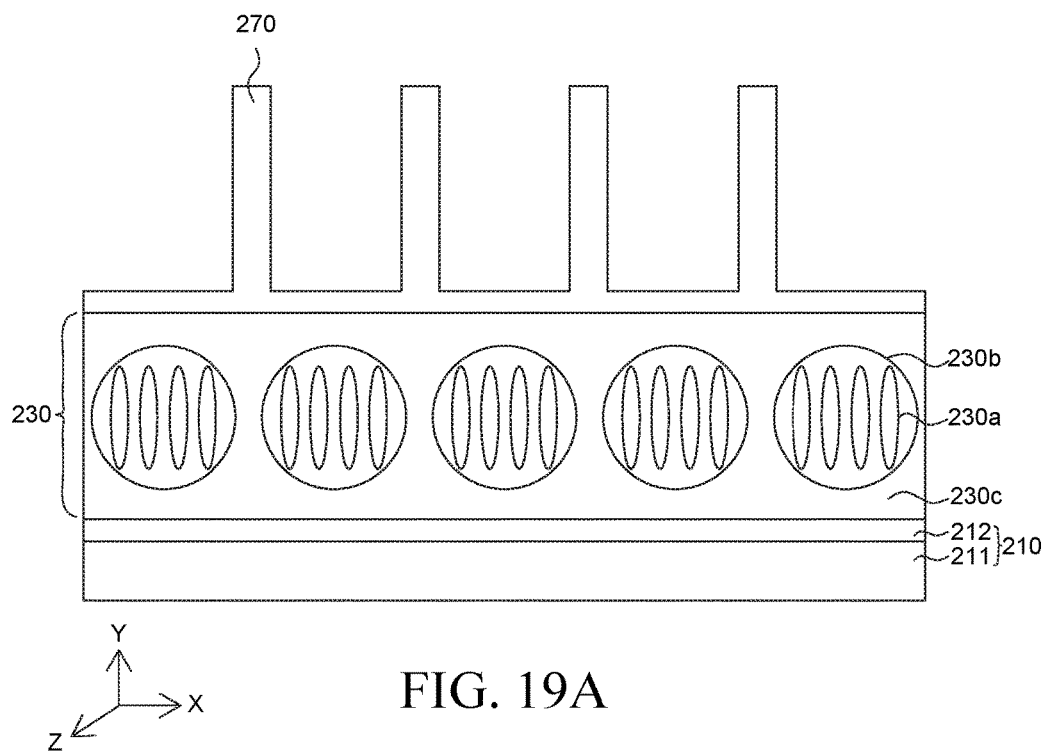
FIG. 19A through FIG. 19C are process cross-sectional views provided to explain a method for manufacturing a light control device according to another exemplary embodiment of the present invention.
Figure 19B:
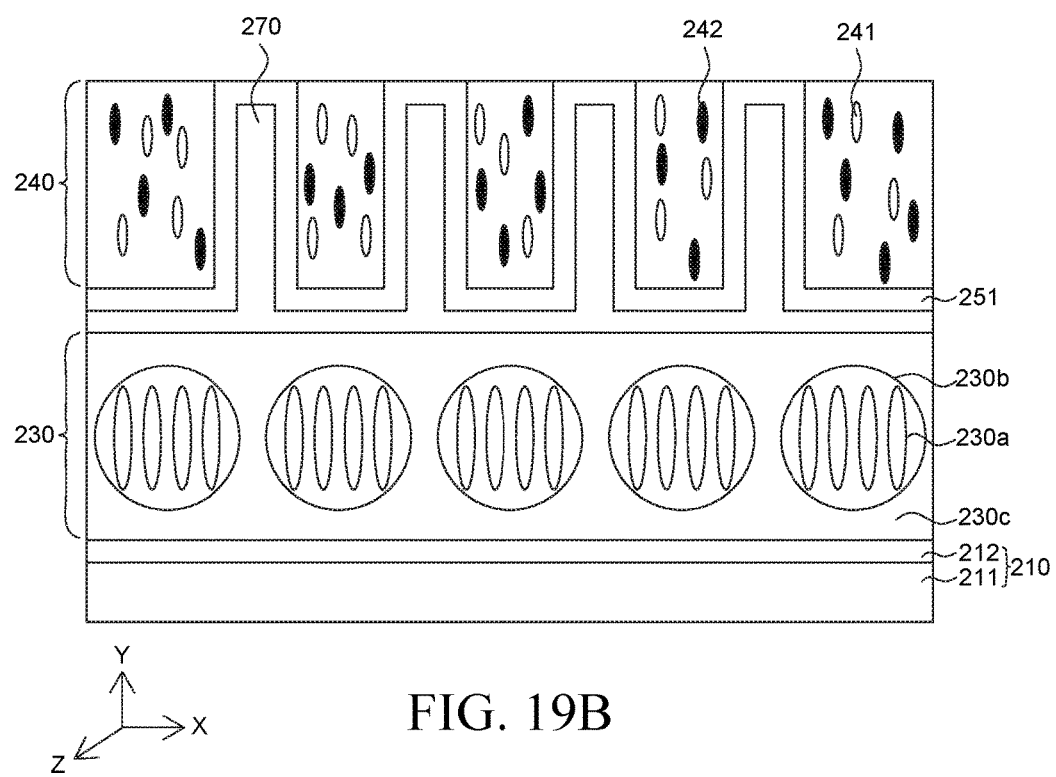
Figure 19C:
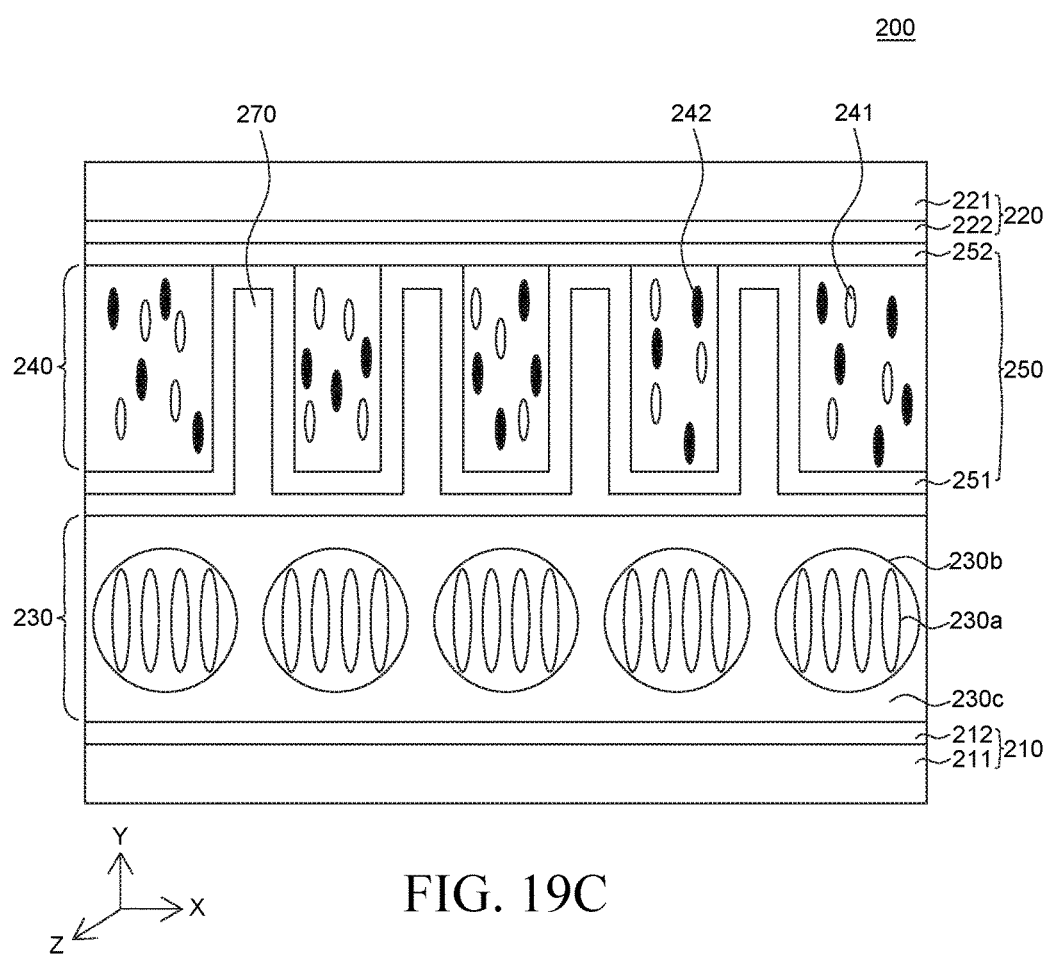

FIG. 19A through FIG. 19C are process cross-sectional views provided to explain a method for manufacturing a light control device according to another exemplary embodiment of the present invention. FIG. 19A through FIG. 19C are process cross-sectional views provided to explain a method for manufacturing the light control device 200 illustrated in FIG. 5. A process of forming the first electrode unit 210 and the first liquid crystal unit 230 is substantially the same as the process of forming the first electrode unit 110 and the first liquid crystal unit 230 described above with reference to FIG. 18A and FIG. 18B. Therefore, a detailed explanation thereof will be omitted.

Referring to FIG. 19A, the wall 270 is formed on the first electrode 230. The wall 270 may be formed by imprinting or photolithography. For example, if the wall 270 is formed by imprinting, a material for forming the wall 270 may be coated on the first liquid crystal unit 230 and applied with pressure by a mold formed of silicon, quartz, or a polymer, so that the wall 270 may be formed. In the mold, a pattern corresponding to a shape of the wall 270 is formed. Further, for example, if the wall 270 is formed by photolithography, a material for forming the wall 270 may be coated on the first liquid crystal unit 230 and exposed to light using a photolithography process, so that the wall 270 may be formed. The wall 270 may be formed of a transparent material that transmits light, and may be formed of one of, for example, a photo resist, a photocurable polymer, and polydimethylsiloxane.

Then, referring to FIG. 19B, the first alignment film 251 is formed on the wall 270, and the second liquid crystal unit 240 is formed. A process of forming the first alignment film 251 and the second liquid crystal unit 240 is substantially the same as the process of forming the first alignment film 151 and the second liquid crystal unit 140 described above with reference to FIG. 18C and FIG. 18D. Therefore, a detailed explanation thereof will be omitted.

Then, referring to FIG. 19C, the second alignment film 252 and the second electrode unit 220 are formed on the second liquid crystal unit 240 and the first alignment film 251. Specifically, after the second alignment film 252 is formed on the second electrode unit 220, the second electrode unit 220 on which the second alignment film 252 is formed may be disposed on the second liquid crystal unit 240. The second alignment film 252 may include an adhesive material so as to be bonded to the first alignment film 251 on the wall 270. Therefore, the first alignment film 251 prepared on the wall 270 may be bonded to the second alignment film 252. Therefore, the first electrode unit 210 and the second electrode unit 220 may be bonded to each other. As an area of the protruded portions of the wall 270 is increased, a bonding area between the first alignment film 251 and the second alignment film 252 is increased. Therefore, an adhesive strength between the first alignment film 251 and the second alignment film 252 may be increased. Accordingly, vulnerability of the first liquid crystal unit 230 to an external pressure can be supplemented, so that the flexible light control device 200 can be implemented. Further, if the first substrate 211 and the second substrate 221 are plastic films, the bonding area between the first alignment film 251 and the second alignment film 252 may be increased to increase the adhesive strength between the first alignment film 251 and the second alignment film 252. In this case, as the area of the protruded portions of the wall 270 is increased, a space for the second liquid crystal unit 240 is decreased. In this case, a space for the liquid crystal 241 and the coloring member 242 is decreased, and, thus, a light shielding defect may occur in a light shielding mode. Accordingly, the area of the protruded portions of the wall 270 may be set in consideration of a light shielding ratio and the adhesive strength. For example, the adhesive strength between the first alignment film 251 and the second alignment film 252 prepared on the wall 270 may be from 0.05 N/cm to 0.3 N/cm. Herein, N/cm indicates a force applied to a bonded portion between the first alignment film 251 and the second alignment film 252 when the light control device 200 having a width of 1 cm is bent.

In some exemplary embodiments, the method for manufacturing the light control device 200 illustrated in FIG. 19A through FIG. 19C may use a roll-to-roll process.

FIG. 20A through FIG. 20D are process cross-sectional views provided to explain a method for manufacturing a light control device according to yet another exemplary embodiment of the present invention. FIG. 20A through FIG. 20D are process cross-sectional views provided to explain a method for manufacturing the light control device 900 illustrated in FIG. 12A.

Figure 20A:
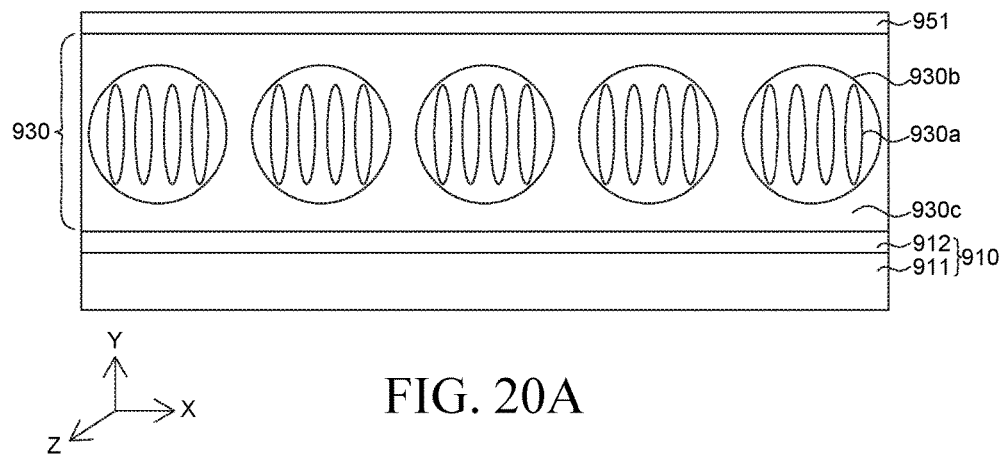
FIG. 20A through FIG. 20D are process cross-sectional views provided to explain a method for manufacturing a light control device according to yet another exemplary embodiment of the present invention.

First, referring to FIG. 20A, the first electrode unit 910, the first liquid crystal unit 930, and a first alignment film are formed. A process of forming the first electrode unit 910, the first liquid crystal unit 930, and a first alignment film 951 is substantially the same as the process of forming the first electrode unit 110, the first liquid crystal unit 130, and the first alignment film 151 described above with reference to FIG. 18A through FIG. 18C. Therefore, a detailed explanation thereof will be omitted.

Figure 20B:
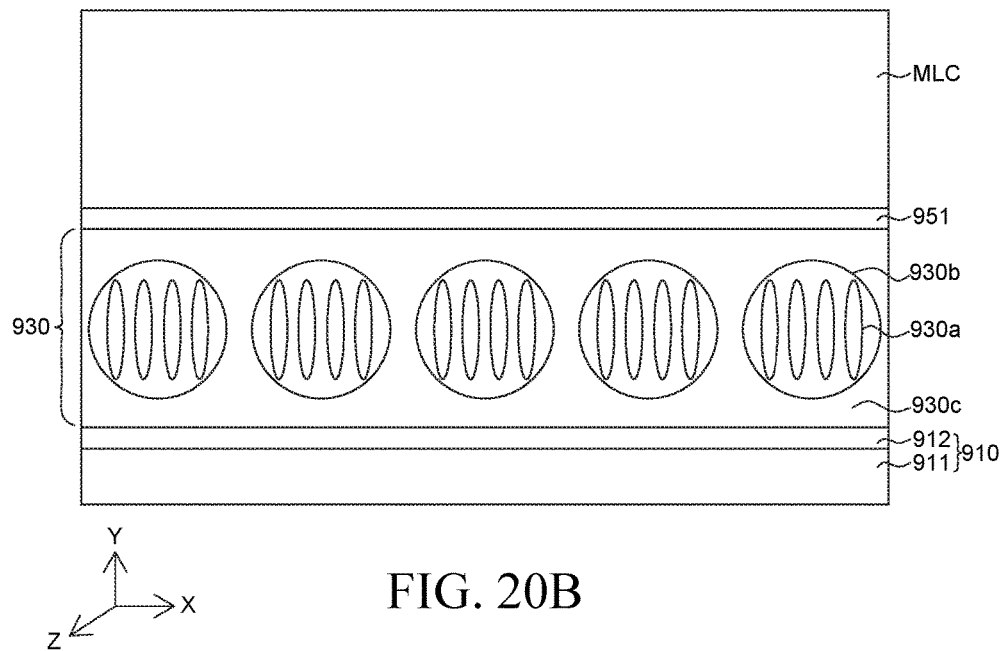
Figure 20C:
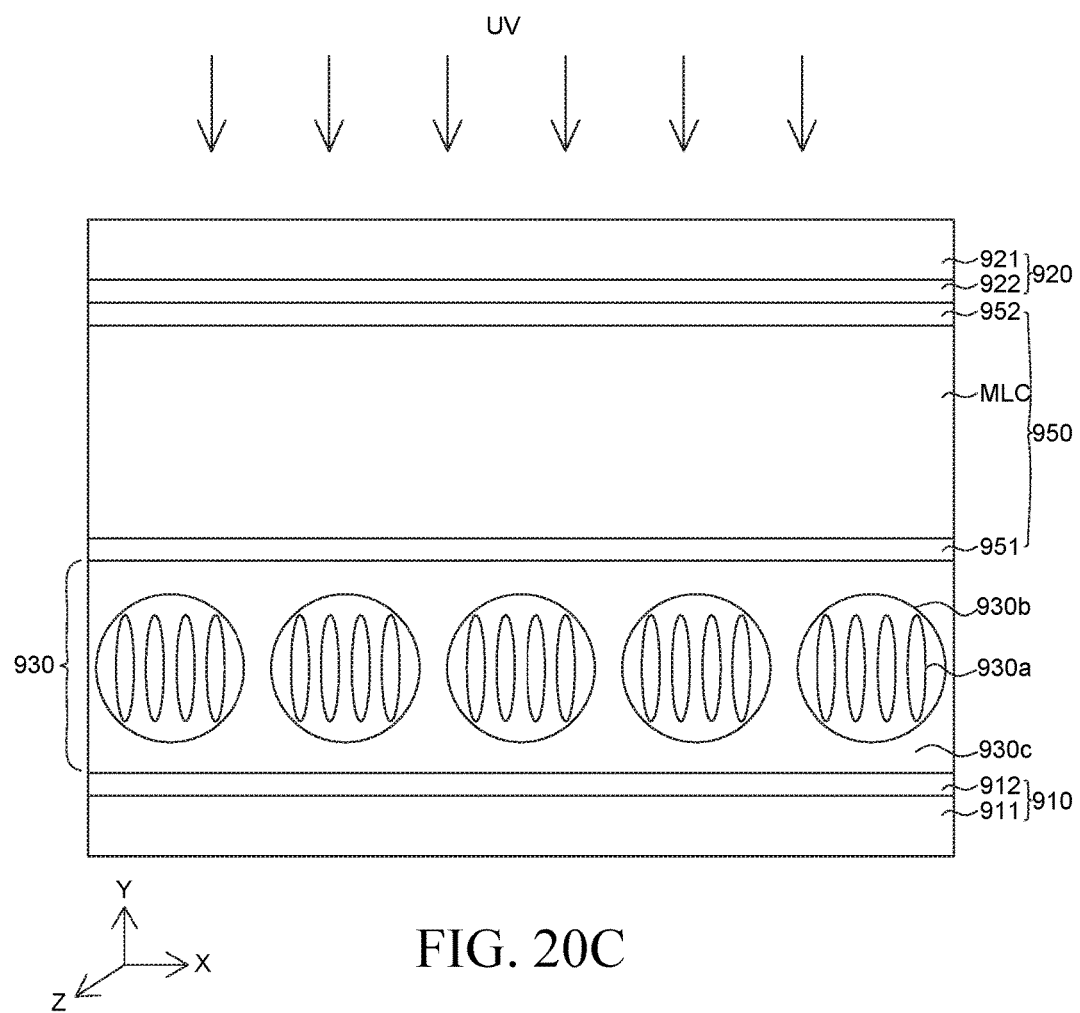
Figure 20D:
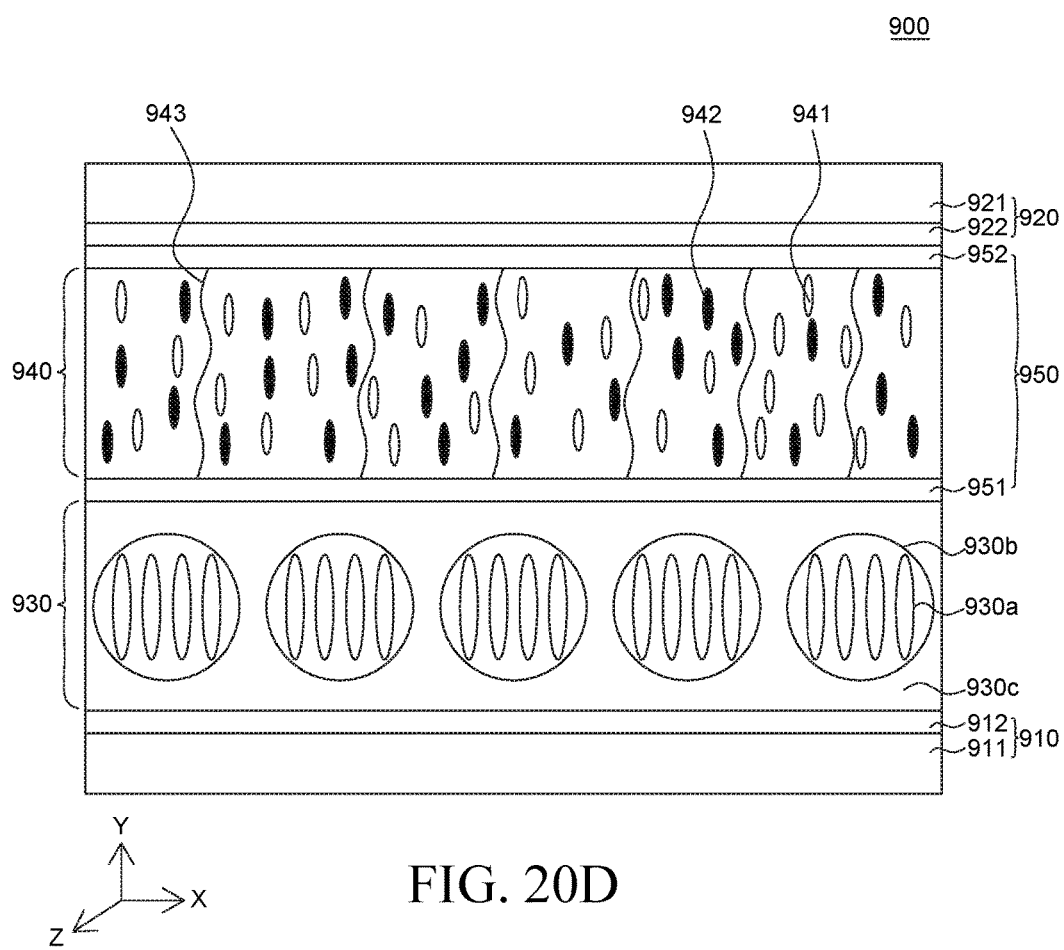

Then, referring to FIG. 20B through FIG. 20D, a mixed liquid crystal MLC for forming the second liquid crystal unit 940 is coated on the first alignment film 951 and cured with UV rays, so that the second liquid crystal unit 940 may be formed. The mixed liquid crystal MLC includes one or more kinds of monomers, the liquid crystal 941, the coloring member 942, and a photo initiator. Herein, a mixing ratio of the liquid crystal 941 and the monomers may be from 70 wt %: 30 wt % to 90 wt %: 10 wt %. The mixing ratio of the liquid crystal 941 and the monomers may be determined in consideration of the degree of haze caused by the second liquid crystal unit 940. However, the ratio may be modified depending on a cell gap of the second liquid crystal unit 940 and a purpose of use. As illustrated in FIG. 20C, UV rays are irradiated to the mixed liquid crystal MLC coated on the first alignment film 951, so that the monomers in the mixed liquid crystal MLC are polymerized. Therefore, the network 943 as illustrated in FIG. 20D is formed.

Then, the second alignment film 952 and the second electrode unit 920 are formed on the second liquid crystal unit 940. A process of forming the second alignment film 952 and the second electrode unit 920 is substantially the same as the process of forming the second alignment film 152 and the second electrode unit 120 described above with reference to FIG. 18E. Therefore, a detailed explanation thereof will be omitted.

Figure 21A:
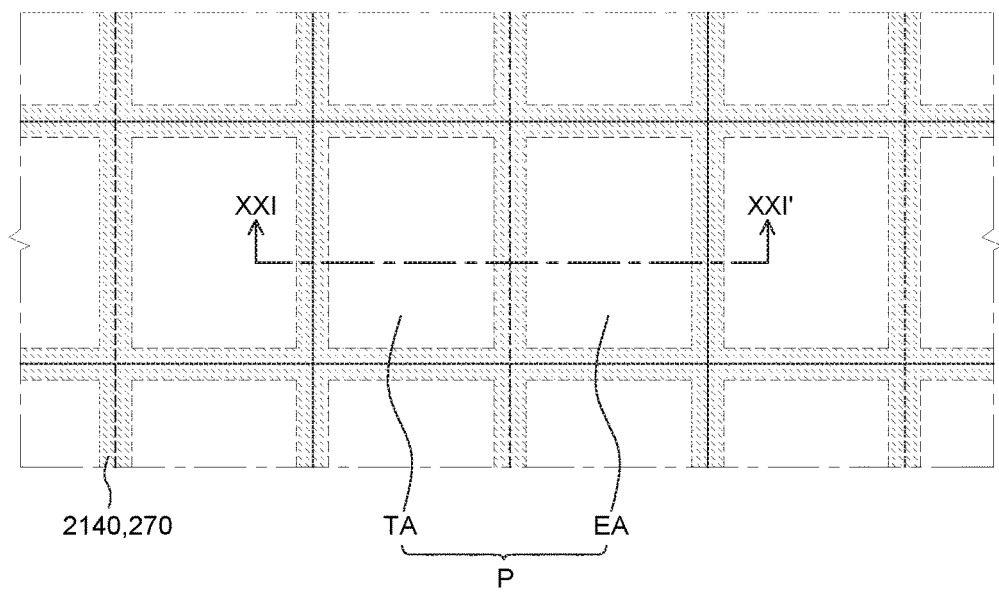
FIG. 21A is a schematic plan view provided to explain a display device to which a light control device is applied according to exemplary embodiments of the present invention.
Figure 21B:
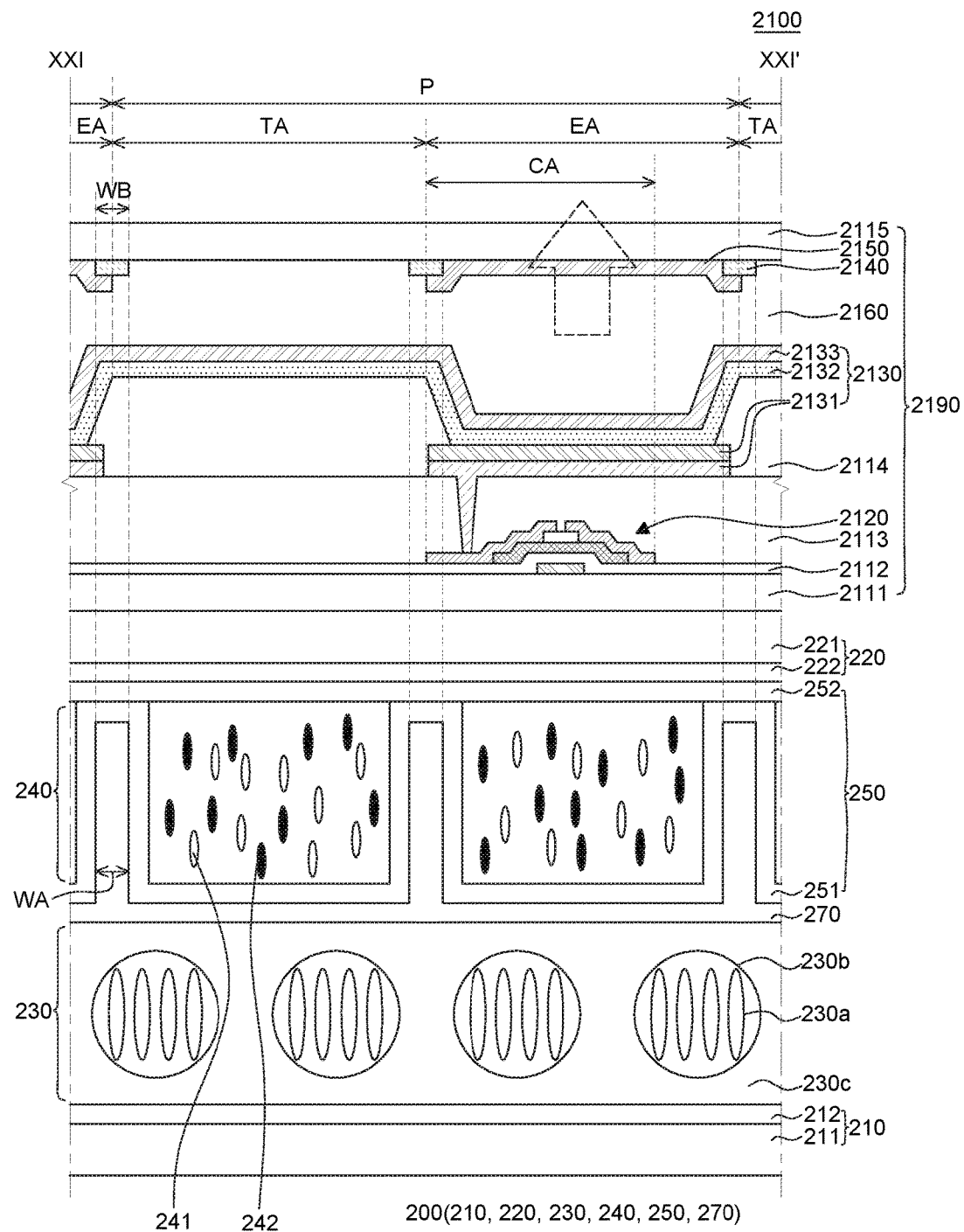
FIG. 21B is a cross-sectional view of the display device taken along a line XXI-XXI' of FIG. 21A.

FIG. 21A is a schematic plan view provided to explain a display device to which a light control device is applied according to exemplary embodiments of the present invention. FIG. 21B is a cross-sectional view of the display device taken along a line XXI-XXI' of FIG. 21A. Referring to FIG. 21A and FIG. 21B, a display device 2100 includes a display panel 2190 and the light control device 200. For convenience in explanation, FIG. 21A illustrates only some of a plurality of pixels P in the display device 2100 and illustrates only a black matrix 2140 and the wall 270 of the display device 2100. The light control device 200 illustrated in FIG. 21B is substantially the same as the light control device 200 described above with reference to FIG. 5. Therefore, a redundant explanation thereof will be omitted.

The display panel 2190 is a panel configured to display an image, and may be, for example, an organic light emitting display panel. Specifically, the display panel 2190 may be a transparent organic light emitting display panel or transparent flexible organic light emitting display panel including a transmissive area TA as illustrated in FIG. 21B. However, the display panel 2190 is not limited thereto and may display an image in various ways.

Referring to FIG. 21B, the display panel 2190 is a top-emission organic light emitting display panel in which a light emitted from an organic light emitting element 2130 is output toward an upper substrate 2115. Further, the display panel 2190 is a transparent organic light emitting display panel including a transmissive area TA.

Referring to FIG. 21A and FIG. 21B, the display panel 2190 includes a plurality of pixels P, and each of the pixels P includes a transmissive area TA, an emissive area EA, and a circuit area CA. The transmissive area TA refers to an area configured to transmit an external light incident from the outside of the display panel 2190. A user can see a background, i.e., a background of the display device 2100, through the transmissive area TA. The emissive area EA refers to an area where a light emitted from the organic light emitting element 1130 emits and also refers to an area where a light emitted from the organic light emitting element 2130 is output and an image is displayed by the organic light emitting element 2130. The circuit area CA refers to an area where various circuits for driving the organic light emitting element 2130 are disposed, and may be overlapped with the emissive area EA.

Referring to FIG. 21B, a thin-film transistor 2120 is disposed on a lower substrate 2111 of the display panel 2190. Specifically, the thin-film transistor 2120 is disposed in the circuit area CA, and includes a gate electrode, an active layer, a source electrode, and a drain electrode. Further, a gate insulating layer 2112 configured to insulate the gate electrode and the active layer is disposed. A planarization layer 2113 configured to planarize an upper part of the thin-film transistor 2120 is disposed on the thin-film transistor 2120, and the organic light emitting element 2130 is disposed on the planarization layer 2113. The organic light emitting element 2130 is disposed in the emissive area EA, and includes an anode 2131 for supplying a hole to an organic light emitting layer 2132, the organic light emitting layer 2132, and a cathode 2133 for supplying an electron to the organic light emitting layer 2132. The anode 2131 is electrically connected to the thin-film transistor 2120 through a contact hole in the planarization layer 2113. As described above, since the display panel 2190 is a top-emission organic light emitting display panel, the anode 2131 includes, for example, at least a transparent conductive layer formed of transparent conductive oxide (TCO) and a reflective layer disposed under the transparent conductive layer and configured to reflect a light emitted from the organic light emitting element 2130 to an upper part of the display panel 2190. However, the anode 2131 may be defined as including the transparent conductive layer only, and the reflective layer may be defined as a component separate from the anode 2131. A bank 2114 that defines the emissive area EA is disposed on the anode 2131, and the organic light emitting layer 2132 and the cathode 2133 are disposed on the anode 2131 and the bank 2114. The organic light emitting layer 2132 can emit a light of a specific color, for example, a light of one color of white, red, green, and blue. In the following description, it is described that the organic light emitting layer 2132 emits a white light. The cathode 2133 is disposed on the organic light emitting layer 2132. As described above, since the display panel 2190 is a top-emission organic light emitting display panel, the cathode 2133 may be formed of a transparent conductive material or a metallic material. If the cathode 2133 is formed of a metallic material, the cathode 2133 is formed to have a very small thickness, allowing a light emitted from the organic light emitting layer 2132 to pass through the cathode 2133.

The black matrix 2140 is disposed on the upper substrate 2115 of the display panel 2190. The black matrix 2140 is disposed at a boundary between the pixels P and a boundary between the transmissive area TA and the emissive area EA. Further, a color filter 2150 is disposed in the emissive area EA on the upper substrate 2115 of the display panel 2190. The color filter 2150 may be one of a red color filter, a green color filter, and a blue color filter, but is not limited thereto, and may be a color filter that transmits a light of another color. The upper substrate 2115 and the lower substrate 2111 are bonded to each other by an adhesive layer 2160. Herein, the display panel 2190 may further include a sealing layer for protecting the organic light emitting element 2130 against moisture and oxygen from the outside.

The light control device 200 may be combined with the display panel 2190. Therefore, the light control device 200 can provide a light shielding mode and a transparent mode to the user. More specifically, the light control device 200 may be bonded to a rear surface of the display panel 2190 that is opposite to a front surface of the display panel 2190 which is a light emitting surface of the display panel 2190. Herein, if an adhesive member, for example, an optical clear adhesive (OCA) as one of optical transparent adhesives is used to bond the light control device 200 to the rear surface of the transparent display panel 2190 and a lamination process is performed thereto, the light control device 200 can be finally combined with the display panel 2190. Further, the OCA may have a refractive index selected from the range of from 1.4 to 1.9.

The wall 270 of the light control device 200 is disposed so as to correspond to the black matrix 2140 of the display panel 2190. That is, as illustrated in FIG. 21A and FIG. 21B, the wall 270 of the light control device 200 is disposed to be overlapped with the black matrix 2140 of the display panel 2190 and disposed at all of the boundary between the pixels P of the display panel 2190 and the boundary between the transmissive area TA and the emissive area EA. Herein, a width WA of the wall 270 may be equal to or smaller than a width WB of the black matrix 2140. If the wall 270 of the light control device 200 is disposed as described above, the wall 270 may be disposed in a mesh structure in a plan view as illustrated in FIG. 21A. Otherwise, the wall 270 may be disposed in a stripe structure so as to be overlapped with a part of the black matrix 2140.

Hereinafter, driving methods of a transparent mode and a light shielding mode of the light control device 200 will be described with reference to the display device 2100 that supplies an image.

While the display panel 2190 does not supply an image, the light control device 200 is driven in a transparent mode. Further, while the display panel 2190 supplies an image, the light control device 200 is driven in a light shielding mode so as to shield a light incident into the rear surface which is opposite to the front surface as a light emitting surface of the display panel 2190. As described above, the first liquid crystal unit 230 and the second liquid crystal unit 240 scatter a light incident from the outside and the light control device 200 suppresses a light incident from the outside from being seen through the rear surface of the display panel 2190. Thus, the quality of an image can be improved. Further, the light control device 200 exhibits a color of the coloring member 242 and thus can provide the background with a color to the user. Therefore, it is possible to provide an aesthetic effect to the user, if necessary, in addition to the light shielding function. Driving methods of a transparent mode and a light shielding mode of the light control device 200 are substantially the same as the driving method for the light control device 200 described above with reference to FIG. 5. Therefore, a detailed explanation thereof will be omitted.

Although FIG. 21B illustrates that the wall 270 of the light control device 200 is disposed at all of the boundary between the pixels P of the display panel 2190 and the boundary between the transmissive area TA and the emissive area EA, the wall 270 may be disposed so as to be overlapped with only the black matrix 2140 disposed at the boundary between the pixels P of the display panel 2190.

Further, since the emissive area EA of the display panel 2190 is an area for emitting a light but not an area capable of transmitting an external light, a portion of the light control device 200 corresponding to the emissive area EA may not be implemented in a light shielding mode and a transparent mode. That is, the portion of the light control device 200 corresponding to the emissive area EA may be continuously in a transparent mode. In this regard, although FIG. 21B illustrates that the first electrode 212 of the first electrode unit 210 and the second electrode 222 of the second electrode unit 220 are disposed so as to correspond to all of the emissive area EA and the transmissive area TA, the first electrode 212 and the second electrode 222 may be disposed only in the transmissive area TA.

Although FIG. 21B illustrates that the light control device 200 illustrated in FIG. 5 is used as the light control device 200, the light control device 200 is not limited thereto. All of the various light control devicees described as employing a wall in the present specification may be applied to the display device 2100 according to an exemplary embodiment of the present invention.

Further, although FIG. 21B illustrates that the second electrode unit 220 of the light control device 200 is in contact with the lower substrate 2111 of the display panel 2190, the first electrode unit 210 of the light control device 200 may be in contact with the lower substrate 2111 of the display panel 2190.

Furthermore, the lower substrate 2111 of the display panel 2190 may be one of substrates constituting the first electrode unit 210 or the second electrode unit 220 of the light control device 200. For example, if the first electrode 212 of the first electrode unit 210 or the second electrode 222 of the second electrode unit 220 constituting the light control device 200 is formed on a rear surface of the lower substrate 2111 of the display panel 2190, the lower substrate 2111 of the display panel 2190 plays the same role as the substrates 211 and 121 constituting the first electrode unit 210 or the second electrode unit 220. Therefore, the lower substrate 2111, the first electrode 212 of the first electrode unit 210, or the second electrode 222 of the second electrode unit 220 may have the same configuration as the first electrode unit 210 or second electrode unit 220 described above.

Figure 21C:
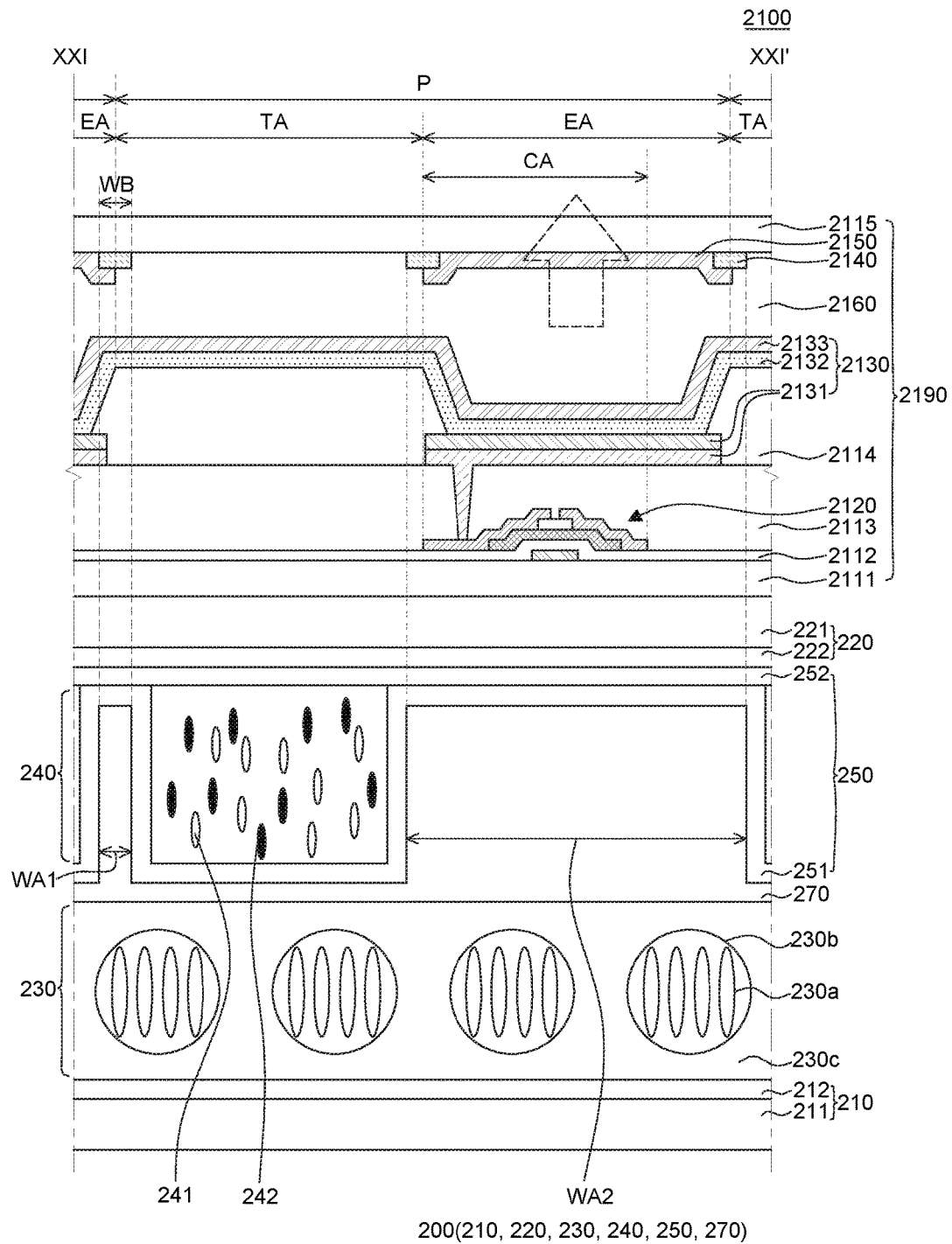
FIG. 21C and FIG. 21D are cross-sectional views of display devices according to various exemplary embodiments of the present invention.

FIG. 21C is a cross-sectional view of a display device according to another exemplary embodiment of the present invention. In the present exemplary embodiment, an explanation of components identical or corresponding to those of the above-described exemplary embodiment will be omitted. Hereinafter, a display device according to the present exemplary embodiment will be described with reference to FIG. 21C.

Referring to FIG. 21C, the wall 270 of the light control device 200 may be disposed so as to be overlapped with the black matrix 2140 of the display panel 2190 and may also be disposed in the emissive area EA of the display panel 2190. Herein, a width WA1 of the wall 270 overlapped with the black matrix 2140 only is equal to the width WB of the black matrix 2140 and smaller than a width WA2 of the wall 270 overlapped with the black matrix 2140 and the emissive area EA. Since the emissive area EA of the display penal 2190 is an area for emitting a light but not an area capable of transmitting an external light, the liquid crystal 241 and the coloring member 242 of the second liquid crystal unit 240 for shielding or transmitting an external light may not be disposed in a portion of the light control device 200 corresponding to the emissive area EA. Therefore, as illustrated in FIG. 21C, the wall 270 of the light control device 200 may be formed so as to correspond to the entire emissive area EA.

A driving method for the light control device 200 combined with the display panel 2190 is the same as described above with reference to FIG. 21B. Therefore, a redundant explanation thereof will be omitted.

Although FIG. 21C illustrates that the wall 270 is formed so as to correspond to the entire emissive area EA, the wall 270 may be formed so as to correspond to only a partial area of the emissive area EA.

Figure 21D:
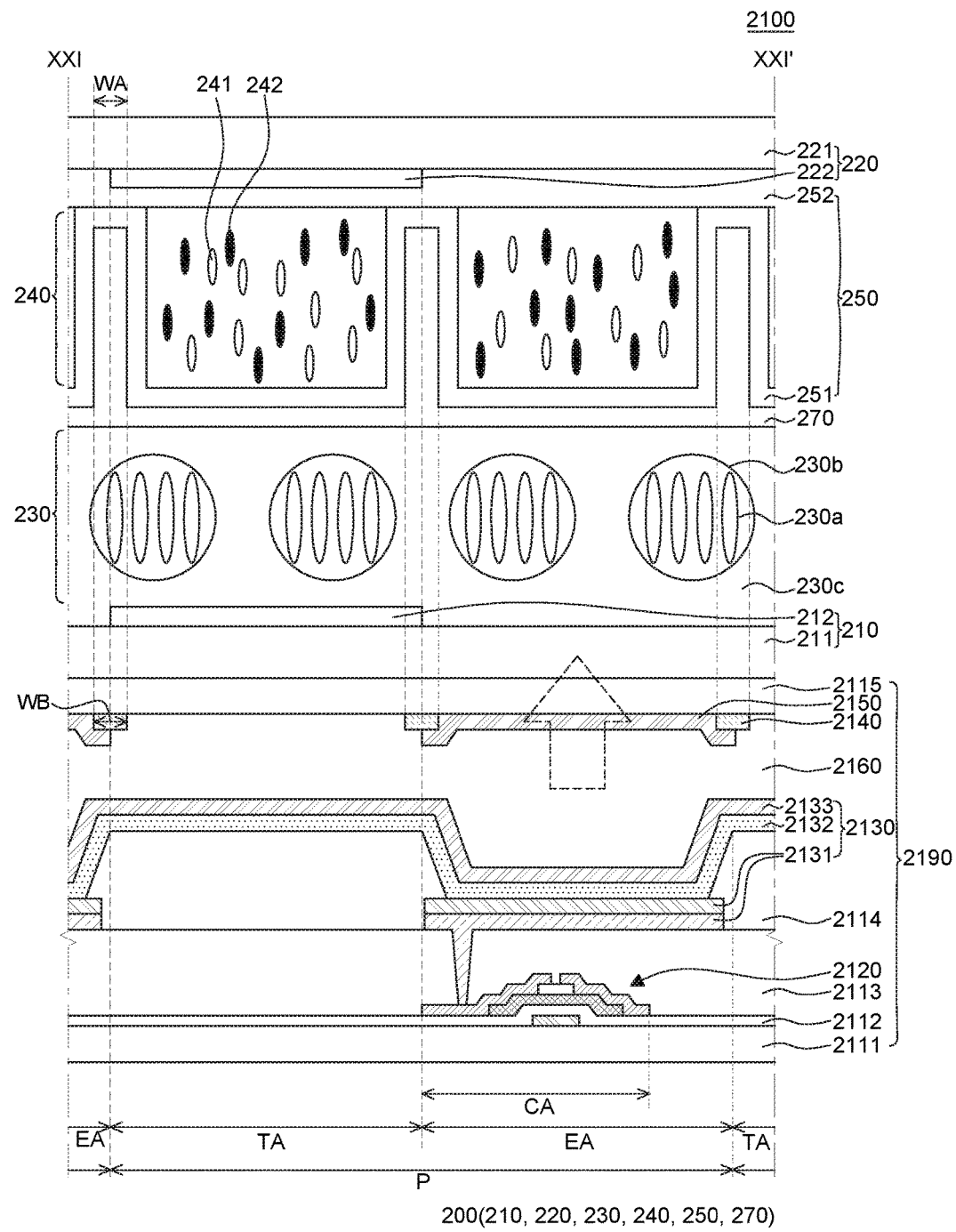

FIG. 21D is a cross-sectional view of a display device according to another exemplary embodiment of the present invention. In the present exemplary embodiment, an explanation of components identical or corresponding to those of the above-described exemplary embodiment will be omitted. Hereinafter, a display device according to the present exemplary embodiment will be described with reference to FIG. 21D.

Referring to FIG. 21D, the light control device 200 may be bonded to the front surface as a light emitting surface of the display panel 2190. In this case, if an adhesive member, for example, OCA as one of optical transparent adhesives, is used to bond the light control device 200 to the rear surface of the transparent display panel 2190 and a lamination process is performed thereto, the light control device 200 can be finally combined with the display panel 2190.

The wall 270 of the light control device 200 is disposed so as to correspond to the black matrix 2140 of the display panel 2190. That is, as illustrated in FIG. 21D, the wall 270 of the light control device 200 is disposed to be overlapped with the black matrix 2140 of the display panel 2190 so as to be disposed at all of the boundary between the pixels P of the display panel 2190 and the boundary between the transmissive area TA and the emissive area EA. Herein, the width WA of the wall 270 may be equal to or smaller than the width WB of the black matrix 2140. If the wall 270 of the light control device 200 is disposed as described above, the wall 270 may be disposed in a mesh structure in a plan view. Otherwise, although not illustrated, the wall 270 may be disposed in a stripe structure so as to be overlapped with a part of the black matrix 2140.

Since the light control device 200 is disposed on the front surface of the display panel 2190, the first electrode 212 of the first electrode unit 210 and the second electrode 222 of the second electrode unit 220 are formed so as to correspond to the transmissive area TA only. During a manufacturing process of the light control device 200, the liquid crystal 241 and the coloring member 242 of the second liquid crystal unit 240 are disposed on the entire region of the light control device 200. Therefore, if the first electrode 212 and the second electrode 222 are disposed in the emissive area EA, the light control device 200 may also be driven in the emissive area EA. Accordingly, a light emitted from the emissive area EA may be shielded by the light control device 200. Thus, as illustrated in FIG. 21D, the first electrode 212 and the second electrode 222 are disposed so as to correspond to the transmissive area TA only, so that only a portion of the light control device 200 corresponding to the transmissive area TA is driven and a portion of the light control device 200 corresponding to the emissive area EA is continuously maintained in a transparent mode.

Hereinafter, driving methods of a transparent mode and a light shielding mode of the light control device 200 will be described with reference to the display device 2100 that supplies an image.

While the display panel 2190 does not supply an image, the light control device 200 is driven in a transparent mode. That is, while a voltage is not applied to the light control device 200, the light control device 200 is implemented in a transparent mode in which a light incident from the outside is transmitted.

While the display panel 2190 supplies an image, the light control device 200 is implemented so as to shield a light incident through the rear surface. Specifically, while the display panel 2190 supplies an image, a voltage is applied to the first electrode 212 and the second electrode 222 of the light control device 200, and, thus, the liquid crystal 230a in the first liquid crystal unit 230 and the liquid crystal 241 in the second liquid crystal unit 240 are aligned parallel to the first electrode unit 210 and the second electrode unit 220 and the coloring member 242 in the second liquid crystal unit 240 lies in a horizontal direction along with the liquid crystal 241. Therefore, the liquid crystal 230a in the first liquid crystal unit 230 and the liquid crystal 241 in the second liquid crystal unit 240 scatter a light incident from the outside and the coloring member 242 absorbs the scattered light, and the light control device 200 blocks the light incident from the outside from being seen through the transmissive area TA of the display panel 2190. Thus, the quality of an image can be improved. In this case, since the first electrode 212 and the second electrode 222 are not formed in the portion of the light control device 200 corresponding to the emissive area EA, the light control device 200 is still implemented in a transparent mode, and, thus, the user can see an image through the emissive area EA.

Although FIG. 21D illustrates that the wall 270 of the light control device 200 is disposed at all of the boundary between the pixels P of the display panel 2190 and the boundary between the transmissive area TA and the emissive area EA, the wall 270 may be disposed so as to be overlapped with only the black matrix 2140 disposed at the boundary between the pixels P of the display panel 2190.

Further, the upper substrate 2115 of the display panel 2190 may be one of substrates constituting the first electrode unit 210 or the second electrode unit 220 of the light control device 200. For example, if the first electrode 212 of the first electrode unit 210 or the second electrode 222 of the second electrode unit 220 constituting the light control device 200 is formed on a front surface of the upper substrate 2115 of the display panel 2190, the upper substrate 2115 of the display panel 2190 plays the same role as the substrates 211 and 121 constituting the first electrode unit 210 or the second electrode unit 220. Therefore, the upper substrate 2115, the first electrode 212 of the first electrode unit 210, or the second electrode 222 of the second electrode unit 220 may have the same configuration as the first electrode unit 210 or second electrode unit 220 described above.

Furthermore, when the light control device 200 is bonded to the front surface as a light emitting surface of the display panel 2190, the wall 270 may also be formed in the emissive area EA. That is, as illustrated in FIG. 21C, a part of the wall 270 may be overlapped with the black matrix 2140 only and another part thereof may be overlapped with the black matrix 2140 and the emissive area EA. As described above, since the wall 270 is formed of a transparent material capable of transmitting a light, the wall 270 may be formed so as to correspond to the entire emissive area EA in order for the portion of the light control device 200 corresponding to the emissive area EA to continuously transmit light.

Although FIG. 21A through FIG. 21D illustrate that the display panel 2100 is an organic light emitting display panel of a top-emission type or a bottom-emission type, the display panel 2100 may be a dual-emission organic light emitting display panel. That is, the display panel 2100 may display an image through a front surface and a rear surface of the display panel. In this case, the light control device 200 may be disposed only on one of the front surface and the rear surface of the display panel 2100 or may be disposed on both of the front surface and the rear surface of the display panel 2100. That is, at least one light control device 200 may be attached to the display panel 2100.

Figure 22A:
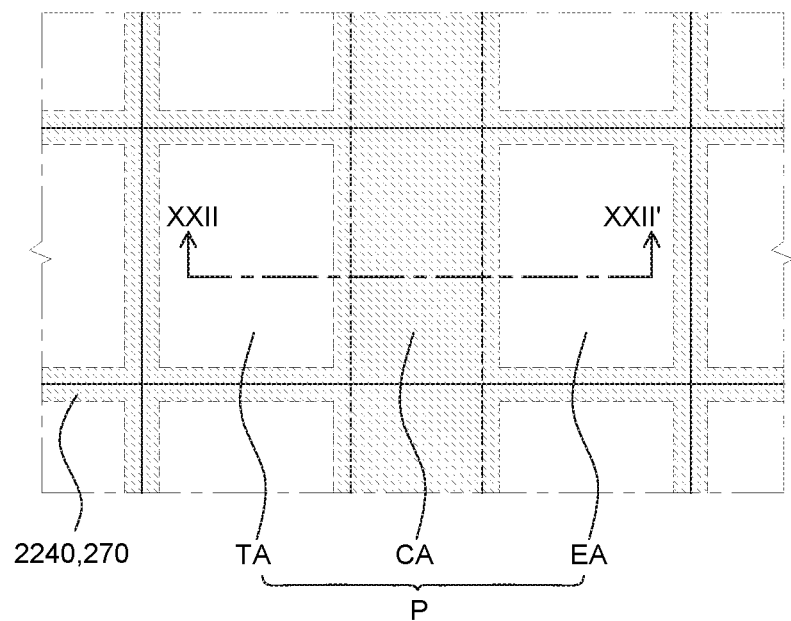
FIG. 22A is a schematic plan view provided to explain a display device to which a light control device is applied according to exemplary embodiments of the present invention.
Figure 22B:
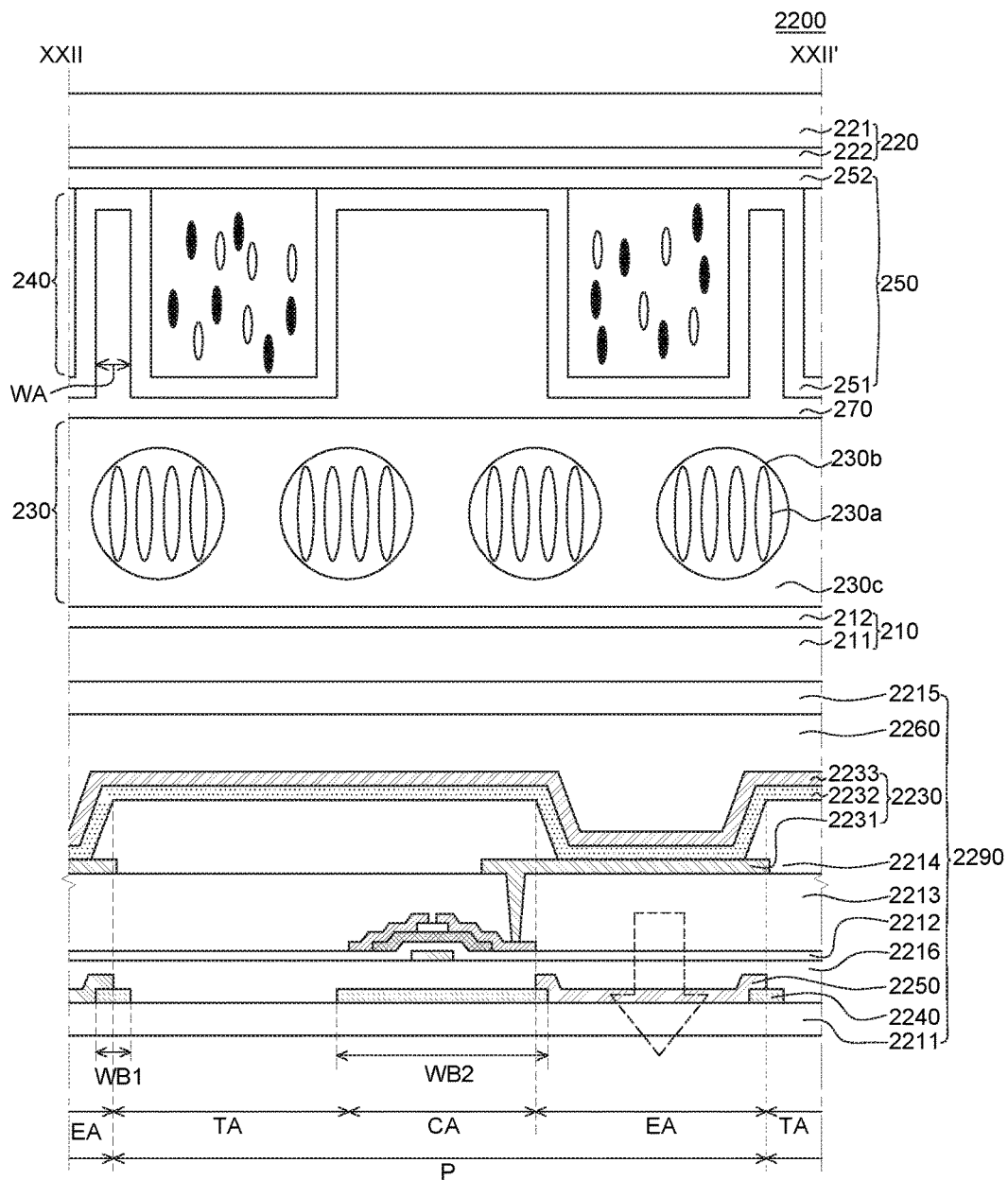
FIG. 22B is a cross-sectional view of the display device taken along a line XXII-XXII' of FIG. 22A.

FIG. 22A is a schematic plan view provided to explain a display device to which a light control device is applied according to exemplary embodiments of the present invention. FIG. 22B is a cross-sectional view of the display device taken along a line XXII-XXII' of FIG. 22A. Referring to FIG. 22A and FIG. 22B, a display device 2200 includes a display panel 2290 and the light control device 200. For convenience in explanation, FIG. 22A illustrates only some of a plurality of pixels P of the display device 2200 and illustrates only a black matrix 2240 and the wall 270 of the display device 2200. In the present exemplary embodiment, an explanation of components identical or corresponding to those of the above-described exemplary embodiment will be omitted. Hereinafter, the display device 2200 according to the present exemplary embodiment will be described with reference to FIG. 22A.

Referring to FIG. 22B, the display panel 2290 may be a bottom-emission organic light emitting display panel in which a light emitted from an organic light emitting element 2230 is output toward a lower substrate 2211. Further, the display panel 2290 is a transparent organic light emitting display panel including a transmissive area TA.

Referring to FIG. 22A and FIG. 22B, the display panel 2290 includes a plurality of pixels P, and each of the pixels P includes a transmissive area TA, an emissive area EA, and a circuit area CA. As compared with the display device 2100 described above with reference to FIG. 21A and FIG. 21B, the display panel 2290 illustrated in FIG. 22A and FIG. 22B is a bottom-emission organic light emitting display panel, and, thus, the emissive area EA is not overlapped with the circuit area CA. That is, since a light emitted from the emissive area EA needs to pass through the lower substrate 2211 so as to be output to the outside, the circuit area CA in which various circuits are disposed is not overlapped with the emissive area EA.

Referring to FIG. 22B, a thin-film transistor 2220 is disposed on the lower substrate 2211 of the display panel 2290. Specifically, the thin-film transistor 2220 is disposed in the circuit area CA. Further, a gate insulating layer 2212 configured to insulate a gate electrode and an active layer is disposed. A planarization layer 2213 configured to planarize an upper part of the thin-film transistor 2220 is disposed on the thin-film transistor 2220, and the organic light emitting element 2230 is disposed on the planarization layer 2213. The organic light emitting element 1230 is disposed in the emissive area EA, and includes an anode 2231 for supplying a hole to an organic light emitting layer 2232, the organic light emitting layer 2232, and a cathode 2233 for supplying an electron to the organic light emitting layer 2232. The anode 2231 is electrically connected to the thin-film transistor 2220 through a contact hole in the planarization layer 2213. As described above, since the display panel 2290 is a bottom-emission organic light emitting display panel, the anode 2231 includes a transparent conductive layer formed of transparent conductive oxide (TCO). A bank 2214 that defines the emissive area EA is disposed on the anode 2231, and the organic light emitting layer 2232 and the cathode 2233 are disposed on the anode 2231 and the bank 2214. The organic light emitting layer 2232 can emit a light of a specific color, for example, a light of one color of white, red, green, and blue. In the following description, it is described that the organic light emitting layer 2232 emits a white light. The cathode 2233 is disposed on the organic light emitting layer 2232. As described above, since the display panel 2290 is a bottom-emission organic light emitting display panel, the cathode 2233 may be formed of a metallic material. The upper substrate 2215 and the lower substrate 2211 are bonded to each other by an adhesive layer 2260. In this case, the display panel 2290 may further include a sealing layer for protecting the organic light emitting element 2230 against moisture and oxygen from the outside.

The black matrix 2240 is disposed on the lower substrate 2211 of the display panel 2290. The black matrix 2240 is disposed at a boundary between the pixels P, a boundary between the emissive area EA and the circuit area CA, a boundary between the transmissive area TA and the circuit area CA, and in the circuit area CA. Further, a color filter 2250 is disposed in the emissive area EA on the lower substrate 2211 of the display panel 2290. The color filter 2250 may be one of a red color filter, a green color filter, and a blue color filter, but is not limited thereto, and may be a color filter that transmits a light of another color. An overcoating layer 2216 for planarizing an upper part of the color filter 2250 is disposed on the color filter 2250, and the thin-film transistor 2220 is disposed on the overcoating layer 2216.

The light control device 200 may function as a light shielding plate by being combined with the display panel 2290. More specifically, referring to FIG. 22B, the light control device 200 may be bonded to a front surface of the display panel 2290 that is opposite to a rear surface of the display panel 2290 which is a light emitting surface of the display panel 2290. Herein, if an adhesive member, for example, OCA as one of optical transparent adhesives, is used to bond the light control device 200 to the rear surface of the transparent display panel 2290 and a lamination process is performed thereto, the light control device 200 can be finally combined with the display panel 2290.

The wall 270 of the light control device 200 is disposed so as to correspond to the black matrix 2240 of the display panel 2290. The wall 270 of the light control device 200 is disposed at the boundary between the pixels P, the boundary between the emissive area EA and the circuit area CA, the boundary between the transmissive area TA and the circuit area CA, and in the circuit area CA. Herein, the width WA1 of the wall 270 disposed at the boundary between the pixels P may be equal to or smaller than a width WB1 of the black matrix 2240 disposed at the boundary between the pixels P. The width WA2 of the wall 270 disposed in the circuit area CA may be equal to or smaller than a width WB2 of the black matrix 2240 disposed in the circuit area CA. If the wall 270 of the light control device 200 is disposed as described above, the wall 270 may be disposed in a mesh structure in a plan view as illustrated in FIG. 22A. Otherwise, although not illustrated, the wall 270 may be disposed in a stripe structure so as to be overlapped with a part of the black matrix 940.

Hereinafter, driving methods of a transparent mode and a light shielding mode of the light control device 200 will be described with reference to the display device 2200 that supplies an image.

While the display panel 2290 does not supply an image, the light control device 200 is driven in a transparent mode. Further, while the display panel 2290 supplies an image, the light control device 200 is driven so as to shield a light incident from the front surface that is opposite to the rear surface which is a light emitting surface of the display panel 2290. Therefore, the first liquid crystal unit 230 and the second liquid crystal unit 240 scatter a light incident from the outside, and the light control device 200 blocks the light incident from the outside from being seen through the front surface of the display panel 2290. Thus, the quality of an image can be improved. Furthermore, the light control device 200 may provide an aesthetic effect to the user, if necessary, in addition to the light shielding function. For example, the light control device 200 may provide wallpaper or a background having a color to the user by showing the color of the coloring member 240 constituting the light control device 200. Driving methods of a transparent mode and a light shielding mode of the light control device 200 are substantially the same as the driving methods of the light control device 200 described above with reference to FIG. 5. Therefore, a detailed explanation thereof will be omitted.

Although FIG. 22B illustrates that the wall 270 of the light control device 200 is disposed at all of the boundary between the pixels P of the display panel 2290, the boundary between the emissive area EA and the circuit area CA, the boundary between the transmissive area TA and the circuit area CA, and in the circuit area CA, the wall 270 may be disposed so as to be overlapped with the black matrix 2240 disposed at the boundary between the pixels P of the display panel 2290.

Further, the wall 270 of the light control device 200 may also be disposed in the emissive area EA. Since the wall 270 is formed of a transparent material capable of transmitting light. Therefore, the wall 270 may be formed so as to correspond to the entire emissive area EA in order for the portion of the light control device 200 corresponding to the emissive area EA to transmit light. In this case, the wall 270 may not be disposed in the circuit area CA.

Also, although FIG. 22B illustrates that the first electrode 212 of the first electrode unit 210 and the second electrode 222 of the second electrode unit 220 are disposed so as to correspond to all of the emissive area EA and the transmissive area TA, the first electrode 212 and the second electrode 222 may be disposed in the transmissive area TA. That is, since the emissive area EA of the display penal 2290 is an area for emitting a light but not an area capable of transmitting an external light, the portion of the light control device 200 corresponding to the emissive area EA may not be driven in a light shielding mode and a transparent mode. That is, the portion of the light control device 200 corresponding to the emissive area EA may be continuously in a transparent mode. Thus, the first electrode 212 and the second electrode 222 may be disposed in the transmissive area TA.

Although FIG. 22B illustrates that the light control device 200 illustrated in FIG. 5 is used as the light control device 200, the light control device 200 is not limited thereto. All of the various light control devicees described as employing a wall in the present specification may be applied to the display device 2200 according to an exemplary embodiment of the present invention.

Furthermore, the upper substrate 2215 of the display panel 2290 may be one of substrates constituting the first electrode unit 210 or the second electrode unit 220 of the light control device 200. For example, if the first electrode 212 of the first electrode unit 210 or the second electrode 222 of the second electrode unit 220 constituting the light control device 200 is formed on a front surface of the upper substrate 2215 of the display panel 2290, the upper substrate 2215 of the display panel 2290 plays the same role as the substrates 211 and 121 constituting the first electrode unit 210 or the second electrode unit 220. Therefore, the upper substrate 2215, the first electrode 212 of the first electrode unit 210, or the second electrode 222 of the second electrode unit 220 may have the same configuration as the first electrode unit 210 or second electrode unit 220 described above.

Although FIG. 22A and FIG. 22B illustrate that the transmissive area TA, the circuit area CA, and the emissive area EA are disposed in sequence in one pixel P, the sequence of the transmissive area TA, the circuit area CA, and the emissive area EA in one pixel P is not limited thereto.

Figure 22C:
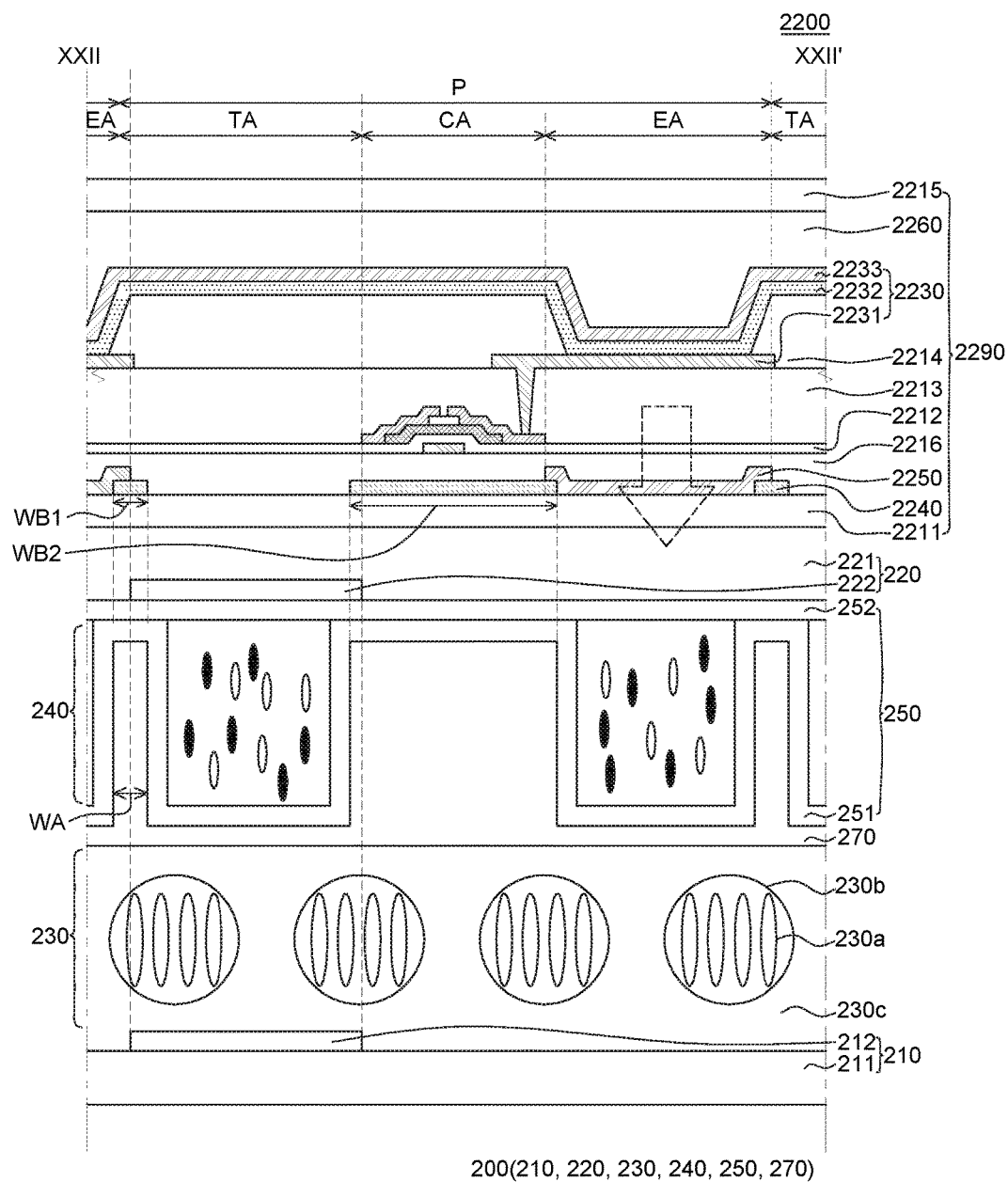
FIG. 22C is a cross-sectional view of a display device according to another exemplary embodiment of the present invention.

FIG. 22C is a cross-sectional view of a display device according to another exemplary embodiment of the present invention. In the present exemplary embodiment, an explanation of components identical or corresponding to those of the above-described exemplary embodiment will be omitted. Hereinafter, a display device according to the present exemplary embodiment will be described with reference to FIG. 22C.

Referring to FIG. 22C, the light control device 200 may be bonded to the rear surface of the display panel 2290 where the display panel 2290 outputs an image. In this case, if an adhesive member, for example, OCA as one of optical transparent adhesives, is used to bond the light control device 200 to the rear surface of the transparent display panel 2290 and a lamination process is performed thereto, the light control device 200 can be finally combined with the display panel 2290.

The wall 270 of the light control device 200 is disposed so as to correspond to the black matrix 2240 of the display panel 1290. That is, the wall 270 of the light control device 200 is disposed so as to be overlapped with the black matrix 2240 of the display panel 2290 and the wall 270 of the light control device 200 is disposed at all of the boundary between the pixels P of the display panel 2290, the boundary between the emissive area EA and the circuit area CA, the boundary between the transmissive area TA and the circuit area CA, and in the circuit area CA.

Since the light control device 200 is disposed on the rear surface of the display panel 2290, the first electrode 212 of the first electrode unit 210 and the second electrode 222 of the second electrode unit 220 are formed so as to correspond to the transmissive area TA. The liquid crystal 241 and the coloring member 242 of the second liquid crystal unit 240 are disposed on the entire region of the light control device 200. Therefore, if the first electrode 212 and the second electrode 222 are disposed in the emissive area EA, the light control device 200 may also be driven in the emissive area EA. Accordingly, a light emitted from the emissive area EA may be shielded by the light control device 200. Thus, the first electrode 212 and the second electrode 222 are formed so as to correspond to the transmissive area TA, so that a portion of the light control device 200 corresponding to the transmissive area TA is driven and a portion of the light control device 200 corresponding to the emissive area EA is maintained in a transparent mode.

Hereinafter, driving methods of a transparent mode and a light shielding mode of the light control device 200 will be described with reference to the display device 2200 that supplies an image.

While the display panel 2290 does not supply an image, the light control device 200 is implemented in a transparent mode. While the display panel 2290 supplies an image, the light control device 200 is implemented in a light shielding mode so as to shield a light incident through the rear surface. Specifically, while the display panel 2290 supplies an image, a voltage is applied to the first electrode 212 and the second electrode 222 of the light control device 200, and, thus, the liquid crystal 230a in the liquid crystal unit 230 and the liquid crystal 241 in the second liquid crystal unit 240 are aligned in a horizontal direction with respect to the first electrode unit 210 and the second electrode unit 220. In this case, the coloring member 242 in the second liquid crystal unit 240 lies in the horizontal direction along with the liquid crystal 241. Therefore, the liquid crystal 230a in the first liquid crystal unit 230 and the liquid crystal 241 in the second liquid crystal unit 240 scatter a light incident from the outside and the coloring member 242 absorbs the scattered light. Therefore, the light control device 200 blocks the light incident from the outside from being seen through the transmissive area TA of the display panel 2190. Thus, the quality of an image can be improved. In this case, since the first electrode 212 and the second electrode 222 are not formed in the portion of the light control device 200 corresponding to the emissive area EA, the light control device 200 is still implemented in a transparent mode, and, thus, the user can see an image through the emissive area EA.

Although FIG. 22C illustrates that the wall 270 of the light control device 200 is disposed at all of the boundary between the pixels P, the boundary between the emissive area EA and the circuit area CA, the boundary between the transmissive area TA and the circuit area CA, and in the circuit area CA, the wall 270 may be disposed so as to be overlapped with only the black matrix 2240 disposed at the boundary between the pixels P of the display panel 2290.

Further, the wall 270 of the light control device 200 may also be disposed in the emissive area EA. Since the wall 270 is formed of a photocurable monomer formed of a transparent material capable of transmitting light, the wall 270 may be formed so as to correspond to the entire emissive area EA in order for the portion of the light control device 200 corresponding to the emissive area EA to continuously transmit light. In this case, the wall 270 may not be disposed in the circuit area CA.

The lower substrate 2211 of the display panel 2290 may be one of substrates constituting the first electrode unit 210 or the second electrode unit 220 of the light control device 200. For example, if the first electrode 212 of the first electrode unit 210 or the second electrode 222 of the second electrode unit 220 constituting the light control device 200 is formed on a front surface of the lower substrate 2211 of the display panel 2290, the lower substrate 2211 of the display panel 2290 plays the same role as the substrates 211 and 121 constituting the first electrode unit 210 or the second electrode unit 220. Therefore, the lower substrate 2211, the first electrode 212 of the first electrode unit 210, or the second electrode 222 of the second electrode unit 220 may have the same configuration as the first electrode unit 210 or second electrode unit 220 described above.

Although the present invention has been described above with reference to the specific exemplary embodiments, the exemplary embodiments are provided for illustrative purposes only but not intended to limit the light control device and the method for manufacturing the same according to the present invention. It is clear that the exemplary embodiments can be modified or improved by a person having ordinary skill in the art within a technical concept of the present invention.

All of simple modifications or changes of the present invention are included in the scope of the present invention, and the protective scope of the present invention will be more clearly understood from the appended claims.

The invention claimed is:

1. A display device comprising:
   a display panel; and
   a light control device disposed on one surface of the display panel,
   wherein the light control device includes:
   a first substrate and a second substrate facing each other; and
   a plurality of liquid crystal units which is disposed between the first substrate and the second substrate and implemented in a transparent mode in which light is transmitted when an electric field is not applied and also implemented in a light shielding mode in which light is shielded when an electric field is applied, and the plurality of liquid crystal units includes a polymer dispersed liquid crystal (PDLC) including a droplet including a first liquid crystal and a polymer networked liquid crystal (PNLC) disposed on or under the polymer dispersed liquid crystal (PDLC).

2. The display device of claim 1, wherein the display panel is a transparent display panel including a transmissive area and an emissive area, and in a display mode in which the display panel displays an image, the plurality of liquid crystal units is implemented in a light shielding mode, and in a non-display mode in which the display panel does not display an image, the plurality of liquid crystal units is implemented in a transparent mode or a light shielding mode.

3. The display device of claim 1, further comprising:
a first electrode between the first substrate and the plurality of liquid crystal units; and
a second electrode between the second substrate and the plurality of liquid crystal units,
wherein a second liquid crystal of PNLC is a negative liquid crystal, and
the first electrode and the second electrode are configured to apply a vertical electric field to the plurality of liquid crystal units.

4. The display device of claim 3, wherein the first liquid crystal of PDLC is a negative liquid crystal and aligned in a vertical direction with respect to the first substrate and the second substrate in a state where an electric field is not applied to the PDLC.

5. The display device of claim 4, wherein a refractive index of a short axis of the first liquid crystal in the PDLC, a refractive index of the polymer in the PDLC, a refractive index of a short axis of the second liquid crystal in the PNLC are identical to each other, wherein a refractive index of a long axis of the first liquid crystal in the PDLC and a refractive index of the polymer in the PDLC are different from each other.

6. The display device of claim 3, wherein the first liquid crystal of PDLC is a positive liquid crystal and aligned in a horizontal direction with respect to the first substrate and the second substrate in a state where an electric field is not applied to the PDLC.

7. The display device of claim 6, wherein a refractive index of a long axis of the first liquid crystal in the PDLC, a refractive index of the polymer in the PDLC, a refractive index of a short axis of the second liquid crystal in the PNLC are identical to each other, wherein a refractive index of a short axis of the first liquid crystal in the PDLC and a refractive index of the polymer in the PDLC are different from each other.

8. The display device of claim 3, wherein the first liquid crystal of PDLC is a positive liquid crystal or negative liquid crystal and has an isotropic state in a state where an electric field is not applied to the PDLC.

9. The display device of claim 8, wherein an average refractive index of the first liquid crystal in the PDLC, a refractive index of the polymer in the PDLC, a refractive index of a short axis of the second liquid crystal in the PNLC are identical to each other, wherein a refractive index of a short axis or long axis of the first liquid crystal in the PDLC and a refractive index of the polymer in the PDLC are different from each other.

10. The display device of claim 1, further comprising:
a first electrode disposed between the first substrate and the plurality of liquid crystal units and including a plurality of pattern electrodes,
wherein a second liquid crystal of PNLC is a positive liquid crystal, and
the first electrode includes the plurality of pattern electrodes configured to apply a horizontal electric field to the plurality of liquid crystal units.

11. The display device of claim 10, wherein the first liquid crystal of PDLC is a negative liquid crystal and aligned in a horizontal direction with respect to the first substrate and the second substrate in a state where an electric field is not applied to the PDLC.

12. The display device of claim 11, a refractive index of a long axis of the first liquid crystal in the PDLC, a refractive index of the polymer in the PDLC, a refractive index of a short axis of the second liquid crystal in the PNLC are identical to each other, wherein a refractive index of a short axis of the first liquid crystal in the PDLC and a refractive index of the polymer in the PDLC are different from each other.

13. The display device of claim 10, wherein the first liquid crystal of PDLC is a positive liquid crystal and aligned in a vertical direction with respect to the first substrate and the second substrate in a state where an electric field is not applied to the PDLC.

14. The display device of claim 13, wherein a refractive index of a short axis of the first liquid crystal in the PDLC, a refractive index of the polymer in the PDLC, a refractive index of a short axis of the second liquid crystal in the PNLC are identical to each other, wherein a refractive index of a long axis of the first liquid crystal in the PDLC and a refractive index of the polymer in the PDLC are different from each other.

15. The display device of claim 10, wherein the first liquid crystal in the PDLC is a positive liquid crystal or negative liquid crystal and has an isotropic state in a state where an electric field is not applied to the PDLC.

16. The display device of claim 15, wherein an average refractive index of the first liquid crystal in the PDLC, a refractive index of the polymer in the PDLC, a refractive index of a short axis of the second liquid crystal in the PNLC are identical to each other, wherein a refractive index of a short axis or long axis of the first liquid crystal in the PDLC and a refractive index of the polymer in the PDLC are different from each other.

17. The display device of claim 10, further comprising:
an insulating layer between the first substrate and the first electrode; and
a common electrode between the insulating layer and the first substrate,
wherein the first electrode and the common electrode are configured to apply a horizontal electric field to the plurality of liquid crystal units.

18. The display device of claim 1, further comprising:
a wall positioned in the PNLC,
wherein the wall is formed of one of a photo resist, polydimethylsiloxane, and a photo curable polymer which are transparent materials capable of transmitting light.

19. The display device of claim 1, further comprising:
an alignment film which is disposed on or under the PNLC so as to align a second liquid crystal in the PNLC.

* * * * *